US012769959B2

(12) United States Patent
Bunandar et al.

(10) Patent No.: US 12,769,959 B2
(45) Date of Patent: Oct. 20, 2026

(54) TECHNIQUES OF PERFORMING OPERATIONS USING A HYBRID ANALOG-DIGITAL PROCESSOR

(71) Applicant: Lightmatter, Inc., Boston, MA (US)

(72) Inventors: Darius Bunandar, Boston, MA (US); Calvin McCarter, Malden, MA (US); Ayon Basumallik, Framingham, MA (US)

(73) Assignee: Lightmatter, Inc., Mountain View, CA (US)

(*) Notice: Subject to any disclaimer, the term of this patent is extended or adjusted under 35 U.S.C. 154(b) by 944 days.

(21) Appl. No.: 18/077,177

(22) Filed: Dec. 7, 2022

(65) Prior Publication Data

US 2023/0177284 A1 Jun. 8, 2023

Related U.S. Application Data

(60) Provisional application No. 63/287,219, filed on Dec. 8, 2021.

(51) Int. Cl.
*G06J 1/00* (2006.01)
*G06F 17/16* (2006.01)

(52) U.S. Cl.
CPC ................ *G06J 1/00* (2013.01); *G06F 17/16* (2013.01)

(58) Field of Classification Search
CPC .................................. G06F 17/16; G06J 1/00
See application file for complete search history.

(56) References Cited

U.S. PATENT DOCUMENTS

| | | | |
|---|---|---|---|
| 3,872,293 | A | 3/1975 | Green |
| 4,567,569 | A | 1/1986 | Caulfield et al. |
| 4,607,344 | A | 8/1986 | Athale et al. |
| 4,633,428 | A | 12/1986 | Byron |
| 4,686,646 | A | 8/1987 | Goutzoulis |
| 4,739,520 | A | 4/1988 | Collins, Jr. et al. |

(Continued)

FOREIGN PATENT DOCUMENTS

| | | |
|---|---|---|
| CN | 101630178 A | 1/2010 |
| CN | 106814924 A | 6/2017 |

(Continued)

OTHER PUBLICATIONS

Chinese Notification of the Second Office Action issued Jan. 10, 2026, in connection with Chinese Application No. 202080029762.8, with English translation thereof.

(Continued)

*Primary Examiner* — Michael D. Yaary
(74) *Attorney, Agent, or Firm* — Wolf, Greenfield & Sacks, P.C.

(57) ABSTRACT

Described herein are techniques of using a hybrid analog-digital processor to perform matrix operations. The hybrid analog-digital may store digital values in memory encoded in a low bit number format. The hybrid analog-digital processor may perform, using an analog processor, a matrix operation to obtain output(s). The output(s) may be encoded in the number format. The hybrid analog-digital processor may determine, using the output(s), an unbiased estimate of a matrix operation result. The hybrid analog-digital processor may store, in the memory, the unbiased estimate of the matrix operation result encoded in the number format.

23 Claims, 22 Drawing Sheets

(56) References Cited

U.S. PATENT DOCUMENTS

| | | | |
|---|---|---|---|
| 4,809,204 | A | 2/1989 | Dagenais et al. |
| 4,849,940 | A | 7/1989 | Marks, II et al. |
| 4,877,297 | A | 10/1989 | Yeh |
| 4,947,482 | A | 8/1990 | Brown |
| 4,948,212 | A | 8/1990 | Cheng et al. |
| 5,004,309 | A | 4/1991 | Caulfield et al. |
| 5,077,619 | A | 12/1991 | Toms |
| 5,095,459 | A | 3/1992 | Ohta et al. |
| 5,333,117 | A | 7/1994 | Ha et al. |
| 5,381,361 | A | 1/1995 | Kirk et al. |
| 5,383,042 | A | 1/1995 | Robinson |
| 5,394,257 | A | 2/1995 | Horan et al. |
| 5,428,711 | A | 6/1995 | Akiyama et al. |
| 5,495,356 | A | 2/1996 | Sharony et al. |
| 5,550,993 | A | 8/1996 | Ehlig et al. |
| 5,576,873 | A | 11/1996 | Crossland et al. |
| 5,640,261 | A | 6/1997 | Ono |
| 5,699,449 | A | 12/1997 | Javidi |
| 5,784,309 | A | 7/1998 | Budil |
| 5,953,143 | A | 9/1999 | Sharony et al. |
| 5,995,748 | A | 11/1999 | Guttag et al. |
| 6,005,998 | A | 12/1999 | Lee |
| 6,060,710 | A | 5/2000 | Carrieri et al. |
| 6,178,020 | B1 | 1/2001 | Schultz et al. |
| 6,728,434 | B2 | 4/2004 | Flanders |
| 7,136,587 | B1 | 11/2006 | Davis et al. |
| 7,173,272 | B2 | 2/2007 | Ralph |
| 7,536,431 | B2 | 5/2009 | Goren et al. |
| 7,660,533 | B1 | 2/2010 | Meyers et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,026,837 | B1 | 9/2011 | Valley et al. |
| 8,027,587 | B1 | 9/2011 | Watts |
| 8,035,540 | B2 | 10/2011 | Berkley et al. |
| 8,129,670 | B2 | 3/2012 | Laycock et al. |
| 8,190,553 | B2 | 5/2012 | Routt |
| 8,223,414 | B2 | 7/2012 | Goto |
| 8,386,899 | B2 | 2/2013 | Goto et al. |
| 8,560,282 | B2 | 10/2013 | Macready et al. |
| 8,604,944 | B2 | 12/2013 | Berkley et al. |
| 8,620,855 | B2 | 12/2013 | Bonderson |
| 8,700,184 | B2 | 4/2014 | Latham et al. |
| 8,837,544 | B2 | 9/2014 | Santori |
| 9,009,560 | B1 | 4/2015 | Matache et al. |
| 9,250,391 | B2 | 2/2016 | McLaughlin et al. |
| 9,354,039 | B2 | 5/2016 | Mower et al. |
| 9,513,276 | B2 | 12/2016 | Tearney et al. |
| 9,791,258 | B2 | 10/2017 | Mower |
| 10,095,262 | B2 | 10/2018 | Valley et al. |
| 10,268,232 | B2 | 4/2019 | Harris et al. |
| 10,359,272 | B2 | 7/2019 | Mower et al. |
| 10,382,139 | B2 | 8/2019 | Rosenhouse et al. |
| 10,534,189 | B2 | 1/2020 | Miller |
| 10,803,258 | B2 | 10/2020 | Kenney et al. |
| 10,803,259 | B2 | 10/2020 | Kenney et al. |
| 11,023,691 | B2 | 6/2021 | Kenney et al. |
| 11,775,779 | B2 | 10/2023 | Kenney et al. |
| 11,886,942 | B2 | 1/2024 | Kenney et al. |
| 12,153,975 | B2 | 11/2024 | Kenney et al. |
| 12,373,687 | B2 | 7/2025 | Bunandar et al. |
| 2003/0086138 | A1 | 5/2003 | Pittman et al. |
| 2003/0235363 | A1 | 12/2003 | Pfeiffer |
| 2003/0235413 | A1 | 12/2003 | Cohen et al. |
| 2004/0243657 | A1 | 12/2004 | Goren et al. |
| 2005/0036786 | A1 | 2/2005 | Ramachandran et al. |
| 2005/0156775 | A1 | 7/2005 | Petre et al. |
| 2006/0215949 | A1 | 9/2006 | Lipson et al. |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0212980 | A1 | 9/2008 | Weiner |
| 2008/0273835 | A1 | 11/2008 | Popovic |
| 2008/0304600 | A1 | 12/2008 | Bottomley |
| 2009/0028554 | A1 | 1/2009 | Anderson et al. |
| 2010/0165432 | A1 | 7/2010 | Laycock et al. |
| 2010/0194956 | A1 | 8/2010 | Yuan et al. |
| 2010/0215365 | A1 | 8/2010 | Fukuchi |
| 2013/0011093 | A1 | 1/2013 | Goh et al. |
| 2013/0121706 | A1 | 5/2013 | Yang et al. |
| 2014/0003761 | A1 | 1/2014 | Dong |
| 2014/0032635 | A1 | 1/2014 | Pimmel et al. |
| 2014/0056585 | A1 | 2/2014 | Qian et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0112129 | A1 | 4/2016 | Chang |
| 2016/0118106 | A1 | 4/2016 | Yoshimura et al. |
| 2016/0162781 | A1 | 6/2016 | Lillicrap et al. |
| 2016/0162798 | A1 | 6/2016 | Marandi et al. |
| 2016/0182155 | A1 | 6/2016 | Taylor et al. |
| 2016/0245639 | A1 | 8/2016 | Mower et al. |
| 2016/0301478 | A1 | 10/2016 | Luo et al. |
| 2016/0352515 | A1 | 12/2016 | Bunandar et al. |
| 2017/0031101 | A1 | 2/2017 | Miller |
| 2017/0201813 | A1 | 7/2017 | Sahni |
| 2017/0237505 | A1 | 8/2017 | Lucamarini et al. |
| 2017/0285373 | A1 | 10/2017 | Zhang et al. |
| 2017/0351293 | A1 | 12/2017 | Carolan et al. |
| 2017/0372202 | A1 | 12/2017 | Ginsburg et al. |
| 2018/0004708 | A1 | 1/2018 | Muralimanohar et al. |
| 2018/0081388 | A1 | 3/2018 | Kielpinski et al. |
| 2018/0093208 | A1 | 4/2018 | Tachibana |
| 2018/0107237 | A1 | 4/2018 | Andregg et al. |
| 2018/0274900 | A1 | 9/2018 | Mower et al. |
| 2018/0323825 | A1 | 11/2018 | Cioffi et al. |
| 2018/0335574 | A1 | 11/2018 | Steinbrecher et al. |
| 2018/0373902 | A1 | 12/2018 | Muralimanohar et al. |
| 2019/0042922 | A1* | 2/2019 | Pillai ....................... G06F 17/11 |
| 2019/0057303 | A1 | 2/2019 | Burger |
| 2019/0110084 | A1 | 4/2019 | Jia et al. |
| 2019/0205741 | A1 | 7/2019 | Gupta et al. |
| 2019/0346685 | A1 | 11/2019 | Miller |
| 2019/0354894 | A1 | 11/2019 | Lazovich et al. |
| 2019/0356394 | A1 | 11/2019 | Bunandar et al. |
| 2019/0370644 | A1 | 12/2019 | Kenney et al. |
| 2019/0372589 | A1 | 12/2019 | Gould et al. |
| 2020/0117997 | A1 | 4/2020 | Yao et al. |
| 2020/0133994 | A1 | 4/2020 | Chatterjee et al. |
| 2020/0150923 | A1 | 5/2020 | Muralimanohar et al. |
| 2020/0211649 | A1 | 7/2020 | Park |
| 2020/0226454 | A1 | 7/2020 | Cambier |
| 2020/0272794 | A1 | 8/2020 | Kenney et al. |
| 2020/0272795 | A1* | 8/2020 | Kenney .................. G06J 1/005 |
| 2020/0349326 | A1 | 11/2020 | King |
| 2020/0380217 | A1 | 12/2020 | Kenney et al. |
| 2021/0064958 | A1 | 3/2021 | Lin |
| 2021/0279432 | A1 | 9/2021 | Kenney et al. |
| 2022/0100973 | A1 | 3/2022 | Kenney et al. |
| 2022/0172052 | A1 | 6/2022 | Bunandar et al. |
| 2023/0110047 | A1 | 4/2023 | Bunandar |
| 2024/0193410 | A1 | 6/2024 | Shen |

FOREIGN PATENT DOCUMENTS

| | | | |
|---|---|---|---|
| CN | 107110826 | A | 8/2017 |
| CN | 107408103 | A | 11/2017 |
| CN | 108475348 | A | 8/2018 |
| CN | 108780492 | A | 11/2018 |
| JP | 2019-003546 | A1 | 1/2019 |
| TW | 201815196 | | 4/2018 |
| WO | WO 2005/029404 | A2 | 3/2005 |
| WO | WO 2006/023067 | A2 | 3/2006 |
| WO | WO 2008/069490 | A1 | 6/2008 |
| WO | WO 2017/127086 | | 7/2017 |
| WO | WO 2018/098230 | A1 | 5/2018 |
| WO | WO 2019/217835 | A1 | 11/2019 |

(56) References Cited

OTHER PUBLICATIONS

Fan et al., Static block floating-point quantization for convolutional neural networks on FPGA. 2019 International Conference on Field-Programmable Technology (ICFPT). IEEE, 2019.
Verhoef et al. Fq-conv:Fully quantized convolution for efficient and accurate inference. arXiv preprint arXiv:1912.09356 (2019).
PCT/US2021/061013, Jun. 15, 2023, International Preliminary Report on Patentability.
11202108799Q, Sep. 18, 2023, Singapore Search Report and Written Opinion.
TW 109106267, Jul. 14, 2023, Taiwan Office Action.
PCT/US19/32181, Sep. 23, 2019, International Search Report and Written Opinion.
PCT/US19/32181, Jul. 23, 2019, Invitation to Pay Additional Fees.
PCT/US2019/032272, Sep. 4, 2019, International Search Report and Written Opinion.
PCT/US2019/032272, Jun. 27, 2019, Invitation to Pay Additional Fees.
EP 20763126.8-1203, Oct. 31, 2022, Extended European Search Report.
PCT/US2020/019747, Jul. 2, 2020, International Search Report and Written Opinion.
PCT/US2020/019747, Sep. 10, 2021, International Preliminary Report on Patentability.
PCT/US2020/019747, APr. 30, 2020, Invitation to Pay Additional Fees.
PCT/US2021/061013, Mar. 25, 2022, International Search Report and Written Opinion.
PCT/US2015/034500, Mar. 15, 2016, International Search Report.
International Search Report and Written Opinion from International Application No. PCT/US2015/034500, dated Mar. 15, 2016, 7 pages.
International Search Report and Written Opinion for International Application No. PCT/US19/32181 mailed Sep. 23, 2019.
International Search Report and Written Opinion for International Application No. PCT/US2019/032272 mailed Sep. 4, 2019.
International Search Report and Written Opinion for International Application No. PCT/US2020/019747, mailed Jul. 2, 2020.
International Preliminary Report on Patentability for International Application No. PCT/US2020/019747, mailed Sep. 10, 2021.
International Search Report and Written Opinion mailed Mar. 25, 2022, in connection with International Application No. PCT/US2021/061013.
Invitation to Pay Additional Fees for International Application No. PCT/US19/32181 mailed Jul. 23, 2019.
Invitation to Pay Additional Fees for International Application No. PCT/US2019/032272 mailed Jun. 27, 2019.
Invitation to Pay Additional Fees for International Application No. PCT/US2020/019747 mailed Apr. 30, 2020.
Extended European Search Report mailed Oct. 31, 2022, in connection with European Application No. 20763126.8.
[No Author Listed], Optical Coherent Receiver Analysis. 2009 Optiwave Systems, Inc. 16 pages. URL:https://dru5cjyjifvrg.cloudfront.net/wp-content/uploads/2017/03/OptiSystem—Applications-Coherent-Receiver-Analysis.pdf [retrieved on Aug. 17, 2019].
[No Author Listed], Training with Mixed Precision. User Guide. Nvidia. Jan. 2020. 43 pages.
Aaronson et al., Computational complexity of linear optics. Proceedings of the 43rd Annual ACM Symposium on Theory of Computing. 2011. 101 pages. ISBN 978-1-4503-0691-1.
Abu-Mostafa et al., Optical neural computers. Scientific American. 1987:88-95.
Albert et al., Statistical mechanics of com-plex networks. Reviews of Modern Physics. 2002;(74):47-97.
Almeida et al., All-optical control of light on a silicon chip. Nature. 2004;431:1081-1084.
Amir et al., Classical diffusion of a quantum particle in a noisy environment. Physical Review E. 2009;79. 5 pages. DOI: 10.1103/PhysRevE.79.050105.
Amit et al., Spin-glass models of neural networks. Physical Review A. 1985;32(2):1007-1018.
Anitha et al., Comparative Study of High performance Braun's multiplier using FPGAs. IOSR Journal of Electronics and Communication Engineering (IOSRJECE). 2012;1:33-37.
Appeltant et al., Information processing using a single dynamical node as complex system. Nature Communications. 2011. 6 pages. DOI: 10.1038/ncomms1476.
Arjovsky et al., Unitary Evolution Recurrent Neural Networks. arXiv:1511.06464. 2016. 9 pages.
Aspuru-Guzik et al., Photonic quantum simulators. Nature Physics. 2012;8:285-291. DOI: 10.1038/NPHYS2253.
Aspuru-Guzik et al., Simulated Quantum Computation of Molecular Energies. Science. 2005;309:1704-7.
Atabaki et al., Integrating photonics with silicon nanoelectronics for the next generation of systems on a chip. Nature. 2018;556(7701):349-354. 10 pages. DOI: 10.1038/s41586-018-0028-z.
Baehr-Jones et al., A 25 GB/s Silicon Photonics Platform. arXiv:1203.0767. 2012. 11 pages.
Bao et al., Atomic-Layer Graphene as a Saturable Absorber for Ultrafast Pulsed Lasers. 24 pages. 2009.
Bao et al., Monolayer graphene as a saturable absorber in a mode-locked laser. Nano Research. 2011;4:297-307. DOI: 10.1007/s12274-010-0082-9.
Barahona, On the computational complexity of Ising spin glass models. Journal of Physics A: Mathematical and General. 1982;15:3241-3253.
Bertsimas et al., Robust optimization with simulated annealing. Journal of Global Optimization. 2010;48:323-334. DOI 10.1007/s10898-009-9496-x.
Bewick, Fast multiplication: algorithms and implementation. Ph.D. thesis, Stanford University (1994). 170 pages.
Bonneau et al., Quantum interference and manipulation of entanglement in silicon wire waveguide quantum circuits. New Journal of Physics. 2012;14:045003. 13 pages. DOI: 10.1088/1367-2630/14/4/045003.
Brilliantov, Effective magnetic Hamiltonian and Ginzburg criterion for fluids. Physical Review E. 1998;58:2628-2631.
Bromberg et al., Quantum and Classical Correlations in Waveguide Lattices. Physical Review Letters. 2009;102:253904-1-253904-4. 4 pages. DOI: 10.1103/PhysRevLett.102.253904.
Bromberg et alA15:A24., Bloch oscillations of path-entangled photons. Physical Review Letters. 2010;105:263604-1-2633604-4. 4 pages. DOI: 10.1103/PhysRevLett.105.263604.
Broome et al., Photonic Boson Sampling in a Tunable Circuit. Science. 2012;339:794-8.
Bruck et al., On the power of neural networks for solving hard problems. American Institute of Physics. 1988. pp 137-143. 7 pages.
Canziani et al., Evaluation of neural network architectures for embedded systems. Circuits and Systems (ISCAS). 2017 IEEE International Symposium. 4 pages.
Cardenas et al., Low loss etchless silicon photonic waveguides. Optics Express. 2009;17(6):4752-4757.
Centeno et al., Optical bistability in finite-size nonlinear bidimensional photonic crystals doped by a microcavity. Physical Review B. 2000;62(12):R7683-R7686.
Chan, Optical flow switching networks. Proceedings of the IEEE. 2012;100(5):1079-1091.
Chen et al., Compact, low-loss and low-power 8x8 broadband silicon optical switch. Optics Express. 2012;20(17):18977-18985.
Chen et al., DianNao: A small-footprint high-throughput accelerator for ubiquitous machine-learning. ACM Sigplan Notices. 2014;49:269-283.
Chen et al., Efficient photon pair sources based on silicon-on-insulator microresonators. Proc. of SPIE. 2010;7815. 10 pages.
Chen et al., Frequency-bin entangled comb of photon pairs from a Silicon-on-Insulator micro-resonator. Optics Express. 2011;19(2):1470-1483.
Chen et al., Universal method for constructing N-port nonblocking optical router based on 2×2 optical switch for photonic networks-on-chip. Optics Express. 2014;22(10);12614-12627. DOI: 10.1364/OE.22.012614.

(56) References Cited

OTHER PUBLICATIONS

Cheng et al., In-Plane Optical Absorption and Free Carrier Absorption in Graphene-on-Silicon Waveguides. IEEE Journal of Selected Topics in Quantum Electronics. 2014;20(1). 6 pages.
Chetlur et al., cuDNN: Efficient primitives for deep learning. arXiv preprint arXiv:1410.0759. 2014. 9 pages.
Childs et al., Spatial search by quantum walk. Physical Review A. 2004;70(2):022314. 11 pages.
Chung et al., A monolithically integrated large-scale optical phased array in silicon-on-insulator cmos. IEEE Journal of Solid-State Circuits. 2018;53:275-296.
Cincotti, Prospects on planar quantum computing. Journal of Lightwave Technology. 2009;27(24):5755-5766.
Clements et al., Optimal design for universal multiport interferometers. Optica. 2016;3(12):1460-1465.
Courbariaux et al., Training Deep Neural Networks with Low Precision Multiplications. arXiv:1412.7024v5. Sep. 23, 2015. 10 pages.
Crespi et al., Integrated multimode interferometers with arbitrary designs for photonic boson sampling. Nature Photonics. 2013;7:545-549. DOI: 10.1038/NPHOTON.2013.112.
Crespi, et al., Anderson localization of entangled photons in an integrated quantum walk. Nature Photonics. 2013;7:322-328. DOI: 10.1038/NPHOTON.2013.26.
Dai et al., Novel concept for ultracompact polarization splitter-rotator based on silicon nanowires. Optics Express. 2011;19(11):10940-9.
De Sa et al., High-Accuracy Low-Precision Training. arXiv:1803.03383v1. Mar. 9, 2018. 22 pages.
Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.
Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.
Esser et al., Convolutional networks for fast, energy-efficient neuromorphic computing. Proceedings of the National Academy of Sciences. 2016;113(41):11441-11446.
Farhat et al., Optical implementation of the Hopfield model. Applied Optics. 1985;24(10):1469-1475.
Feinberg et al., Making memristive neural network accelerators reliable. IEEE International Symposium on High Performance Computer Architecture (HPCA). 2018. pp. 52-65. DOI 10.1109/HPCA.2018.00015.
Fushman et al., Controlled Phase Shifts with a Single Quantum Dot. Science. 2008;320:769-772. DOI: 10.1126/science.1154643.
George et al., A programmable and configurable mixed-mode FPAA SoC. IEEE Transactions on Very Large Scale Integration (VLSI) Systems. 2016;24:2253-2261.
Gilmer et al., Neural message passing for quantum chemistry. arXiv preprint arXiv:1704.01212. Jun. 2017. 14 pages.
Golub et al., Calculating the singular values and pseudo-inverse of a matrix. Journal of the Society for Industrial and Applied Mathematics Series B Numerical Analysis. 1965;2(2):205-224.
Graves et al., Hybrid computing using a neural network with dynamic external memory. Nature. 2016;538. 21 pages. DOI:10.1038/nature20101.
Grote et al., First long-term application of squeezed states of light in a gravitational-wave observatory. Physical Review Letter. 2013;110:181101. 5 pages. DOI: 10.1103/PhysRevLett.110.181101.
Gruber et al., Planar-integrated optical vector-matrix multiplier. Applied Optics. 2000;39(29):5367-5373.
Gullans et al., Single-Photon Nonlinear Optics with Graphene Plasmons. Physical Review Letter. 2013;111:247401-1-247401-5. DOI: 10.1103/PhysRevLett.111.247401.
Gunn, CMOS photonics for high-speed interconnects. IEEE Micro. 2006;26:58-66.
Haffner et al., Low-loss plasmon-assisted electro-optic modulator. Nature. 2018;556:483-486. 17 pages. DOI: 10.1038/s41586-018-0031-4.
Halasz et al., Phase diagram of QCD. Physical Review D. 1998;58:096007. 11 pages.
Hamerly et al., Scaling advantages of all-to-all connectivity in physical annealers: the Coherent Ising Machine vs. D-Wave 2000Q. arXiv preprints, May 2018. 17 pages.
Harris et al. Efficient, Compact and Low Loss Thermo-Optic Phase Shifter in Silicon. Optics Express. 2014;22(9);10487-93. DOI:10.1364/OE.22.010487.
Harris et al., Bosonic transport simulations in a large-scale programmable nanophotonic processor. arXiv:1507.03406. 2015. 8 pages.
Harris et al., Integrated source of spectrally filtered correlated photons for large-scale quantum photonic systems. Physical Review X. 2014;4:041047. 10 pages. DOI: 10.1103/PhysRevX.4.041047.
Harris et al., Linear programmable nanophotonic processors. Optica. 2018;12(5):1623-1631.
Harris et al., Quantum transport simulations in a programmable nanophotonic processor. Nature Photonics. 2017;11:447-452. DOI: 10.1038/NPHOTON.2017.95.
Hinton et al., Reducing the dimensionality of data with neural networks. Science. 2006;313:504-507.
Hochberg et al., Silicon Photonics: The Next Fabless Semiconductor Industry. IEEE Solid-State Circuits Magazine. 2013. pp 48-58. DOI: 10.1109/MSSC.2012.2232791.
Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.
Hong et al., Measurement of subpicosecond time intervals between two photons by interference. Physical Review Letters. 1987;59(18):2044-2046.
Hopfield et al., Neural computation of decisions in optimization problems. Biological Cybernetics. 1985;52;141-152.
Hopfield, Neural networks and physical systems with emergent collective computational abilities. PNAS. 1982;79:2554-2558. DOI: 10.1073/pnas.79.8.2554.
Horowitz, Computing's energy problem (and what we can do about it). Solid-State Circuits Conference Digest of Technical Papers (ISSCC), 2014 IEEE International. 5 pages.
Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.
Huang et al., Evaluation of an Analog Accelerator for Linear Algebra. 43rd ACM/IEEE Annual International Symposium on Computer Architecture. 2016. 13 pages. Doi: 10.1109/ISCA.2016.56.
Humphreys et al., Linear Optical Quantum Computing in a Single Spatial Mode. Physical Review Letters. 2013;111:150501. 5 pages. DOI: 10.1103/PhysRevLett.111.150501.
Inagaki et al., Large-scale ising spin network based on degenerate optical parametric oscillators. Nature Photonics. 2016;10:415-419. 6 pages. DOI: 10.1038/NPHOTON.2016.68.
Isichenko, Percolation, statistical topography, and trans-port in random media. Reviews of Modern Physics. 1992;64(4):961-1043.
Jaekel et al., Quantum limits in interferometric measurements. Europhysics Letters. 1990;13(4):301-306.
Jalali et al., Silicon Photonics. Journal of Lightwave Technology. 2006;24(12):4600-15. DOI: 10.1109/JLT.2006.885782.
Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.
Jiang et al., A planar ion trapping microdevice with integrated waveguides for optical detection. Optics Express. 2011;19(4):3037-43.
Jonsson, An empirical approach to finding energy efficient ADC architectures. 2011 International Workshop on ADC Modelling, Testing and Data Converter Analysis and Design and IEEE 2011 ADC Forum. 6 pages.

(56) References Cited

OTHER PUBLICATIONS

Jouppi et al., In-datacenter performance analysis of a tensor processing unit. Proceeding of Computer Architecture (ISCA). Jun. 2017. 12 pages. URL:https://doi.org/10.1145/3079856.3080246.
Kahn et al., Communications expands its space. Nature Photonics. 2017;11:5-8.
Kardar et al., Dynamic Scaling of Growing Interfaces. Physical Review Letters. 1986;56(9):889-892.
Karpathy, CS231n Convolutional Neural Networks for Visual Recognition. Class notes. 2019. URL:http://cs231n.github.io/ 2 pages. [last accessed Sep. 24, 2019].
Kartalopoulos, Part III Coding Optical Information. Introduction to DWDM Technology. IEEE Press. 2000. pp. 165-166.
Keckler et al., GPUs and the future of parallel computing. IEEE Micro. 2011;31:7-17. DOI: 10.1109/MM.2011.89.
Kieling et al., On photonic Controlled Phase Gates. New Journal of Physics. 2010; 12:0133003. 17 pages. DOI: 10.1088/1367-2630/12/1/013003.
Kilper et al., Optical networks come of age. Optics Photonics News. 2014;25:50-57. DOI: 10.1364/OPN.25.9.000050.
Kim et al., A functional hybrid memristor crossbar-array/cmos system for data storage and neuromorphic applications. Nano Letters. 2011;12:389-395.
Kirkpatrick et al., Optimization by simulated annealing. Science. 1983;220(4598):671-680.
Knill et al., A scheme for efficient quantum computation with linear optics. Nature. 2001;409(4652):46-52.
Knill et al., The Bayesian brain: the role of uncertainty in neural coding and computation. Trends in Neurosciences. 2004;27(12):712-719.
Knill, Quantum computing with realistically noisy devices. Nature. 2005;434:39-44.
Kok et al., Linear optical quantum computing with photonic qubits. Reviews of Modern Physics. 2007;79(1):135-174.
Koos et al., Silicon-organic hybrid (SOH) and plasmonic-organic hybrid (POH) integration. Journal of Lightwave Technology. 2016;34(2):256-268.
Koster et al., Flexpoint: An Adaptive Numerical Format for Efficient Training of Deep Neural Networks. arXiv:1711.02213v2. Dec. 5, 2017. 14 pages.
Krizhevsky et al., ImageNet classification with deep convolutional neural networks. Advances in Neural Information Processing Systems (NIPS). 2012. 9 pages.
Kucherenko et al., Application of Deterministic Low-Discrepancy Sequences in Global Optimization. Computational Optimization and Applications. 2005;30:297-318.
Kwack et al., Monolithic InP strictly non-blocking 8x8 switch for high-speed WDM optical interconnection. Optics Express. 2012;20(27):28734-41.
Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.
Lahini et al., Quantum Correlations in Two-Particle Anderson Localization. Physical Review Letters. 2010;105:163905. 4 pages. DOI: 10.1103/PhysRevLett.105.163905.
Laing et al., High-fidelity operation of quantum photonic circuits. Applied Physics Letters. 2010;97:211109. 5 pages. DOI: 10.1063/1.3497087.
Landauer, Irreversibility and heat generation in the computing process. IBM Journal of Research and Development. 1961. pp. 183-191.
Lanyon et al., Towards quantum chemistry on a quantum computer. Nature Chemistry. 2010;2:106-10. DOI: 10.1038/NCHEM.483.
Lawson et al., Basic linear algebra subprograms for Fortran usage. ACM Transactions on Mathematical Software (TOMS). 1979;5(3):308-323.
Lecun et al., Deep learning. Nature. 2015;521:436-444. DOI: 10.1038/nature14539.
Lecun et al., Gradient-based learning applied to document recognition. Proceedings of the IEEE. Nov. 1998. 46 pages.
Levi et al., Hyper-transport of light and stochastic acceleration by evolving disorder. Nature Physics. 2012;8:912-7. DOI: 10.1038/NPHYS2463.
Li et al., Efficient and self-adaptive in-situ learning in multilayer memristor neural networks. Nature Communications. 2018;9:2385. 8 pages. doi: 10.1038/s41467-018-04484-2.
Lin et al., All-optical machine learning using diffractive deep neural networks. Science. 2018;361:1004-1008. 6 pages. doi: 10.1126/science.aat8084.
Little, The existence of persistent states in the brain. Mathematical Biosciences. 1974;19:101-120.
Liu et al., Towards 1-Tb/s Per-Channel Optical Transmission Based on Multi-Carrier Modulation. 19th Annual Wireless and Optical Communications Conference. May 2010. 4 pages. DOI: 10.1109/WOCC.2010.5510630.
Lu et al., 16 × 16 non-blocking silicon optical switch based on electro-optic Mach-Zehnder interferometers. Optics Express. 2016:24(9):9295-9307. doi: 10.1364/OE.24.009295.
Ma et al., Optical switching technology comparison: Optical mems vs. Other technologies. IEEE Optical Communications. 2003;41(11):S16-S23.
Macready et al., Criticality and Parallelism in Combinatorial Optimization. Science. 1996;271:56-59.
Marandi et al., Network of time-multiplexed optical parametric oscillators as a coherent Ising machine. Nature Photonics. 2014;8:937-942. doi: 10.1038/NPHOTON.2014.249.
Martin-Lopez et al., Experimental realization of Shor's quantum factoring algorithm using qubit recycling. Nature Photonics. 2012;6:773-6. DOI: 10.1038/NPHOTON.2012.259.
Mcmahon et al., A fully programmable 100-spin coherent Ising machine with all-to-all connections. Science. 2016;354(6312):614-7. DOI: 10.1126/science.aah5178.
Mead, Neuromorphic electronic systems. Proceedings of the IEEE. 1990;78(10):1629-1636.
Migdall et al., Tailoring single-photon and multiphoton probabilities of a single-photon on-demand source. Physical Review A. 2002;66:053805. 4 pages. DOI: 10.1103/PhysRevA.66.053805.
Mikkelsen et al., Dimensional variation tolerant silicon-on-insulator directional couplers. Optics Express. 2014;22(3):3145-50. DOI:10.1364/OE.22.003145.
Miller, Are optical transistors the logical next step? Nature Photonics. 2010;4:3-5.
Miller, Attojoule optoelectronics for low-energy information processing and communications. Journal of Lightwave Technology. 2017;35(3):346-96. DOI: 10.1109/JLT.2017.2647779.
Miller, Energy consumption in optical modulators for interconnects. Optics Express. 2012;20(S2):A293-A308.
Miller, Perfect optics with imperfect components. Optica. 2015;2(8):747-750.
Miller, Reconfigurable add-drop multiplexer for spatial modes. Optics Express. 2013;21(17):20220-9. DOI:10.1364/OE.21.020220.
Miller, Self-aligning universal beam coupler, Optics Express. 2013;21(5):6360-70.
Miller, Self-configuring universal linear optical component [Invited]. Photonics Research. 2013;1(1):1-15. URL:http://dx.doi.org/10.1364/PRJ.1.000001.
Misra et al., Artificial neural networks in hardware: A survey of two decades of progress. Neurocomputing. 2010;74:239-255.
Mohseni et al., Environment-assisted quantum walks in photosynthetic complexes. The Journal of Chemical Physics. 2008;129:174106. 10 pages. DOI: 10.1063/1.3002335.
Moore, Cramming more components onto integrated circuits. Proceeding of the IEEE. 1998;86(1):82-5.
Mower et al., Efficient generation of single and entangled photons on a silicon photonic integrated chip. Physical Review A. 2011;84:052326. 7 pages. DOI: 10.1103/PhysRevA.84.052326.
Mower et al., High-fidelity quantum state evolution in imperfect photonic integrated circuits. Physical Review A. 2015;92(3):032322. 7 pages. doi: 10.1103/PhysRevA.92.032322.

(56) References Cited

OTHER PUBLICATIONS

Nagamatsu et al., A 15 NS 32×32-bit CMOS multiplier with an improved parallel structure. IEEE Custom Integrated Circuits Conference. 1989. 4 pages.
Najafi et al., On-Chip Detection of Entangled Photons by Scalable Integration of Single-Photon Detectors. arXiv:1405.4244. May 16, 2014. 27 pages.
Najafi et al., On-Chip detection of non-classical light by scalable integration of single-photon detectors. Nature Communications. 2015;6:5873. 8 pages. DOI: 10.1038/ncomms6873.
Naruse, Nanophotonic Information Physics. Nanointelligence and Nanophotonic Computing. Springer. 2014. 261 pages. DOI 10.1007/978-3-642-40224-1.
Nozaki et al., Sub-femtojoule all-optical switching using a photonic-crystal nanocavity. Nature Photonics. 2010;4:477-483. doi: 10.1038/NPHOTON.2010.89.
O'Brien et al., Demonstration of an all-optical quantum controlled-NOT gate. Nature. 2003;426:264-7.
Onsager, Crystal Statistics. I. A Two-Dimensional Model with an Order-Disorder Transition. Physical Review. 1944;65(3,4):117-149.
Orcutt et al., Nanophotonic integration in state-of-the-art CMOS foundries. Optics Express. 2011;19(3):2335-46.
Pelissetto et al., Critical phenomena and renormalization-group theory. Physics Reports. Apr. 2002. 150 pages.
Peng, Implementation of AlexNet with Tensorflow. https://github.com/ykpengba/AlexNet-A-Practical-Implementation. 2018. 2 pages. [last accessed Sep. 24, 2019].
Peretto, Collective properties of neural networks: A statistical physics approach. Biological Cybernetics. 1984;50:51-62.
Pernice et al., High-speed and high-efficiency travelling wave single-photon detectors embedded in nanophotonic circuits. Nature Communications 2012;3:1325. 10 pages. DOI: 10.1038/ncomms2307.
Peruzzo et al., Quantum walk of correlated photons. Science. 2010;329;1500-3. DOI: 10.1126/science.1193515.
Politi et al., Integrated Quantum Photonics, IEEE Journal of Selected Topics in Quantum Electronics, 2009;5(6):1-12. DOI: 10.1109/JSTQE.2009.2026060.
Politi et al., Silica-on-Silicon Waveguide Quantum Circuits. Science. 2008;320:646-9. DOI: 10.1126/science.1155441.
Poon et al., Neuromorphic silicon neurons and large-scale neural networks: challenges and opportunities. Frontiers in Neuroscience. 2011;5:1-3. doi: 10.3389/fnins.2011.00108.
Prucnal et al., Recent progress in semiconductor excitable lasers for photonic spike processing. Advances in Optics and Photonics. 2016;8(2):228-299.
Psaltis et al., Holography in artificial neural networks. Nature. 1990;343:325-330.
Qiao et al., 16×16 non-blocking silicon electro-optic switch based on mach zehnder interferometers. Optical Fiber Communication Conference. Optical Society of America. 2016. 3 pages.
Ralph et al., Linear optical controlled-NOT gate in the coincidence basis. Physical Review A. 2002;65:062324-1-062324-5. DOI: 10.1103/PhysRevA.65.062324.
Ramanitra et al., Scalable and multi-service passive optical access infrastructure using variable optical splitters. Optical Fiber Communication Conference. Optical Society of America. 2005. 3 pages.
Raussendorf et al., A one-way quantum computer. Physical Review Letter. 2001;86(22):5188-91. DOI: 10.1103/PhysRevLett.86.5188.
Rechtsman et al., Photonic floquet topological insulators. Nature. 2013;496:196-200. doi: 10.1038/nature12066.
Reck et al., Experimental realization of any discrete unitary operator. Physical review letters. 1994;73(1):58-61. 6 pages.
Reed et al., Silicon optical modulators. Nature Photonics. 2010;4:518-26. DOI: 10.1038/NPHOTON.2010.179.
Rekhi et al., Analog/Mixed-Signal Hardware Error Modeling for Deep Learning Inference. 56th ACM/IEEE Design Automation Conference (DAC). 2019. 6 pages. doi: 10.1145/3316781.3317770.
Rendl et al., Solving Max-Cut to optimality by intersecting semidefinite and polyhedral relaxations. Mathematical Programming. 2010;121:307-335. doi: 10.1007/s10107-008-0235-8.
Rios et al., Integrated all-photonic non-volatile multilevel memory. Nature Photonics. 2015;9:725-732. doi: 10.1038/NPHOTON.2015.182.
Rogalski, Progress in focal plane array technologies. Progress in Quantum Electronics. 2012;36:342-473.
Rohit et al., 8×8 space and wavelength selective cross-connect for simultaneous dynamic multi-wavelength routing. Optical Fiber Communication Conference. OFC/NFOEC Technical Digest. 2013. 3 pages.
Rosenblatt, The perceptron: a probabilistic model for information storage and organization in the brain. Psychological Review. 1958;65(6):386-408.
Russakovsky et al., ImageNet Large Scale Visual Recognition Challenge. arXiv:1409.0575v3. Jan. 2015. 43 pages.
Saade et al., Random projections through multiple optical scattering: Approximating Kernels at the speed of light. arXiv:1510.06664v2. Oct. 25, 2015. 6 pages.
Salandrino et al., Analysis of a three-core adiabatic directional coupler. Optics Communications. 2009;282:4524-6. doi: 10.1016/j.optcom.2009.08.025.
Savich et al., A Low-Power Scalable Stream Compute Accelerator for General Matrix Multiply (GEMM). VLSI Design. 2014. 12 pages. doi: 10.1155/2014/712085.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997;14(11):2865-8.
Schmidhuber, Deep learning in neural networks: An overview. Neural Networks. 2015;61:85-117.
Schreiber et al., Decoherence and Disorder in Quantum Walks: From Ballistic Spread to Localization. Physical Review Letters. 2011;106:180403. 4 pages. DOI: 10.1103/PhysRevLett.106.180403.
Schwartz et al., Transport and Anderson localization in disordered two-dimensional photonic lattices. Nature. 2007;446:52-5. doi: 10.1038/nature05623.
Selden, Pulse transmission through a saturable absorber. British Journal of Applied Physics. 1967;18:743-8.
Shafiee et al., ISAAC: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. DOI: 10.1038/NPHOTON.2017.93.
Shoji et al., Low-crosstalk 2x2 thermo-optic switch with silicon wire waveguides. Optics Express.2010;18(9):9071-5.
Silver et al. Mastering chess and shogi by self-play with a general reinforcement learning algorithm. arXiv preprint arXiv:1712.01815. 19 pages. 2017.
Silver et al., Mastering the game of go with deep neural networks and tree search. Nature. 2016;529:484-9. 20 pages. doi:10.1038/nature16961.
Silver et al., Mastering the game of Go without human knowledge. Nature. 2017;550:354-9. 18 pages. doi:10.1038/nature24270.
Silverstone et al., On-chip quantum interference between silicon photon-pair sources. Nature Photonics. 2014;8:104-8. DOI: 10.1038/NPHOTON.2013.339.
Smith et al., Phase-controlled integrated photonic quantum circuits. Optics Express. 2009;17(16):13516-25.
Soljacic et al., Optimal bistable switching in nonlinear photonic crystals. Physical Review E. 2002;66:055601. 4 pages.
Solli et al., Analog optical computing. Nature Photonics. 2015;9:704-6.
Spring et al., Boson sampling on a photonic chip. Science. 2013;339:798-801. DOI: 10.1126/science.1231692.
Srinivasan et al., 56 GB/s germanium waveguide electro-absorption modulator. Journal of Lightwave Technology. 2016;34(2):419-24. DOI: 10.1109/JLT.2015.2478601.

(56) References Cited

OTHER PUBLICATIONS

Steinkraus et al., Using GPUs for machine learning algorithms. Proceedings of the 2005 Eight International Conference on Document Analysis and Recognition. 2005. 6 pages.
Su et al., Hybrid spatiotemporal architectures for universal linear optics. arXiv:1812.07939v2. Jun. 3, 2019. 8 pages.
Suda et al., Quantum interference of photons in simple networks. Quantum Information Process. 2013;12:1915-45. DOI 10.1007/s11128-012-0479-3.
Sun et al., Large-scale nanophotonic phased array. Nature. 2013;493:195-9. doi:10.1038/nature11727.
Sun et al., Single-chip microprocessor that communicates directly using light. Nature. 2015;528:534-8. doi:10.1038/nature16454.
Suzuki et al., Ultra-compact 8x8 strictly-non-blocking Si-wire PILOSS switch. Optics Express. 2014;22(4):3887-94. DOI:10.1364/OE.22.003887.
Sze et al., Efficient processing of deep neural networks: A tutorial and survey. Proceedings of the IEEE. 2017;105(12):2295-2329. DOI: 10.1109/JPROC.2017.276174.
Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.
Tait et al., Broadcast and weight: An integrated network for scalable photonic spike processing. Journal of Lightwave Technology. 2014;32(21):3427-39. DOI: 10.1109/JLT.2014.2345652.
Tait et al., Chapter 8 Photonic Neuromorphic Signal Processing and Computing. Springer, Berlin, Heidelberg. 2014. pp. 183-222.
Tait et al., Neuromorphic photonic networks using silicon photonic weight banks. Scientific Reports. 2017;7:7430. 10 pages.
Tanabe et al., Fast bistable all-optical switch and memory on a silicon photonic crystal on-chip. Optics Letters. 2005;30(19):2575-7.
Tanizawa et al., Ultra-compact 32×32 strictly-non-blocking Si-wire optical switch with fan-out LGA interposer. Optics Express. 2015;23(13):17599-606. DOI:10.1364/OE.23.017599.
Thompson et al., Integrated waveguide circuits for optical quantum computing. IET Circuits, Devices, & Systems. 2011;5(2):94-102. doi: 10.1049/iet-cds.2010.0108.
Timurdogan et al., An ultralow power athermal silicon modulator. Nature Communications. 2014;5:4008. 11 pages. DOI: 10.1038/ncomms5008.
Vandoorne et al., Experimental demonstration of reservoir computing on a silicon photonics chip. Nature Communications. 2014;5:3541. 6 pages. DOI: 10.1038/ncomms4541.
Vazquez et al., Optical NP problem solver on laser-written waveguide plat-form. Optics Express. 2018;26(2):702-10.
Vivien et al., Zero-bias 40gbit/s germanium waveguide photodetector on silicon. Optics Express. 2012;20(2):1096-1101.
Wang et al., Coherent Ising machine based on degenerate optical parametric oscillators. Physical Review A. 2013;88:063853. 9 pages. DOI: 10.1103/PhysRevA.88.063853.
Wang et al., Deep learning for identifying metastatic breast cancer. arXiv preprint arXiv:1606.05718. Jun. 18, 2016. 6 pages.
Werbos, Beyond regression: New tools for prediction and analysis in the behavioral sciences. Ph.D. dissertation, Harvard University. Aug. 1974. 454 pages.
Whitfield et al., Simulation of electronic structure Hamiltonians using quantum computers. Molecular Physics. 2010;109(5,10):735-50. DOI: 10.1080/00268976.2011.552441.
Wu et al., An optical fiber network oracle for NP-complete problems. Light: Science & Applications. 2014;3: e147. 5 pages. doi: 10.1038/lsa.2014.28.
Xia et al., Mode conversion losses in silicon-on-insulator photonic wire based racetrack resonators. Optics Express. 2006;14(9):3872-86.
Xu et al., Experimental observations of bistability and instability in a two-dimensional nonlinear optical superlattice. Physical Review Letters. 1993;71(24):3959-62.
Yang et al., Non-Blocking 4x4 Electro-Optic Silicon Switch for On-Chip Photonic Networks. Optics Express 2011;19(1):47-54.
Yao et al., Serial-parallel multipliers. Proceedings of 27th Asilomar Conference on Signals, Systems and Computers. 1993. pp. 359-363.
Young et al., Recent trends in deep learning based natural language processing. IEEE Computational Intelligence Magazine. arXiv:1708.02709v8. Nov. 2018. 32 pages.
Zhou et al., Calculating Unknown Eigenvalues with a Quantum Algorithm. Nature Photonics. 2013;7:223-8. DOI: 10.1038/NPHOTON.2012.360.
International Preliminary Report on Patentability for International Application No. PCT/US2021/061013, dated Jun. 15, 2023.
Singapore Search Report and Written Opinion dated Sep. 18, 2023, in connection with Singapore Application No. 1120210799Q.
Taiwan Office Action dated Jul. 14, 2023, in connection with Taiwan Application No. 109106267.
Alspecter et al., A parallel gradient descent method for learning in analog VLSI neural networks. Advances in neural information processing systems. 1992;5:836-44.
Dai et al., VS-Quant: Per-vector Scaled Quantization for Accurate Low-Precision Neural Network Inference. arXiv preprint arXiv:2102.04503. Feb. 8, 2021. 12 pages.
Frerix et al., Homogeneous Linear Inequality Constraints for Neural Network Activations. In2020 IEEE/CVF Conference on Computer Vision and Pattern Recognition Workshops (CVPRW). Jun. 14, 2020:3229-34.
Lasserre, Why the logarithmic barrier function in convex and linear programming ?. Operations Research Letters. Nov. 1, 2000;27(4):149-52.

* cited by examiner

TECHNIQUES OF PERFORMING OPERATIONS USING A HYBRID ANALOG-DIGITAL PROCESSOR

CROSS-REFERENCE TO RELATED APPLICATIONS

This application claims the benefit of U.S. Provisional Application Ser. No. 63/287,219, filed on Dec. 8, 2021, and entitled "ACCURACY OF ANALOG LINEAR PROCESSOR," which is incorporated by reference herein in its entirety.

FIELD

Described herein are techniques of performing operations (e.g., matrix operations) using a hybrid analog-digital processor more efficiently. More specifically, the techniques allow the hybrid analog-digital processor to reduce the amount of memory used by the hybrid analog-digital processor in performing operations and storing values. Some embodiments provide more efficient training of a machine learning model and/or inference using the machine learning model.

BACKGROUND

A hybrid analog-digital processor may be used to perform various operations. The hybrid analog-digital processor may include analog processing components that operate in an analog domain and digital processing components that operate in a digital domain. The hybrid analog-digital processor may perform an operation using both the analog processing components and the digital processing components. For example, the hybrid analog-digital processor may use the analog processing components and the digital processing components to perform a matrix operation such as a matrix multiplication between two matrices.

The hybrid analog-digital processor may transfer values between the analog and digital processing components as part of performing an operation. The digital processing components of a hybrid analog-digital processor may use a floating point number format to represent numbers while the analog processing components may use a fixed point number format to represent numbers. Transferring a number from a digital domain of the hybrid analog-digital processor to an analog domain of the hybrid analog-digital processor may involve transforming a number from a floating point number format to a fixed point number format. Likewise, transferring a number from the analog domain to the digital domain may involve transforming the number from a fixed point representation to a floating point representation.

BRIEF SUMMARY

Described herein are techniques of performing operations using a hybrid analog-digital processor that reduce the amount memory used in performing the operations. The techniques allow use of low bit number formats that represent a number using less than 32 bits to be used in storing values and performing operations. Low bit number formats use less memory to store digital values and allow computations involving numbers encoded in the number format to be performed more efficiently (e.g., with less latency and using less power and memory) than high bit number formats. The techniques allow use of low bit number formats (e.g., in training a machine learning model) without a significant loss in performance relative to high bit number formats.

According to some embodiments, a method of using a hybrid analog-digital processor to perform matrix operations is provided. The hybrid analog-digital processor comprises a digital controller and an analog processor. The hybrid analog-digital processor is configured to store digital values in memory encoded in a number format that uses less than 32 bits to represent a number. The method comprises: performing, using the analog processor, a matrix operation to obtain at least one output, the at least one output encoded in the number format; determining, using the at least one output, an unbiased estimate of a matrix operation result; and storing, in the memory, the unbiased estimate of the matrix operation result encoded in the number format.

According to some embodiments, a system is provided. The system comprises: a hybrid analog-digital processor. The hybrid analog-digital processor comprises a digital controller; an analog processor; and memory configured to store digital values encoded in a number format that uses less than 32 bits to represent a number. The hybrid analog-digital processor is configured to: perform, using the analog processor, a matrix operation to obtain at least one output, the at least one output encoded in the number format; determine, using the at least one output, an unbiased estimate of a matrix operation result; and store, in the memory, the unbiased estimate of the matrix operation result encoded in the number format.

According to some embodiments, a non-transitory computer-readable storage medium storing instructions is provided. The instructions, when executed by a hybrid analog-digital processor, cause the hybrid analog-digital processor to perform a method of performing matrix operations. The hybrid analog-digital processor comprises a digital controller and an analog processor. The hybrid analog-digital processor is configured to store digital values in memory encoded in a number format that uses less than 32 bits to represent a number. The method comprises: performing, using the analog processor, a matrix operation to obtain at least one output, the at least one output encoded in the number format; determining, using the at least one output, an unbiased estimate of a matrix operation result; and storing, in the memory, the unbiased estimate of the matrix operation result encoded in the number format.

The foregoing summary is non-limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
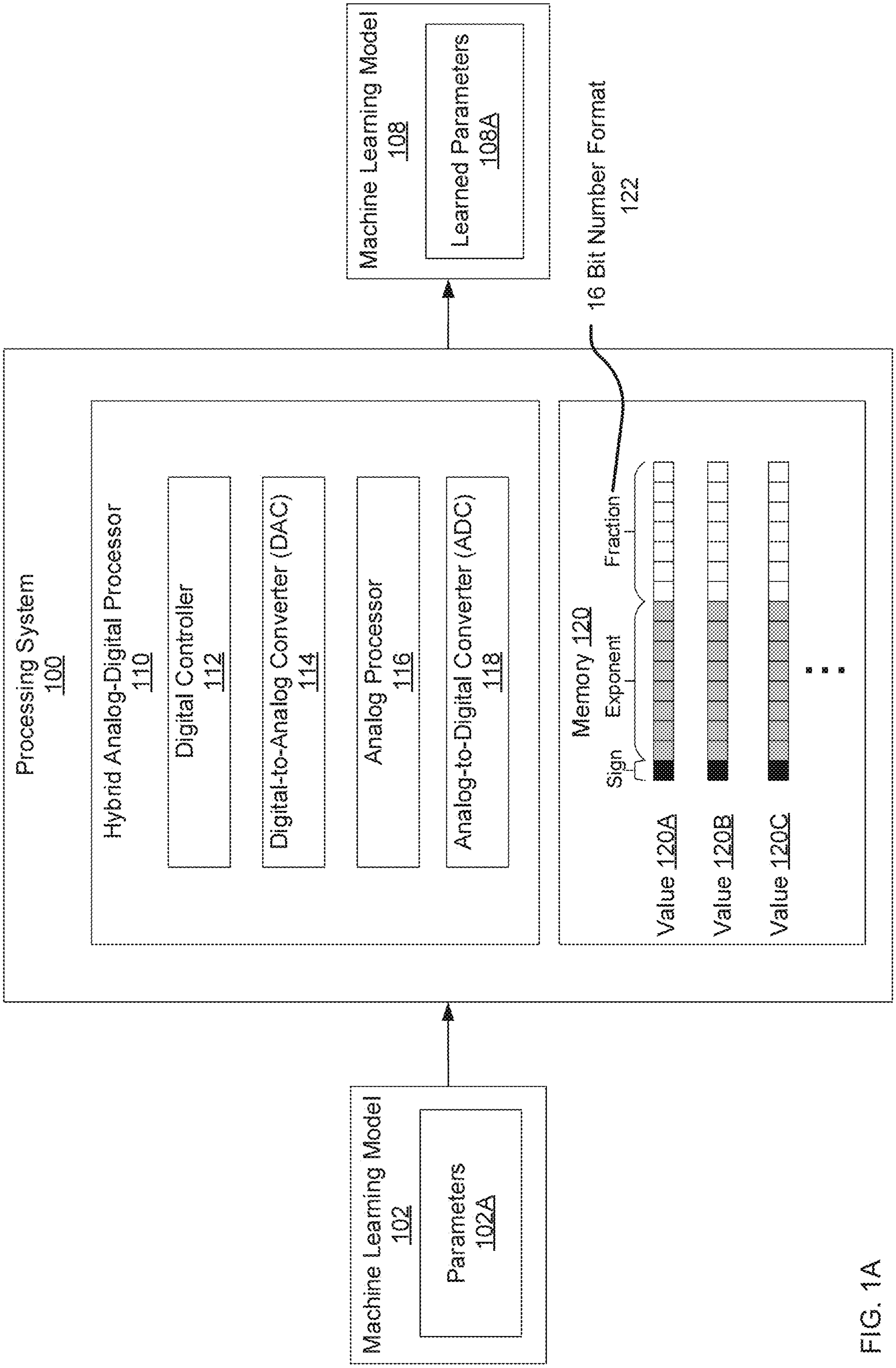
FIG. 1A is an example hybrid analog-digital processing system, according to some embodiments of the technology described herein.

Described herein are techniques of performing operations (e.g., matrix operations) using a hybrid analog-digital processor that allow the hybrid analog-digital processor to encode digital values in memory using number formats that use less than 32 bits to represent a number. Some embodiments employ the techniques to more efficiently train a machine learning model and/or perform inference using a machine learning model.

A hybrid analog-digital processor may include an analog processor and a digital controller that interfaces with the analog processor. The analog processor may be capable of performing operations more efficiently than the digital controller. For example, the analog processor may utilize less power to perform an operation and/or perform the operation more quickly. The hybrid analog-digital processor may use the analog processor to perform operations to take advantage of the efficiency of the analog processor. For example, the digital controller may use the analog processor to perform matrix operations (e.g., matrix multiplications).

An analog processor typically uses a fixed point number format to represent numbers. By contrast, a digital controller may use a floating point number format to represent numbers. To perform an operation using its analog processor, a hybrid analog-digital processor converts numbers from a floating point number format in a digital domain to a fixed point number format of the analog processor. The analog processor may then perform the operation using the numbers in the fixed point number format. The hybrid analog-digital processor then obtains a result of the operation and converts it to the original floating point number format in the digital domain.

Certain operations require storing a high level of precision for values involved in the operations. For example, operations involved in training a machine learning model and/or performing inference with a machine learning model may require storing a high level of precision for values to maximize the performance of the machine learning model. Parameters (e.g., weights) of the machine learning model and parameter gradients determined in training may require a high level of precision to maximize performance (e.g., accuracy) of the machine learning model in making predictions. Accordingly, conventional digital processing components typically employ number formats that use a large number of bits (e.g., 32 or more bits) to represent number. For example, the conventional digital processing components may use a 32-bit floating point number format to encode numbers of machine learning model parameters and parameter gradients.

The inventors have recognized that operations can be performed by a hybrid analog-digital processor more efficiently if a hybrid analog-digital processor were to encode digital values in memory using a number format that represents a number with a smaller number of bits. A number format that uses less than 32 bits to represent a number may also be referred to herein as a "low bit number format". This would allow the hybrid analog-digital processor to use fewer memory resources, and to perform operations in its digital domain using less power and with lower latency. Further, a low bit number format would allow the hybrid analog-digital processor to transfer values between its analog and digital domains more efficiently given the reduced amount of data that needs to be transferred. The transfers would consume less power and would be performed more quickly relative to high bit number formats.

However, low bit number formats are not suitable for certain applications because of the loss in precision that results from encoding values using such number formats. For example, as discussed above, training a machine learning model and/or performing inference with a machine learning model typically requires representing numbers with high precision to maximize performance of the machine learning model. As such, conventional techniques generally encode values (e.g., machine learning model parameters and inputs) in high bit number formats to maximize performance. Some techniques may use a mixed precision mode in which certain values are encoded in a low bit number format while others are still encoded in a high bit number format. For example, a system may store neural network activations and their gradients in a low bit number format (e.g., BFLOAT16, FP16, or FP8), while encoding weights and their gradients in a high bit number format (e.g. FP32 or FP64). However, these techniques still employ a high bit number format for performing operations. Moreover, conventional techniques are limited to high bit number formats for accumulation operations such as summations of multiple values. Thus, conventional techniques are unable to take advantage of the potential efficiency in processing by using a low bit number format to encode values.

To address the above-described shortcomings in conventional techniques, the inventors have developed techniques of performing an operation using a hybrid analog-digital processor that allow use of low bit number formats to represent all values involved in the operation. For example, the techniques allow weights and activations of a machine learning model as well as their gradients to be encoded using a low bit number format. As another example, the techniques allow reduction operations to be performed using a low bit number format. The techniques enable use of a low bit number format while mitigating effects of the loss in precision resulting from encoding values in the low bit number format. The techniques described herein may allow performance of operations performed using a low bit number format to approach performance of operations performed using a high bit number format. For example, techniques described herein may allow machine learning model training and inference performance performed using a low bit number format (e.g., BFLOAT16) to be within 2% of training and inference performance using a high bit number format (e.g., FP32).

The techniques allow a hybrid analog-digital processor to use low bit number formats to encode values and thus allow the hybrid analog-digital processor to perform operations more efficiently. The hybrid analog-digital processor may use less memory, while performing operations more quickly and with lower latency. Moreover, the hybrid analog-digital processor may transfer values between its analog and digital domains more efficiently (e.g., more quickly and consuming less power).

According to some embodiments, a hybrid analog-digital processor comprising of an analog processor and a digital controller may be configured to store digital values in memory encoded in a number format that uses less than 32 bits to represent a number (i.e., a low bit number format). The hybrid analog-digital processor may use the low bit number format to perform operations such as matrix operations (e.g., matrix multiplications, matrix additions, matrix subtractions, and/or other matrix operations). The hybrid analog-digital processor may use its analog processor to perform an operation to obtain one or more outputs. The hybrid analog-digital processor may use the output(s) to determine an operation result encoded in the low bit number format. The hybrid analog digital processor may determine the operation result encoded in the low bit number format by: (1) determining, using the output(s), an unbiased estimate of the operation result; and (2) storing the unbiased estimate of the operation result encoded in the low bit number format. Some embodiments may encode all values involved in determining an operation result in the low bit number format.

Examples of low bit number formats include FP8, FP16, BFLOAT16, and/or other low bit number formats. Some embodiments described herein are not limited to a particular low bit format. In some embodiments, techniques described herein may also be used with high bit number formats to improve performance of operations performed using those formats. For example, techniques described herein may be used with FP32, FP64, or another high bit number format to improve performance of operations (e.g., matrix operations) using the number format.

Some embodiments provide techniques of using a hybrid-analog digital processor to perform matrix operations. The hybrid analog-digital processor comprises a digital controller and an analog processor. The hybrid analog-digital processor may be configured to store digital values in memory encoded in a number format that uses less than 32 bits to represent a number (e.g., FP8, FP16, BFLOAT16, or other low bit number format). The techniques involve performing, using the analog processor, a matrix operation (e.g., a matrix multiplication) to obtain one or more outputs. The output(s) may be encoded in the number format. The techniques further (1) determine, using the output(s), an unbiased estimate of a matrix operation result; and (2) store, in the memory, the unbiased estimate of the matrix operation result encoded in the number format.

In some embodiments, determining the unbiased estimate of the matrix operation result may comprise: (1) determining, using the output(s), the matrix operation result; and (2) stochastically rounding the matrix operation result to obtain the unbiased estimate of the matrix operation result.

In some embodiments, the output(s) may comprise of multiple outputs (e.g., partial results of multiple matrix operations performed using portions of one or more matrices involved in the matrix operation). The multiple outputs may be encoded in the number format. Determining the unbiased estimate of the matrix operation result may comprise: (1) determining an accumulation of the multiple outputs, where the accumulation is encoded in the number format; and (2) determining the unbiased estimate of the matrix operation result using the accumulation of the multiple outputs. In some embodiments, determining the accumulation of the multiple outputs may comprise determining a compensated summation of the multiple outputs. In some embodiments, determining the accumulation of the multiple outputs may comprises determining a naive summation of the multiple outputs.

In some embodiments, determining the unbiased estimate of the matrix operation result may comprise determining, using the output(s), the unbiased estimate of the matrix operation result based on a probability distribution (e.g., a Gaussian distribution, a uniform distribution, or other distribution) modeling noise of the analog processor. In some embodiments, the probability distribution may be obtained by obtaining noise samples from operations performed using the analog processor and generating the probability distribution using the noise samples.

In some embodiments, the matrix operation may be performed as part of training a machine learning model (e.g., a neural network). The techniques may involve determining, using the matrix operation result encoded in the number format, a parameter gradient for parameters of a machine learning model and updating the parameters using the parameter gradient. In some embodiments, the parameter gradient and the parameters of the machine learning model may be encoded in the number format. In some embodiments, the matrix operation result may be performed as part of performing inference using a machine learning model. The techniques may involve using the unbiased estimate of the matrix operation result to determine an output of the machine learning model.

In some embodiments, the matrix operation may involve one or more matrices including a first matrix. Performing the matrix operation using the analog processor may involve: (1) identifying a plurality of portions (e.g., tiles) of the first matrix, the plurality of portions including a first matrix portion; (2) determining a scaling factor for the first matrix portion; (3) scaling the first matrix portion using the scaling factor to obtain a scaled first matrix portion; (4) programming the analog processor using the scaled first matrix portion; and (5) performing, by the analog processor programmed using the scaled matrix portion, the matrix operation to obtain a first output (e.g., a partial matrix multiplication result) of the at least one output.

FIG. 1A is an example hybrid analog-digital processing system 100 (also referred to herein as "processing system 100") configured to perform operations (e.g., matrix operations), according to some embodiments of the technology described herein. As illustrated in the example of FIG. 1A, the processing system 100 may be configured to train a machine learning model to obtain a trained machine learning model 108. The processing system 100 may be configured to perform various operations involved with training the machine learning model 102.

It should be appreciated that although example operations described herein are in the context of training a machine learning model. However, some embodiments are not limited to such an application. Some embodiments may perform operations involved in tasks other than training a machine learning model. For example, the processing system 100 may be configured to perform operations involved in processing sensor data, performing digital signal processing, determining a control output of a control system, navigating a self-driving vehicle, or other task.

The machine learning model 102 may be any type of machine learning model. In some embodiments, the machine learning model 102 may be a neural network. For example, the machine learning model 102 may be a convolutional neural network (CNN), a recurrent neural network (RNN), a transformer neural network, a recommendation system, a graph neural network, or any other suitable neural network. In some embodiments, the machine learning model 102 may be a support vector machine (SVM), a logistic regression model, a linear regression model, or other suitable machine learning model.

The machine learning model 102 includes parameters 102A that are trained by performance of a training technique by the processing system 100 to obtain the trained machine learning model 108 with learned parameters 108A. For example, the parameters 102A may be weights and/or coefficients of a neural network that are learned during training. In another example, the parameters 102A may be parameters indicating one or more hyperplanes of an SVM. In another example, the parameters 102A may be coefficients of a regression model. The parameters 102A may be trained by performing an iterative training technique (e.g., by performing a gradient descent training technique). In some embodiments, the parameters 102A may be randomized values. In some embodiments, the parameters 102A may be learned from previously performing training. For example, the machine learning model 102 with parameters 102A may have been obtained by training another machine learning model. In such embodiments, the processing system 100 may be configured to perform training to tune the machine learning model 102 to obtain the machine learning model 108.

The processing system 100 may be configured to train the machine learning model 102. The processing system 100 may be configured to train the machine learning model 102 using training data. The processing system 100 may be configured to perform training to obtain the trained machine learning model 108 with learned parameters 108A. In some embodiments, the processing system 100 may be configured to train the machine learning model 102 using a supervised learning technique. For example, the processing system 100 may perform gradient descent (e.g., stochastic gradient descent, batch gradient descent, mini-batch gradient descent, etc.) to learn the parameters 108A. In some embodiments, the processing system 100 may be configured to train the machine learning model 102 using an unsupervised learning technique. For example, the processing system 100 may use a clustering algorithm to train the machine learning model 102. In some embodiments, the processing system 100 may be configured to train the machine learning model 102 using a semi-supervised learning technique. For example, the processing system 100 may determine a set of classes using clustering, label sample inputs with the determined set of classes, and then use a supervised learning technique to train the machine learning model 102 using the labeled sample inputs.

The processing system 100 may be configured to perform matrix operations for training the machine learning model 102 and/or for using the trained machine learning model 108 to perform inference. In some embodiments, the matrix operations may be operations that are performed as part of a training technique (e.g., a gradient descent training technique). Matrix operations for training the machine learning model 102 may include matrix operations to determine outputs of the machine learning model 102 for inputs and/or matrix operations to determine a parameter gradient for parameters 102A of the machine learning model. Matrix operations for performing inference using the trained machine learning model 108 may include matrix operations to determine an output of the trained machine learning model 108 for a corresponding input. For example, the processing system 100 may perform matrix multiplications as part of training a machine learning model and/or performing inference using a machine learning model.

As shown in FIG. 1A, the processing system 100 includes a hybrid analog-digital processor 110 and memory 120 for storing data. Although the memory 120 is shown separately from the hybrid analog-digital processor 110 in the example of FIG. 1A, in some embodiments, the memory 120 may be a component of the hybrid analog-digital processor 110.

In some embodiments, the processing system 100 may include a host central processing unit (CPU). In some embodiments, the processing system 100 may include a dynamic random-access memory (DRAM) unit. In some embodiments, the host CPU may be configured to communicate with the hybrid analog-digital processor 110 using a communication protocol. For example, the host CPU may communicate with the hybrid analog-digital processor 110 using peripheral component interconnect express (PCI-e), joint test action group (JTAG), universal seral bus (USB), and/or another suitable protocol. In some embodiments, the hybrid analog-digital processor 110 may include a DRAM controller that allows the hybrid analog-digital processor 110 direct memory access from the DRAM unit to memory of the hybrid analog-digital processor 110. For example, the hybrid analog-digital processor 110 may include a double data rate (DDR) unit or a high-bandwidth memory unit for access to the DRAM unit. In some embodiments, the host CPU may be configured to broker DRAM memory access between the hybrid analog-digital processor 110 and the DRAM unit.

The hybrid analog-digital processor 110 includes a digital controller 112, a digital-to-analog converter (DAC) 114, an analog processor 116, and an analog-to-digital converter (ADC) 118.

The components 112, 114, 116, 118 of the hybrid analog-digital processor 110 and optionally other components, may be collectively referred to as "circuitry". In some embodiments, the components 112, 114, 116, 118 may be formed on a common chip. In some embodiments, the components 112, 114, 116, 118 may be on different chips bonded together. In some embodiments, the components 112, 114, 116, 118 may be connected together via electrical bonds (e.g., wire bonds or flip-chip bump bonds). In some embodiments, the components 112, 114, 116, 118 may be implemented with chips in the same technology node. In some embodiments, the components 112, 114, 116, 118 may be implemented with chips in different technology nodes.

The digital controller 112 may be configured to control operation of the hybrid analog-digital processor 110. The digital controller 112 may comprise a digital processor and memory. The memory may be configured to store software instructions that can be executed by the digital processor. The digital controller 112 may be configured to perform various operations by executing software instructions stored in the memory. In some embodiments, the digital controller 112 may be configured to perform operations involved in training the machine learning model 102.

The DAC 114 is a system that converts a digital signal into an analog signal. The DAC 114 may be used by the hybrid analog-digital processor 110 to convert digital signals into analog signals for use by the analog processor 116. The DAC 114 may be any suitable type of DAC. In some embodiments, the DAC 114 may be a resistive ladder DAC, switched-capacitor DAC, switched resister DAC, binary-weighted DAC, a thermometer-coded DAC, a successive approximation DAC, an oversampling DAC, an interpolating DAC, and/or a hybrid DAC. In some embodiments, the digital controller 112 may be configured to use the DAC 104 to program the analog processor 116. The digital controller 112 may provide digital signals as input to the DAC 114 to obtain a corresponding analog signal, and configure analog components of the analog processor 116 using the analog signal.

The analog processor 116 includes various analog components. The analog components may include an analog mixer that mixes an input analog signal with an analog signal encoded into the analog processor 116. The analog components may include amplitude modulator(s), current steering circuit(s), amplifier(s), attenuator(s), and/or other analog components. In some embodiments, the analog processor 116 may include metal-oxide-semiconductor (CMOS) components, radio frequency (RF) components, microwave components, and/or other types of analog components. In some embodiments, the analog processor 116 may comprise a photonic processor. Example photonic processors are described herein. In some embodiments, the analog processor 116 may include a combination of photonic and analog electronic components.

The analog processor 116 may be configured to perform one or more matrix operations. The matrix operation(s) may include a matrix multiplication. The analog components may include analog components designed to perform a matrix multiplication. In some embodiments, the analog processor 116 may be configured to perform matrix operations for training the machine learning model 102. For example, the analog processor 116 may perform matrix operations for performing forward pass and backpropagation operations involved in performing gradient descent. In this example, the analog processor 116 may perform matrix operations to determine outputs of the machine learning model 102 and/or to compute a parameter gradient using outputs of the machine learning model 102. In some embodiments, the analog processor 116 may be configured to perform matrix operations for performing inference with a machine learning model (e.g., machine learning model 108). For example, the analog processor 116 may perform matrix operations for determining an output of the machine learning model corresponding to an input.

The ADC 118 is a system that converts an analog signal into a digital signal. The ADC 118 may be used by the hybrid analog-digital processor 110 to convert analog signals output by the analog processor 116 into digital signals. The ADC 118 may be any suitable type of ADC. In some embodiments, the ADC 118 may be a parallel comparator ADC, a flash ADC, a successive-approximation ADC, a Wilkinson ADC, an integrating ADC, a sigma-delta ADC, a pipelined ADC, a cyclic ADC, a time-interleaved ADC, or other suitable ADC.

The hybrid analog-digital processor 110 may be used by the processing system 100 to train the machine learning model 102 by performing a gradient descent technique. Performing gradient descent may involve iteratively updating values of the parameters 102A of the machine learning model 102 by: (1) determining a parameter gradient; and (2) updating the values of the parameters 102A using the parameter gradient. The hybrid analog-digital processor 110 may be configured to iterate multiple times to obtain the trained machine learning model 108 with learned parameters 108A. In some embodiments, the hybrid analog-digital processor 110 may be configured to iterate until a threshold value of an objective function is achieved. In some embodiments, the hybrid analog-digital processor 110 may be configured to iterate until a threshold number of iterations has been performed.

The hybrid analog-digital processor 110 may be configured to employ its analog processor 116 in determining a parameter gradient. In some embodiments, the hybrid analog-digital processor 110 may be configured to employ the analog processor 116 to perform one or more matrix operations to determine the parameter gradient. For example, the hybrid analog-digital processor 110 may determine outputs of the machine learning model 102 for a set of inputs by performing matrix operation(s) using the analog processor 116. As another example, the hybrid analog-digital processor 110 may further perform matrix operation(s) for determining a parameter gradient from the outputs of the machine learning model 102. Use of the analog processor 116 to perform the matrix operations may allow the training to be performed more efficiently compared to performing the matrix operations using only digital processing hardware.

To perform a matrix operation using the analog processor 116, the digital controller 112 may program the analog processor 116 with matrices involved in a matrix operation. The digital controller 112 may program the analog processor 116 using the DAC 114. Programming the analog processor 116 may involve setting certain characteristics of the analog processor 116 according to the matrices involved in the matrix operation. In one example, the analog processor 116 may include multiple electronic amplifiers (e.g., voltage amplifiers, current amplifiers, power amplifiers, transimpedance amplifiers, transconductance amplifiers, operational amplifiers, transistor amplifiers, and/or other amplifiers). In this example, programming the analog processor 116 may involve setting gains of the electronic amplifiers based on the matrices. In another example, the analog processor 116 may include multiple electronic attenuators (e.g., voltage attenuators, current attenuators, power attenuators, and/or other attenuators). In this example, programming the analog processor 116 may involve setting the attenuations of the electronic attenuators based on the matrices. In another example, the analog processor 116 may include multiple electronic phase shifters. In this example, programming the analog processor 106 may involve setting the phase shifts of the electronic phase shifters based on the matrices. In another example, the analog processor 116 may include an array of memory devices (e.g., flash or RAM). In this example, programming the analog processor 106 may involve setting conductances and/or resistances of each of the memory cells. The analog processor 116 may perform the matrix operation to obtain an output. The digital controller 112 may obtain a digital version of the output through the ADC 118.

The hybrid analog-digital processor 110 may be configured to use the analog processor 116 to perform matrix operations by using an adaptive block floating point (ABFP) representation for matrices involved in an operation. The hybrid analog-digital processor 110 may be configured to determine, for each matrix involved in an operation, scaling factor(s) for one or more portions of the matrix ("matrix portion(s)"). In some embodiments, a matrix portion may be a submatrix or vector within the matrix. The hybrid analog-digital processor 110 may be configured to scale a matrix portion using its scaling factor to obtain a scaled matrix portion. For example, values of the scaled matrix portion may be normalized within a range (e.g., [−1, 1]). The hybrid analog-digital processor 110 may program the analog processor 116 using values of the scaled matrix portion.

In some embodiments, the hybrid analog-digital processor 110 may be configured to program the analog processor 116 using the scaled matrix portion by programming the scaled matrix portion into a fixed-point representation used by the analog processor 116. In some embodiments, the fixed-point representation may be asymmetric around zero, with a 1-to-1 correspondence to integer values from $$-2^{\frac{B}{2}} \text{ to } 2^{\frac{B}{2}} - 1,$$

where B is the bit precision. In some embodiments, the representations may be symmetric around zero, with a 1-to-1 correspondence to integer bit values from $$-2^{\frac{B}{2}} - 1 \text{ to } 2^{\frac{B}{2}} - 1.$$

The analog processor 116 may be configured to perform the matrix operation using the scaled matrix portion to generate an output.

The digital controller 112 may be configured to obtain one or more outputs from performance of a matrix operation performed by the analog processor 116 through the ADC 118 (e.g., by conversion of analog output to a digital value). The digital controller 112 may be configured to determine an output scaling factor for each of the output(s). In some embodiments, the digital controller 112 may be configured to determine an output scaling factor based on the scaling factor determined for the corresponding input. For example, the digital controller 112 may determine the output scaling factor to be an inverse of an input scaling factor. The digital controller 112 may be configured to scale an output using the output scaling factor to obtain a scaled output. The digital controller 112 may be configured to determine a result of the matrix operation using scaled output(s).

In some embodiments, the output(s) obtained from performance of a matrix operation using the analog processor 116 may comprise multiple partial results of multiple matrix operations performed using portions of a matrix involved in the matrix operation. The digital controller 112 may accumulate the multiple partial results to obtain a matrix operation result or portion thereof. For example, for a multiplication between a matrix and a vector, the matrix may be divided into submatrices (e.g., tiles) that are multiplied with corresponding sub-vectors of the vector (e.g., using their respective ABFP representations). Each multiplication of a submatrix with a sub-vector may provide a respective partial result. The digital controller 112 may determine each row of an output vector of the multiplication by: (1) obtaining a partial sum of the row from each of the partial results; and (2) summing all the partial sums to obtain the value for the row. In some embodiments, the output(s) obtained from performance of a matrix operation using the analog processor 116 may comprise multiple outputs from performing the same matrix operation multiple times. The digital controller 112 may be configured to average the multiple outputs to obtain the result of the matrix operation.

Operations performed by the analog processor 116 is inherently noisy. As such, an output obtained from performance of a matrix operation using the analog processor 116 may be affected by the noise. The noise may be stochastic and modeled by a probability distribution. In some embodiments, the noise may be modeled by a Gaussian distribution. For example, thermal noise (e.g., Johnson-Nyquist noise) may be modeled by a Gaussian distribution with a mean of 0 and a variance based on temperature, resistive value, and bandwidth of analog components. As another example, shot noise may be modeled by a Gaussian distribution with a mean of 0 and a variance based on the number of photons or electrons arriving at a detection unit. In some embodiments, a mean and/or variance of a Gaussian distribution modeling noise of the analog processor 116 may be measured.

The digital controller 112 may be configured to use output(s) obtained from performance of a matrix operation using the analog processor 116 to determine a matrix operation result encoded in the number format 122 (e.g., a low bit number format). The digital controller 112 may be configured to determine the matrix operation result by: (1) determining an unbiased estimate of the matrix operation; and (2) encoding the unbiased estimate as the result of the matrix operation. Example techniques of determining an unbiased estimate of a value are described herein. Determining an unbiased estimate of a matrix operation result may allow the digital controller 112 to use a low bit number format to encode values while mitigating loss in performance (e.g., in training of a machine learning model or inference with a machine learning model) resulting from the low bit number format. For example, determining the unbiased estimate may mitigate effects of noise of the analog processor on accuracy of values.

In some embodiments, the digital controller 112 may further be configured to encode values involved in determining the matrix operation result in the number format 122. For example, the digital controller 112 may use additional variables (e.g., intermediate values used as part of a computation) in determining an accumulation of multiple outputs obtained from performing a matrix operation. The digital controller 112 may be configured to encode the additional variables in the number format 122. The digital controller 112 may further encode outputs obtained from performing a matrix operation in the number format 122.

The memory 120 may comprise of storage hardware for use by the processing system 100 in storing information. In some embodiments, the memory 120 may include memory used by the hybrid analog-digital processor 110 in performing an operation. For example, the memory 120 may include random access memory (RAM) that is used by the hybrid analog digital processor 110 in performing the operation. The memory 120 may be used by the hybrid analog-digital processor 110 to store intermediate values obtained in performing a matrix operation and/or final output values of a matrix operation result. As an illustrative example, the hybrid analog-digital processor 110 may perform a matrix operation by performing multiple matrix operations using portions of one or more matrices involved in the matrix operation. Example techniques of performing a matrix operation are described herein. The multiple matrix operations may yield multiple outputs that may be stored in the memory 120. The hybrid analog-digital processor may use the multiple outputs stored in the memory 120 to determine a matrix operation result, which may also be stored in the memory 120 encoded in the number format 122.

In some embodiments, the memory 120 may be configured to store values in a number format that uses less than 32 bits to represent a number (i.e., a low bit number format). In the example embodiment of FIG. 1A, the memory 120 is configured to store values in a 16 bit floating point number format 122 (e.g., BFLOAT16) in which 1 bit indicates a sign of a value, 8 bits indicate an exponent, and 7 bits indicate an action. In some embodiments, the memory 120 may be configured to store values in a different low bit number format instead of or in addition to the number format 122 illustrated in FIG. 1A. For example, the memory 120 may be configured to store values in an 8 bit floating point number format (e.g., FP8), or a different 16 bit floating number format (e.g., F16). In some embodiments, the memory 120 may be configured to store values in a high bit number format instead of or in addition to the 16 bit number format shown in FIG. 1A. For example, the memory 120 may be configured to store values in a 32 bit floating point number format (e.g., FP32) and/or a 64 bit floating point number format (e.g., FP64).

As shown in FIG. 1A, the memory 120 stores values 120A, 120B, 120C encoded in the number format 122. In some embodiments, each of the values 120A, 120B, 120C may be values of a matrix involved in an operation being performed by the hybrid analog-digital processor 110. For example, each of the values 120A, 120B, 120C may be values in an output matrix obtained from performing a matrix multiplication by the hybrid analog-digital processor 100 (e.g., using its analog processor 116). In some embodiments, each of the values 120A, 120B, 120C stored in the memory 120 may be obtained by: (1) obtaining a matrix operation result from performance of a matrix operation by the hybrid analog-digital processor 110; and (2) determining an unbiased estimate of the matrix operation result to obtain the values 120A, 120B, 120C. The values 120A, 120B, 120C may thus be unbiased estimates of matrix operation results that can be encoded in the number format 122. For example, a precision of the unbiased estimates of the output values may be represented by the number format 122.

In some embodiments, the memory 120 may include a hard drive (e.g., a solid state hard drive and/or a hard disk drive). In some embodiments, at least a portion of the memory 120 may be external to the processing system 100. For example, the at least the portion of the memory 120 may be storage hardware of a remote database server from which the processing system 100 may obtain data. The processing system 100 may be configured to access information from the remote storage hardware through a communication network (e.g., the Internet, a local area connection (LAN), or other suitable communication network). In some embodiments, the datastore 120 may include cloud-based storage resources.

Figure 1B:
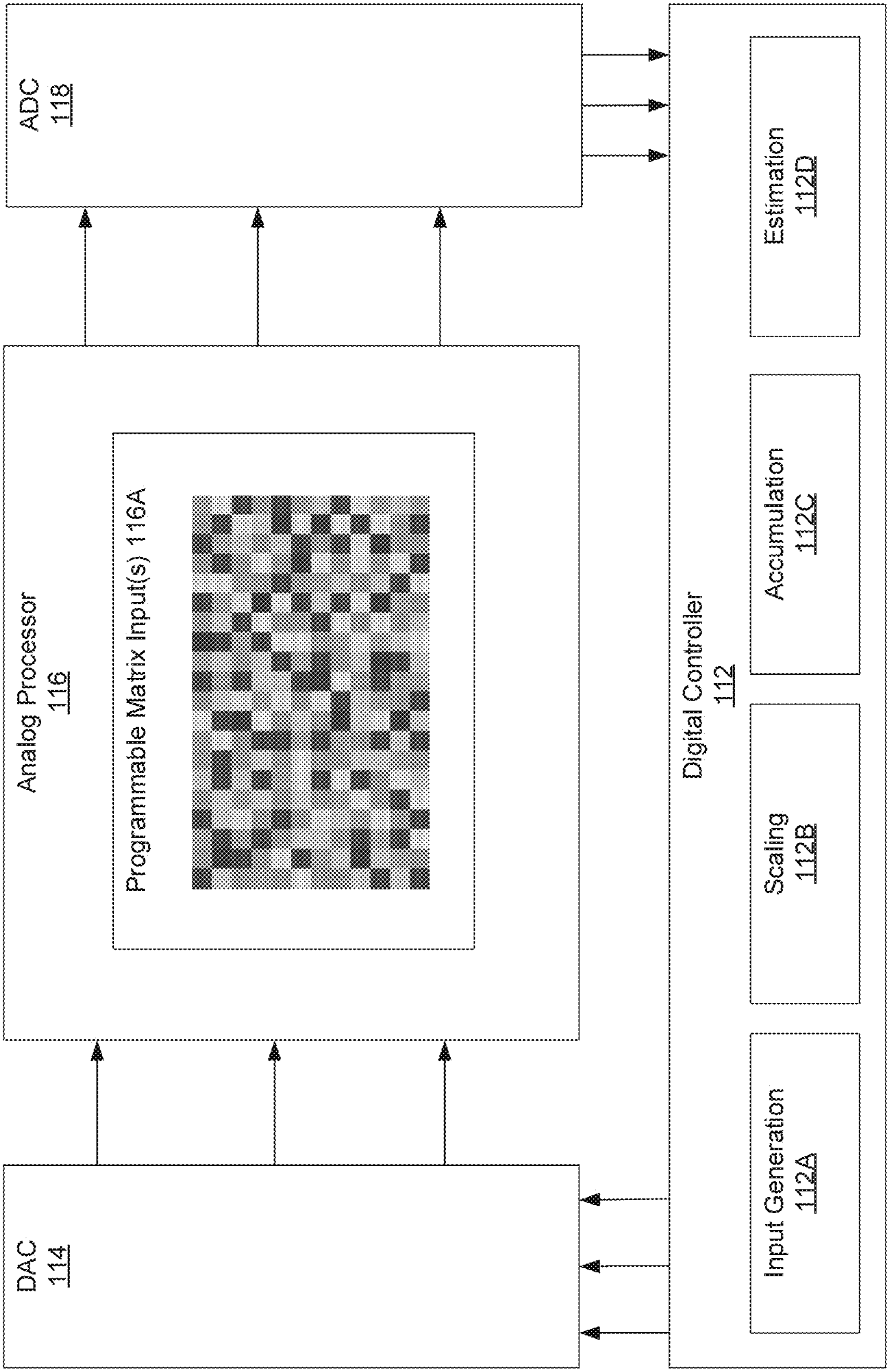
FIG. 1B illustrates interaction among components of the hybrid analog-digital processing system of FIG. 1A, according to some embodiments of the technology described herein.

FIG. 1B illustrates interaction among components 112, 114, 116, 118 of the hybrid analog-digital processor 100 of FIG. 1A, according to some embodiments of the technology described herein.

As shown in FIG. 1B, the digital controller 112 includes an input generation component 112A, a scaling component 112B, an accumulation component 112C, and an estimation component 112D.

The input generation component 112A may be configured to generate inputs to a matrix operation to be performed by the hybrid analog-digital processor 110. In some embodiments, the input generation component 112A may be configured to generate inputs to a matrix operation by obtaining one or more matrices involved in the matrix operation. For example, the input generation component 101A may obtain two matrices to be multiplied in a matrix multiplication operation. Values of the matrices may be encoded in the number format 122 (e.g., BFLOAT16).

In some embodiments, the input generation component 112A may be configured to divide matrices involved in a matrix operation into multiple portions such that the result of a matrix operation may be obtained by performing multiple operations using the multiple portions. In such embodiments, the input generation component 112A may be configured to generate input to a matrix operation by extracting a portion of a matrix for an operation. For example, the input generation component 112A may extract a submatrix (e.g., a tile) within a matrix. In another example, the input generation component 112A may extract a portion of an input vector for a matrix operation. To illustrate, the input generation component 112A may obtain a matrix of input values (e.g., an input vector), and a matrix of parameters of the system 102. A matrix multiplication may need to be performed between an input vector and a weight matrix. In this example, the input generation component 112A may: (1) divide the parameter matrix into multiple smaller parameter matrices; and (2) divide the input vector into multiple vectors corresponding to the multiple parameter matrices. The matrix operation between the input vector and the parameter matrix may then be performed by: (1) performing the matrix operation between each of the multiple parameter matrices and the corresponding vectors; and (2) accumulating the outputs (e.g., by summing partial results).

In some embodiments, the input generation component 112A may be configured to obtain one or more matrices from a tensor for use in performing matrix operations. For example, the input generation component 112A may divide a tensor of input values and/or a tensor of parameter values. The input generation component 112A may be configured to perform reshaping or data copying to obtain the matrices. For example, for a convolution operation between a weight kernel tensor and an input tensor, the input generation component 112A may generate a matrix using the weight kernel tensor, in which column values of the matrix correspond to a kernel of a particular output channel. The input generation component 112A may generate a matrix using the input tensor, in which each row of the matrix includes values from the input tensor that will be multiplied and summed with the kernel of a particular output channel stored in columns of the matrix generated using the weight kernel tensor. A matrix operation may then be performed between the matrices obtained from weight kernel tensor and the input tensor.

The scaling component 112B of the digital controller 112 may be configured to scale matrices (e.g., vectors) involved in a matrix operation. The matrices may be provided by the input generation component 112A. For example, the scaling component 112B may scale a matrix or portion thereof provided by the input generation component 112A. In some embodiments, the scaling component 112B may be configured to scale each portion of a matrix. For example, the scaling component 112B may separately scale vectors (e.g., row vectors or column vectors) of the matrix. The scaling component 112B may be configured to scale a portion of a matrix by: (1) determining a scaling factor for the portion of the matrix; and (2) scaling the portion of the matrix using the scaling factor to obtain a scaled portion of the matrix. For example, the scaling component 112B may be configured to scale a portion of a matrix by dividing values in the portion of the matrix by the scaling factor. As another example, the scaling component 112B may be configured to scale a portion of a matrix by multiplying values in the portion of the matrix by the scaling factor.

The scaling component 112B may be configured to determine a scaling factor for a portion of a matrix using various techniques. In some embodiments, the scaling component 112B may be configured to determine a scaling factor for a portion of a matrix to be a maximum absolute value of the portion of the matrix. The scaling component 112B may then divide each value in the portion of the matrix by the maximum absolute value to obtain scaled values in the range [−1, 1]. In some embodiments, the scaling component 112B may be configured to determine a scaling factor for a portion of a matrix to be a norm of the portion of the matrix. For example, the scaling component 112B may determine a Euclidean norm of a vector.

In some embodiments, the scaling component 112B may be configured to determine a scaling factor as a whole power of 2. For example, the scaling component 112B may determine a logarithmic value of a maximum absolute value of the portion of the matrix to be the scaling factor. In such embodiments, the scaling component 112B may further be configured to round, ceil, or floor a logarithmic value to obtain the scaling factor. In some embodiments, the scaling component 112B may be configured to determine the scaling factor statistically. In such embodiments, the scaling component 112B may pass sample inputs through the system 102, collect statistics on the outputs, and determine the scaling factor based on the statistics. For example, the scaling component 112B may determine a maximum output of the system 102 based on the outputs, and use the maximum output as the scaling factor. In some embodiments, the scaling component 112B may be configured to determine a scaling factor by performing a machine learning training technique (e.g., backpropagation or stochastic gradient descent). The scaling component 112B may be configured to store scaling factors determined for portions of matrices. For example, the scaling component 112B may store scaling factors determined for respective rows of weight matrices of a neural network.

The scaling component 112B may be configured to limit scaled values of a scaled portion of a matrix to be within a desired range. For example, the scaling component 112B may limit scaled values of a scaled portion of a matrix to between [−1, 1]. In some embodiments, the scaling component 112B may be configured to limit scaled values to a desired range by clamping or clipping. For example, the scaling component 112B may apply the following clamping function to the scaled values: $\text{clamp}(x)=\min(\max(x, -1), 1)$ to set the scaled values between [−1, 1]. In some embodiments, the scaling component 112B may be configured to determine scaling factor for a portion of a matrix that is less than the maximum absolute value of the portion of the matrix. In some such embodiments, the scaling component 112B may be configured to saturate scaled values. For example, the scaling component 112B may saturate a scaled value at a maximum of 1 and a minimum of −1.

The scaling component 112B may be configured to determine a scaling factor at different times. In some embodiments, the scaling component 112B may be configured to determine a scaling factor dynamically at runtime when a matrix is being loaded onto the analog processor. For example, the scaling component 112B may determine a scaling factor for an input vector for a neural network at runtime when the input vector is received. In some embodiments, the scaling component 112B may be configured to determine a scaling factor prior to runtime. The scaling component 112B may determine the scaling factor and store it in the datastore 120. For example, weight matrices of a neural network may be static for a period of time after training (e.g., until they are to be retrained or otherwise updated). The scaling component 112B may determine scaling factor(s) to be used for matrix operations involving the matrices, and store the determined scaling factor(s) for use when performing matrix operations involving the weight matrices. In some embodiments, the scaling component 112B may be configured to store scaled matrix portions. For example, the scaling component 112B may store scaled portions of weight matrices of a neural network such that they do not need to be scaled during runtime.

The scaling component 112B may be configured to amplify or attenuate one or more analog signals for a matrix operation. Amplification may also be referred to herein as "overamplification". Typically, the number of bits required to represent an output of a matrix operation increases as the size of one or more matrices involved in the matrix operation increases. For example, the number of bits required to represent an output of a matrix multiplication operation increases as the size of the matrices being multiplied increases. The precision of the hybrid analog-digital processor 110 may be limited to a certain number of bits. For example, the ADC 118 of the hybrid analog-digital processor may have a bit precision limited to a certain number of bits (e.g., 4, 6, 8, 10, 12, 14). As the number of bits required to represent an output of a matrix operation increases more information is lost from the output of the matrix operation because a fewer number of significant bits can be captured by the number of bits. The scaling component 112B may be configured to increase a gain of an analog signal such that a larger number of lower significant bits may be captured in an output, at the expense of losing information in more significant bits. This effectively increases the precision of an output of the matrix operation because the lower significant bits may carry more information for training the machine learning model 112 than the higher significant bits.

Figure 8:
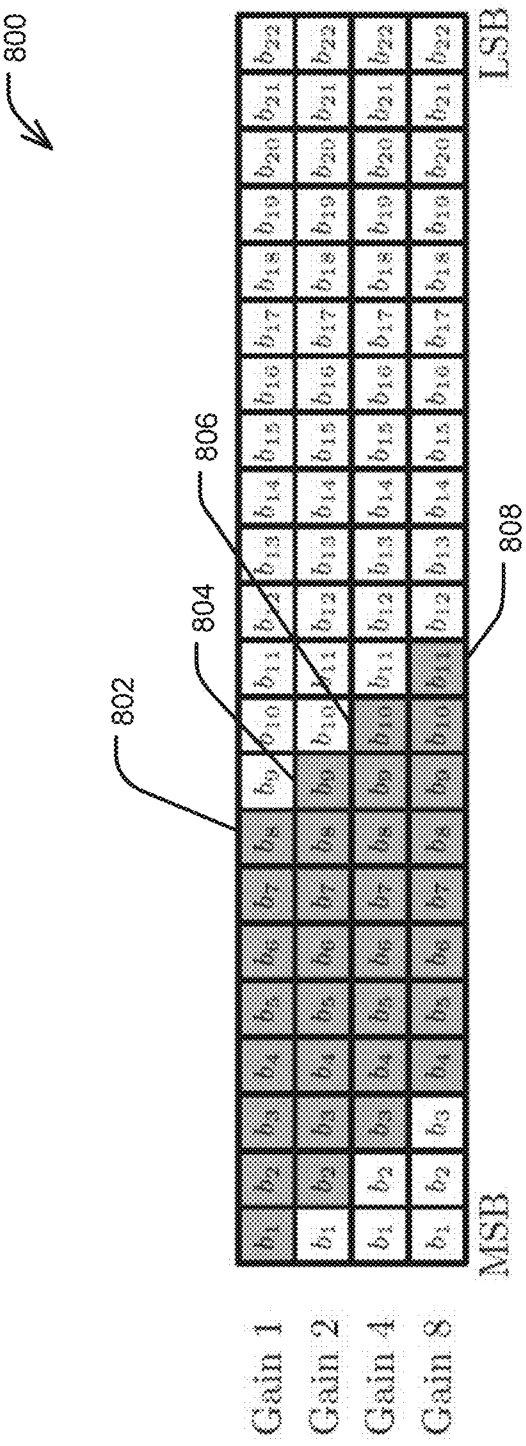
FIG. 8 is a diagram illustrating effects of overamplification, according to some embodiments of the technology described herein.

FIG. 8 is a diagram illustrating effects of overamplification, according to some embodiments of the technology described herein. The diagram 800 illustrates the bits of values that would be captured for different levels of overamplification. In the example of FIG. 8, there is a constant precision of 8 bits available to represent a 22 bit output. When no amplification is performed ("Gain 1"), the output captures the 8 most significant bits $b_1$-$b_8$ of the output as indicated by the set of highlighted blocks 802. When the analog signal is amplified by a factor of 2 ("Gain 2"), the output captures the bits $b_2$-$b_9$ of the output as indicated by the set of highlighted blocks 804. When the analog signal is amplified by a factor of 4 ("Gain 4"), the output captures the bits $b_3$-$b_{10}$ of the output as indicated by the set of highlighted blocks 806. When the analog signal is amplified by a factor of 8 ("Gain 8"), the output captures the bits $b_4$-$b_{11}$ of the output as indicated by the set of highlighted blocks 808. As can be understood from FIG. 8, increasing the gain allows the output to capture additional lower significant bits at the expense of higher significant bits.

Returning again to FIG. 1B, the accumulation component 112C may be configured to determine an output of a matrix operation between two matrices by accumulating outputs of multiple matrix operations performed using the analog processor 116. In some embodiments, the accumulation component 112C may be configured to accumulate outputs by accumulating multiple partial results into an output matrix. For example, the accumulation component 112C may sum partial row sums obtained from the analog processor (e.g., through the ADC 118) to determine rows of the output matrix.

The accumulation component 112C may be configured to accumulate multiple outputs obtained from performing a matrix operation (e.g., using the analog processor 116) using a technique that reduces numerical error in the accumulation. In some embodiments, the accumulation component 112C may be configured to determine an accumulation of multiple outputs (e.g., partial sums of a row of an output matrix) by summing the outputs. Numerical error may be introduced into a sum of numbers represented using a floating point number format (e.g., number format 122). The accumulation component 112C may be configured to reduce the numerical error by performing compensated summation (also known as Kahan summation). For example, the accumulation component 112C may perform compensated summation to accumulate partial results obtained from performing a matrix operation (e.g., to sum partial sums of rows in an output matrix of the matrix operation). The compensated summation may mitigate the amount of numerical error in an accumulation of multiple outputs encoded in the number format 122. Example techniques of performing compensated summation that may be used by the accumulation component 112C are described herein with reference to FIG. 4.

In some embodiments, a matrix operation may be repeated multiple times, and the accumulation component 112C may be configured to average the multiple results to reduce error introduced by noise (e.g., of the analog processor 116 used to perform the matrix operation). In some embodiments, the matrix operations may be performed between certain bit precisions of the input matrix and the weight matrix. For example, an input matrix can be divided into two input matrices, one for the most significant bits in the fixed-point representation and another for the least significant bits in the fixed-point representation. A weight matrix may also be divided into two weight matrices, the first with the most significant bit portion and the second with the least significant bit portion. Multiplication between the original weight and input matrix may then be performed by performing a multiplications between: (1) the most-significant weight matrix and the most-significant input matrix; (2) the most-significant weight matrix and the least-significant input matrix; (3) the least-significant weight matrix and the most-significant input matrix; and (4) the least-significant weight matrix and the least-significant input matrix. The resulting output matrix can be reconstructed based on the output bit significance.

The estimation component 112D of the digital controller 112 may be configured to determine an unbiased estimate of a value. Matrix operations and/or accumulation of outputs of matrix operations may result in values that require more bits than the number of bits used by the number format 122. The estimation component 112D may be configured to determine unbiased estimate of these values that be encoded in the number format 122. In some embodiments, the estimation component 112D may be configured to determine an unbiased estimate of an accumulation of multiple outputs determined by the accumulation component 112C. For example, the estimation component 112D may determine an unbiased estimate of an accumulation of multiple partial results (e.g., partial row sums).

The estimation component 112D may be configured to perform rounding to determine an unbiased estimate of a value. In some embodiments, the estimation component 112D may be configured to determine an unbiases estimate of a matrix operation using output(s) obtained from performing the matrix operation. The estimation component 112D may be configured to determine the unbiases estimate such that it can be stored in the memory 120 encoded in the number format 122. In some embodiments, the estimation component 112D may be configured to determine an unbiased estimate of the parameters 102A of the machine learning model 102 and store the unbiased estimate of the parameters 102A in the memory 120 encoded in the number format 122. This may reduce the memory needed to store the parameters 102A and allow operations involving the parameters 102D to be performed more efficiently. In some embodiments, the estimation component 112D may be configured to determine an unbiased estimate of a parameter gradient, and use the unbiased estimate of the parameter gradient to update the parameters 102A. The estimation component 112D may determine an unbiased estimate of the updated parameters (e.g., for storage in the number format 122).

The estimation component 112D may be configured to use various techniques of rounding to determine an unbiased estimate of a matrix operation using output(s) obtained from performing the matrix operation (e.g., using the analog processor 116). The outputs may be obtained from repeating performance of the matrix operation. The estimation component 112D may be configured to determine an unbiased estimate using the outputs obtained from multiple performances of the matrix operation. In some embodiments, estimation component 112D may determine an unbiased estimate based on a probability distribution modeling noise of the analog processor 116. For example, stochastic rounding may be performed when noise of the analog processor is assumed to be uniformly distributed. As another example, the noise of the analog processor 116 may be modeled by a Gaussian distribution. In this example, the estimation component 112D may determine an unbiased estimate of the matrix operation using a Gaussian error function to obtain an unbiased estimate. As another example, the noise of the analog processor 116 may be modeled by a uniform distribution. In this example, the estimation component 112D may determine an unbiased estimate of the matrix operation using an error function of the uniform distribution. In some embodiments, a probability distribution of noise in the analog processor 116 may be generated. For example, the probability distribution may be generated by: (1) performing operations using the analog processor 116 to obtain a plurality of noise samples; (2) generating a probability distribution of the noise (e.g., a histogram); (3) determining a cumulative probability distribution of the noise; and (4) using the cumulative probability distribution to determine an unbiased estimate of a matrix operation performed using the analog processor 116.

In some embodiments, the hybrid analog-digital processor 110 may be configured to determine an output of a matrix operation using tiling. Tiling may divide a matrix operation into multiple operations between smaller matrices. Tiling may allow reduction in size of the hybrid analog-digital processor 110 by reducing the size of the analog processor 116. As an illustrative example, the hybrid analog-digital processor 110 may use tiling to divide a matrix multiplication between two matrices into multiple multiplications between portions of each matrix. The hybrid analog-digital processor 110 may be configured to perform the multiple operations in multiple passes. In such embodiments, the accumulation component 112C may be configured to combine results obtained from operations performed using tiling into an output matrix.

Figure 9A:
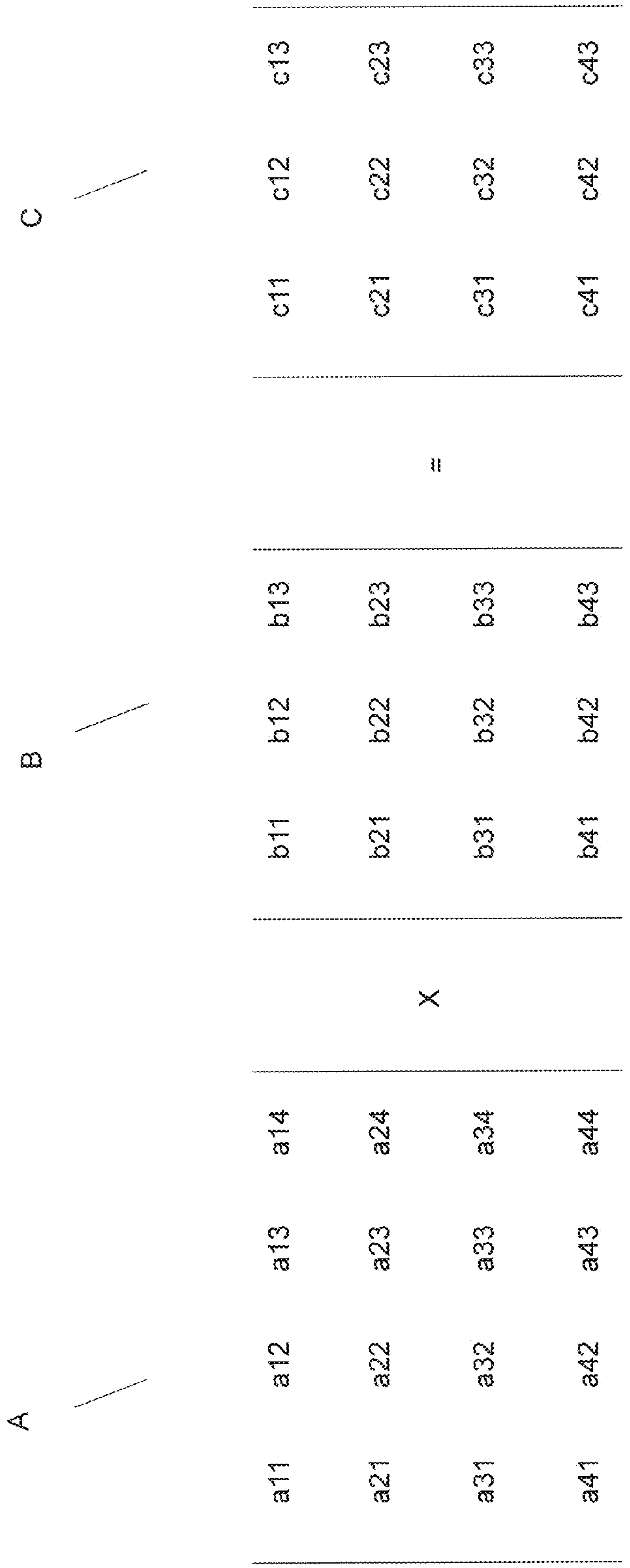
FIG. 9A is an example matrix multiplication operation, according to some embodiments of the technology described herein.

FIG. 9A is an example matrix multiplication operation, according to some embodiments of the technology described herein. For example, the matrix multiplication may be performed as part of optimizing the parameters 102A of the system 102 under the constraint(s) 104. In the example of FIG. 9A, the matrix A may store the weights of a layer, and the matrix B may be an input matrix provided to the layer. The system may perform matrix multiplication between matrix A and matrix B to obtain output matrix C.

Figure 9B:
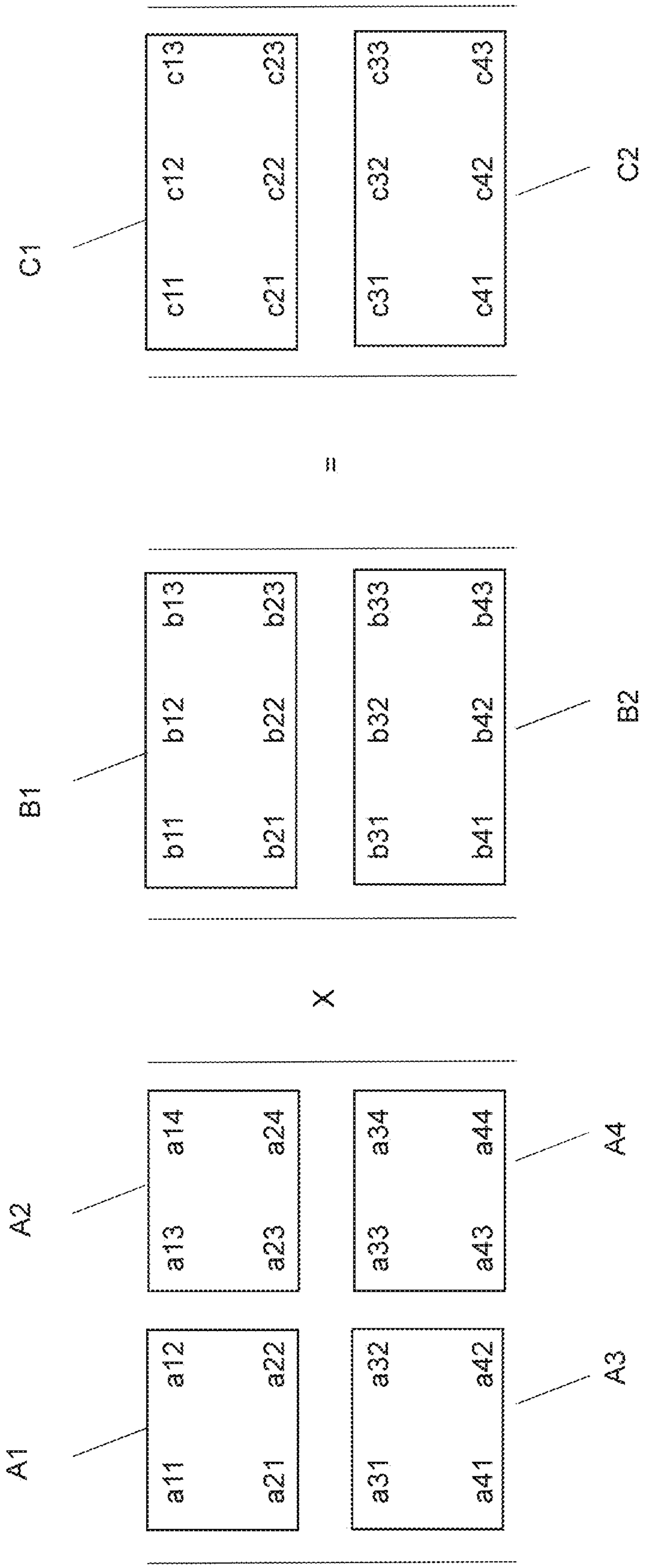
FIG. 9B illustrates use of tiling to perform the matrix multiplication operation of FIG. 9A, according to some embodiments of the technology described herein.

FIG. 9B illustrates use of tiling to perform the matrix multiplication operation of FIG. 9A, according to some embodiments of the technology described herein. In FIG. 9B, the hybrid analog-digital processor 110 divides the matrix A into four tiles—A1, A2, A3, and A4. In this example, each tile of A has two rows and two columns (though other numbers of rows and columns are also possible). The hybrid analog-digital processor 110 divides the matrix B into tile rows B1 and B2, and matrix C is segmented into rows C1 and C2. The row C1 and C2 are given by the following expressions:

$$C1=A1*B1+A2*B2 \quad \text{Equation (1)}$$

$$C2=A3*B1+A4*B2 \quad \text{Equation (2)}$$

In equation 1 above, the hybrid analog-digital processor 110 may perform the multiplication of A1*B1 separately from the multiplication of A2*B2. The accumulation component 112C may subsequently accumulate the results to obtain C1. Similarly, in equation 2, the hybrid analog-digital processor 110 may perform the multiplication of A3*B1 separately from the multiplication of A4*B2. The accumulation component 112C may subsequently accumulate the results to obtain C2.

The DAC 114 may be configured to convert digital signals provided by the digital controller 112 into analog signals for use by the analog processor 116. In some embodiments, the digital controller 112 may be configured to use the DAC 114 to program a matrix into the programmable matrix input(s) 116A of the analog processor 116. The digital controller 112 may be configured to input the matrix into the DAC 114 to obtain one or more analog signals for the matrix. The analog processor 116 may be configured to perform a matrix operation using the analog signal(s) generated from the matrix input(s) 116A. In some embodiments, the DAC 114 may be configured to program a matrix using a fixed point representation of numbers used by the analog processor 116.

The analog processor 116 may be configured to perform matrix operations on matrices programmed into the matrix input(s) 116A (e.g., through the DAC 114) by the digital controller 112. In some embodiments, the matrix operations may include matrix operations for optimizing parameters 102A of the system 102 using gradient descent. For example, the matrix operations may include forward pass matrix operations to determine outputs of the system 102 for a set of inputs (e.g., for an iteration of a gradient descent technique). The matrix operations further include back-propagation matrix operations to determine a parameter gradient. The gradient may be used to update the parameters 102A of the system 102 (e.g., in an iteration of a gradient descent learning technique).

In some embodiments, the analog processor 116 may be configured to perform a matrix operation in multiple passes using matrix portions (e.g., portions of an input matrix and/or a weight matrix) determined by the digital controller 112. The analog processor 116 may be programmed using scaled matrix portions, and perform the matrix operations. For example, the analog processor 116 may be programmed with a scaled portion(s) of an input matrix (e.g., a scaled vector from the input matrix), and scaled portion(s) of a weight matrix (e.g., multiple scaled rows of the weight matrix). The programmed analog processor 116 may perform the matrix operation between the scaled portions of the input matrix and the weight matrix to generate an output. The output may be provided to the ADC 118 to be converted back into a digital floating-point representation (e.g., to be accumulated by accumulation component 112C to generate an output).

The ADC 118 may be configured to receive an analog output of the analog processor 116, and convert the analog output into a digital signal. In some embodiments, the ADC 118 may include logical units and circuits that are configured to convert a values from a fixed-point representation to a digital floating-point representation used by the digital controller 112. For example, the logical units and circuits of the ADC 118 may convert a matrix from a fixed point representation of the analog processor 116 to a 16 bit floating-point representation ("float16" or "FP16"), a 32 bit floating-point representation ("float32" or "FP32"), a 64 bit floating-point representation ("float32" or "FP32"), a 16 bit brain floating-point format ("bfloat16"), a 32 bit brain floating-point format ("bfloat32"), or another suitable floating-point representation. In some embodiments, the logical units and circuits may be configured to convert values from a first fixed-point representation to a second fixed-point representation. The first and second fixed-point representations may have different bit widths. In some embodiments, the logical units and circuits may be configured to convert a value into unums (e.g., posits and/or valids).

Figure 1C:
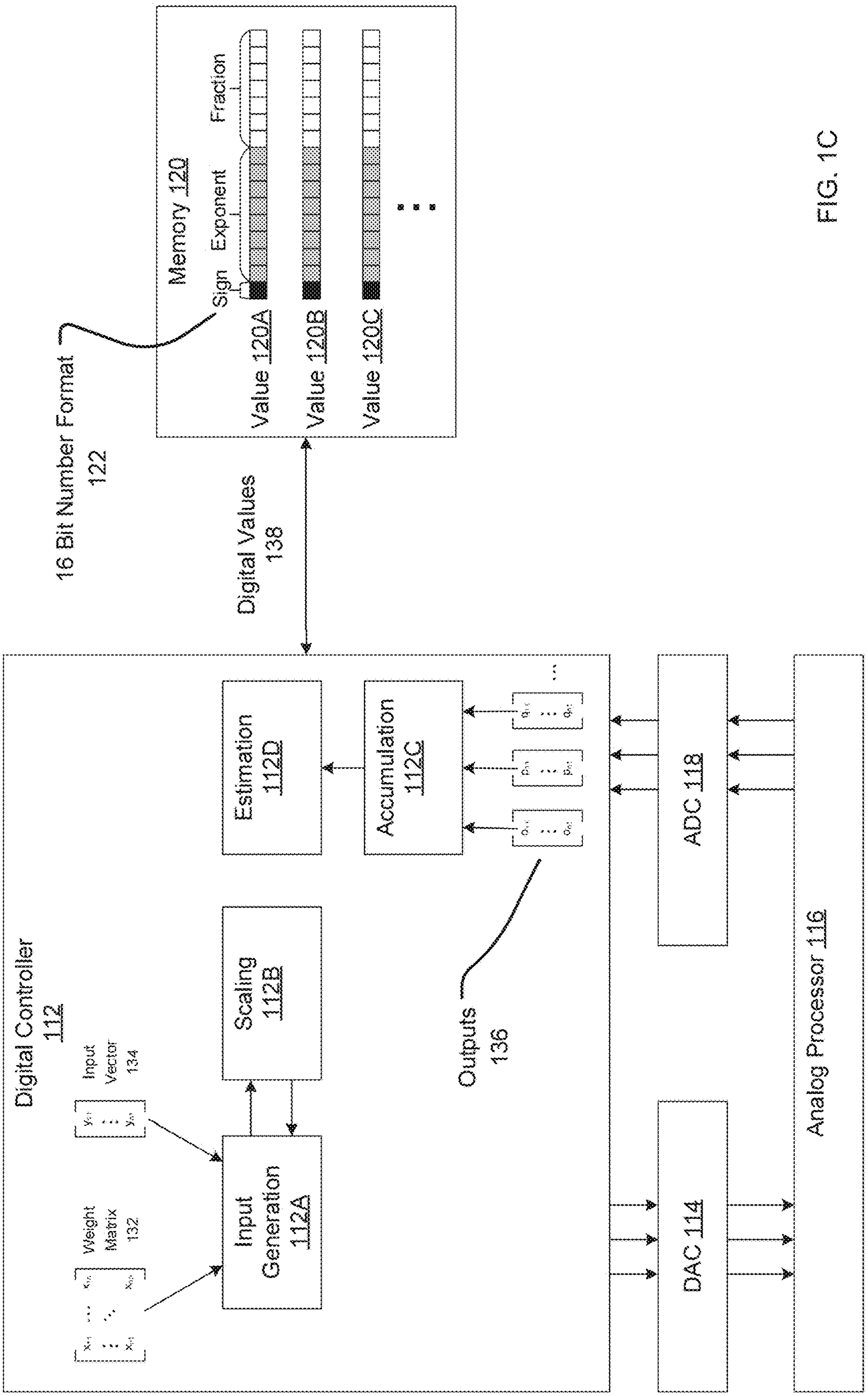
FIG. 1C illustrates performance of a matrix operation by the hybrid analog-digital processing system of FIGS. 1A-1B, according to some embodiments of the technology described herein.

FIG. 1C illustrates performance of a matrix operation by the hybrid analog-digital processing system 100 of FIGS. 1A-1B, according to some embodiments of the technology described herein. As shown in FIG. 1C, the matrix operation involves the input matrices 132, 134. In this example, the matrix operation is a matrix multiplication between a weight matrix 132 (e.g., storing weights of a neural network layer) and an input vector 134 (e.g., of input values to the neural network layer).

As shown in FIG. 1C, the input generation component 112A receives the input matrices 132, 134. The input generation component 112A may be configured to divide the weight matrix 132 into submatrices (e.g., tiles) and the input vector 134 into sub-vectors corresponding to the submatrices. The input generation component 112A may be configured to use the scaling component 112B to determine scaling factors for the submatrices and the sub-vectors. The input generation component 112A may use the scaling factors to determine ABFP representations of the submatrices and sub-vectors. For each submatrix and corresponding sub-vector, the input generation component 112A may program the scaled submatrix and sub-vector into the analog processor 116 through the DAC 114. The digital controller 112 may obtain outputs 136 from matrix operations performed by the analog processor 116 through the ADC 118. The outputs 136 may include outputs of matrix multiplications between the submatrices and the corresponding sub-vectors. In some embodiments, the outputs 136 may include outputs from performing multiple passes of each matrix multiplication between a submatrix and corresponding sub-vector.

The accumulation component 112C may be configured to store the outputs 136 in memory 120 encoded in the number format 122. The accumulation component 112C determines an accumulation of the outputs 136 encoded in the number format 122. The accumulation component 112C may accumulate partial sums of each row of an output vector of the matrix multiplication. In some embodiments, the accumulation component 112C may sum partial sums of each row using compensated summation to reduce numerical error in the result obtained for each row.

The accumulation component 112C uses the estimation component 112D to determine an unbiased estimate of one or more accumulations (e.g., of different rows of an output vector). In some embodiments, the estimation component 112D may be configured to determine an unbiased estimate of an accumulation using a probability distribution (e.g., a Gaussian distribution, a uniform distribution, and/or a probability distribution determined using noise samples obtained from the analog processor 116) modeling noise in the analog processor 118. For example, the estimation component 112D may determine a cumulative distribution function (CDF) of the probability distribution and use the CDF to determine an unbiased estimate of the accumulation. The estimation component 112D may be configured to store the unbiased estimate of the accumulation in memory 120 encoded in the number format 122.

The digital controller 112 may be configured to determine a matrix operation result (e.g., an output vector) using unbiased estimations of one or more accumulations of the outputs 136. For example, the digital controller 112 may assemble unbiased estimations of each row accumulation into an output vector as the matrix operation result. The digital controller 112 may be configured to store the matrix operation result in memory 120 encoded in the number format 122. The digital controller 112 may use the matrix operation result encoded in the number format 122 to perform other operations (e.g., determine a parameter gradient and/or update parameters using the parameter gradient).

Figure 2:
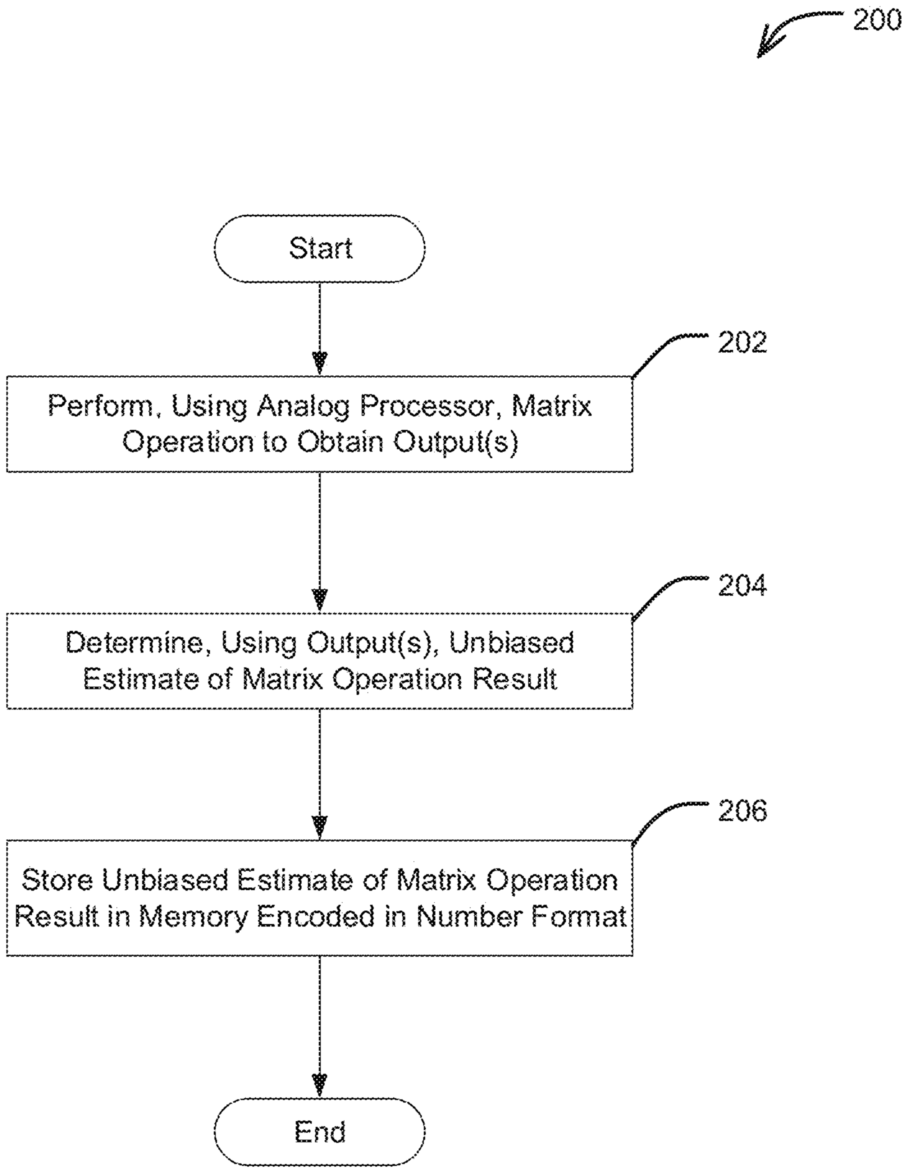
FIG. 2 is a flowchart of an example process of performing a matrix operation using a hybrid analog-digital processor, according to some embodiments of the technology described herein.

FIG. 2 is a flowchart of an example process 200 of performing a matrix operation using a hybrid analog-digital processor, according to some embodiments of the technology described herein. In some embodiments, process 200 may be performed by hybrid analog-digital processing system 100 described herein with reference to FIGS. 1A-1C. Process 200 may be performed to obtain a matrix operation result encoded in a particular number format. In some embodiments, the number format may be a low bit number format (i.e., a number format that uses less than 32 bits to represent a number). In some embodiments, the number format may be a large bit number format (i.e., a number format that uses 32 or more bits to represent a number).

Process 200 begins at block 202, where the system performing process 200 performs, using an analog processor (e.g., analog processor 116 described herein with reference to FIGS. 1A-1C) of the hybrid analog-digital processor, to perform a matrix operation to obtain one or more outputs. In some embodiments, the output(s) may be encoded in the number format. For example, the output(s) may include one or more matrices or vectors with values that are encoded in the number format. The output(s) may be obtained by transforming (e.g., using an ADC) analog output(s) generated by an analog processor of the hybrid analog-digital processor into digital output(s) that are encoded in the number format.

In some embodiments, the system may be configured to perform the matrix operation using an ABFP representation of one or more matrices involved in the matrix operation. An example process of performing the matrix operation is described herein with reference to FIG. 6. In such embodiments, performing the matrix operation may involve: (1) dividing each matrix involved in the matrix operation into multiple portions (e.g., submatrices or sub-vectors); and (2) performing multiple matrix operations using the multiple matrix portions. The multiple matrix operations may yield multiple outputs that are to be accumulated to obtain an output of the matrix operation.

To illustrate, one example matrix operation is a multiplication between a weight matrix W of size $N_r \times N_c$ and an input vector x. In this example, a vector length of n is chosen to share a single scaling factor. The scaling factor may be encoded in the number format. The weight matrix W is divided into multiple submatrices referred to as tiles w. Each tile will be composed of multiple row vectors of length n. The row vectors are labeled $w_{ij}$ where the subscript i denotes the row and the subscript j denotes the tile. The input vector x is divided into multiple sub-vectors denoted $x_j$ that will be multiplied with corresponding tiles of the weight matrix. A matrix operation using the ABFP representation can be performed in the following steps.

a. Scale each tile to obtain its ABFP representation:

$$w'_{ij} = \frac{w_{ij}}{a_{ij}},$$

where $a_{ij}$ is a scaling factor equal to max $(|w_{ij}|)$ b. Scale each sub-vector to obtain its ABFP representation:

$$x'_j = x_j/b_j,$$

where $b_j$ is a scaling factor equal to max $(|x_j|)$ c. Perform, using the analog processor, multiplications between the scaled tiles and corresponding sub-vectors to obtain corresponding outputs $$y_{ij} = w'_{ij}x'_j + e,$$

where e denotes noise of the analog processor.

d. Transfer the outputs $y_{ij}$ to a digital domain of the hybrid analog-digital processor (e.g., through an ADC).

e. For each row $y_i$ of the output vector y, accumulate outputs to obtain the row $y_i$ as follows:

$$y_i = \Sigma_{j=1}^{ceil\left(\frac{N_c}{n}\right)} y_{ij}a_{ij}b_{ij}.$$

The accumulation includes multiplying by the scaling factors used for the ABFP representation to obtain the final output.

In some embodiments, performing the matrix operation may involve performing multiple passes of each of the multiple matrix operations. The multiple outputs may include, for each matrix operation, multiple outputs obtained from repeating the matrix operation multiple times. Continuing with the example above, for computations k=1, . . . K of a multiplication between a tile and sub-vector, the outputs may include $y_{ij,k}$ denoting the outputs obtained from each pass of a multiplication. The outputs from multiple passes of a matrix operation may subsequently be used to determine result of the matrix operation.

Next, process 200 proceeds to block 204, where the system determines, using the output(s), an unbiased estimate of the matrix operation result. The system may determine the unbiases estimate of the matrix operation result using various techniques. In some embodiments, the output(s) may be encoded in the number format. The system may be configured to determine the matrix operation result using the output(s) encoded in the number format. For example, the system may accumulate outputs with values encoded in the number format to obtain the matrix operation result. The system may be configured to determine an unbiased estimate of the matrix operation result such that it can also be encoded in the number format. For example, accumulation of the outputs may result in one or more values that cannot be encoded in the number format. The system may determine an unbiased estimate of the matrix operation result such that the value(s) can be stored in memory encoded in the number format.

In some embodiments, the system may be configured to determine the unbiased estimate of the matrix operation by stochastically rounding the output(s) and/or an accumulation thereof. Stochastic rounding may provide an unbiased estimate of a value. Stochastic rounding can be defined by Equation 3 below.

$$Q_{st}(x) = \text{floor}(x) \text{ with probability } \text{ceil}(x)-x, \text{ or } \text{ceil}(x) \text{ with probability } x-\text{floor}(x) \qquad \text{Equation (3)}$$

For example, continuing with the matrix operation above, the system may stochastically round the accumulation of outputs for each row $y_i$ of the output vector y to obtain the unbiased estimate of the output vector y as follows:

$$y_i = Q_{st}\left(\Sigma_{j=1}^{ceil\left(\frac{N_c}{n}\right)} y_{ij}a_{ij}b_{ij}\right).$$

In some embodiments, the system may be configured to determine the unbiased estimate of the matrix operation result based on a probability distribution modeling noise in output(s) obtained from performing the matrix operation. The system may use a cumulative distribution function (CDF) of the probability distribution to determine an unbiased estimator of the matrix operation result. In some embodiments, the probability distribution may model noise of an analog processor used to perform the matrix operation. For example, the probability distribution may be a Gaussian distribution modeling noise of the analog processor. As another example, the probability distribution may be a uniform distribution modeling noise of the analog processor. In some embodiments, the probability distribution modeling noise of the analog processor may be generated using noise samples obtained from operations performed using the analog processor (e.g., as described herein with reference to FIG. 5).

As one example, the noise e of the analog processor may be modeled by the Gaussian distribution e~N(0,σ). An unbiased estimator for the value x in x+e obtained from K samples is as follows:

$$x_{est} = \left(\frac{\sigma}{\sqrt{2}}\right)\text{erf}^{-1}\left(\Sigma_{k=1}^{K}\frac{(x_k+e)}{K}\right).$$

The unbiased estimator may be used in the matrix operation described above to determine an unbiased estimate of a row $y_i$ in the output vector y. The outputs obtained from performing the matrix operation using the analog processor may include outputs from performing each multiplication between a tile and corresponding sub-vector K times:

$$y_{ij,k} = w'_{ij}x'_j + e \text{ for } k = 1, \ldots, K.$$

In this example, the system may determine an unbiased estimate of each row $y_i$ of the output vector y as shown in Equation 4 below.

$$y_{i\,est} = \sum_{j=1}^{ceil\left(\frac{N_c}{n}\right)} \text{erf}^{-1}\left(\sum_{k=1}^{K}\frac{y_{ij,k}}{K}\right)\frac{\sigma}{\sqrt{2}}a_{ij}b_{ij} \qquad \text{Equation (4)}$$

As another example, the noise e of the analog processor may be modeled by the uniform distribution $$e \sim U\left(-\frac{c}{2}, \frac{c}{2}\right).$$

An unbiased estimator for the value of x in x+e obtained from K samples is as follows:

$$x_{est} = \frac{a}{2}\Sigma_{k=1}^{K}\frac{(x_k+e)}{K}.$$

The unbiased estimator may be used in the matrix operation described above to determine an unbiased estimate of a row $y_i$ in the output vector y. The outputs obtained from performing the matrix operation using the analog processor may include outputs from performing each multiplication between a tile and corresponding sub-vector K times:

$$y_{ij,k} = w'_{ij} x'_j + e \text{ for } k = 1, \ldots, K.$$

In this example, the system may determine an unbiased estimate of each row $y_i$ of the output vector y as shown in Equation 5 below.

$$y_{i\,est} = \sum_{j=1}^{ceil\left(\frac{N_c}{n}\right)} \frac{a}{2} \left( \sum_{k=1}^{K} \frac{y_{ij,k}}{K} \right) \frac{\sigma}{\sqrt{2}} a_{ij} b_{ij} \quad \text{Equation (5)}$$

As another example, the noise e of the analog processor may be determined using observed noise sampled obtained from performing operations using the analog processor. The probability distribution may be an arbitrary probability distribution. The system may determine an unbiased estimate of a value based on the probability distribution using a CDF of the probability distribution to find an unbiased estimator. The system may then use the unbiased estimator to determine an unbiased estimate of the matrix operation result.

In some embodiments, the system may be configured to determine an unbiased estimate of the matrix operation result by accumulating outputs (e.g., partial outputs obtained from multiplication of tiles with sub-vectors) in a manner that reduces numerical error introduced as a result of accumulation. For example, the system may sum multiple outputs using compensated summation to reduce numerical error. Example accumulation techniques are described herein with reference to FIG. 4.

After determining an unbiased estimate of the matrix operation result at block 204, process 200 proceeds to block 206, where the system stores the unbiased estimate of the matrix operation result in memory in the number format. For example, the unbiased estimate of the matrix operation may be represented in the number format. In embodiments in which the number format is a low bit number format, the system may store the unbiased estimate using less than 32 bits. In embodiments in which the number format is a high bit number format, the system may store the unbiased estimate using 32 or more bits.

In some embodiments, the system may be configured to use the unbiased estimate of the matrix operation for one or more subsequent operations. For example, the system may use the unbiased estimate of the matrix operation to determine a parameter gradient for parameters of a machine learning model as part of training the machine learning model. As another example, the system may use the unbiased estimate of the matrix operation to determine an output of a machine learning model. As another example, the unbiased estimate of the matrix operation may be a parameter gradient that the system uses to update parameters of a machine learning model.

Figure 3:
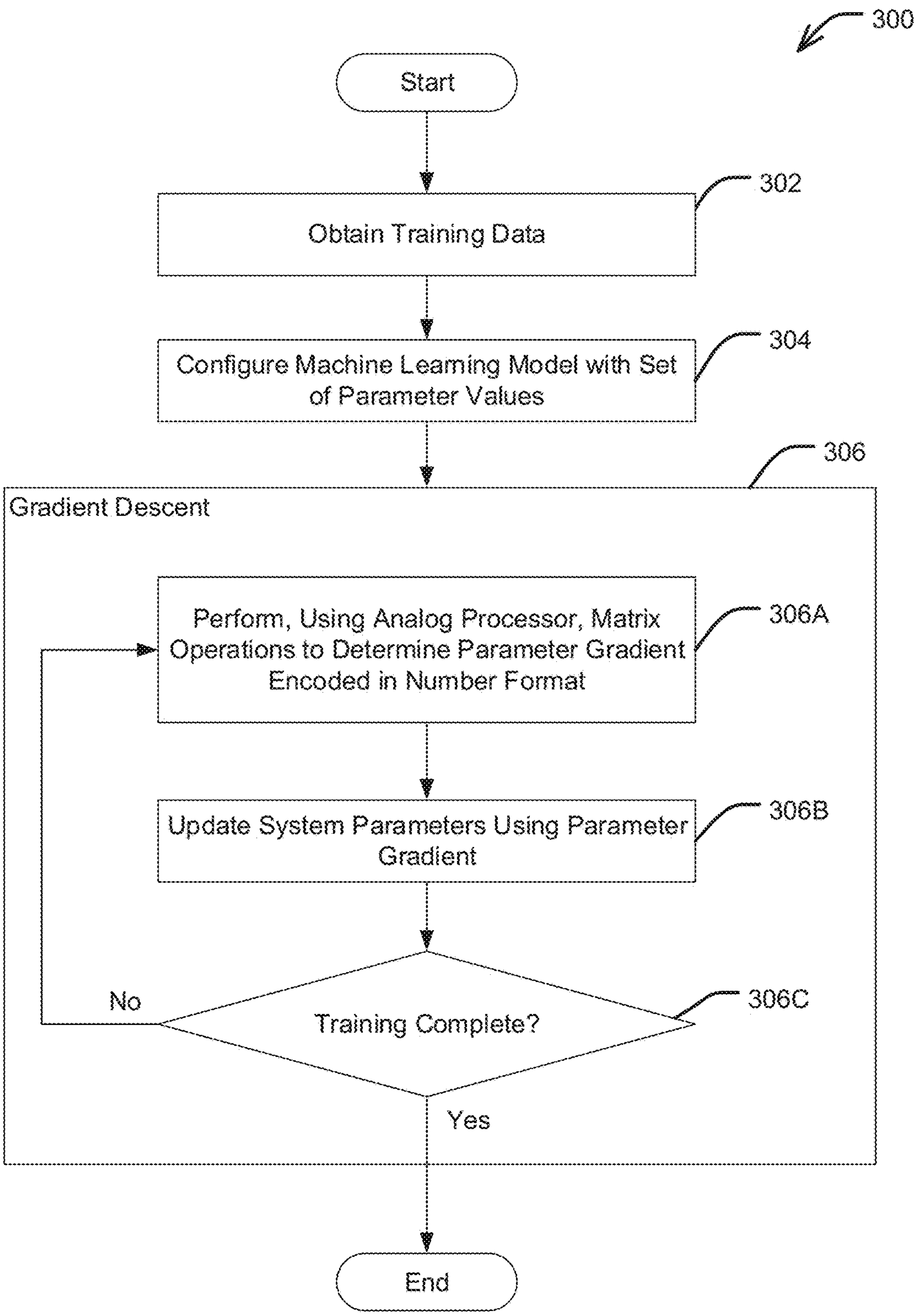
FIG. 3 is a flowchart of an example process of training a machine learning model using a hybrid analog-digital processor, according to some embodiments of the technology described herein.

FIG. 3 is a flowchart of an example process 300 of training a machine learning model (e.g., a neural network) using a hybrid analog-digital processor, according to some embodiments of the technology described herein. In some embodiments, process 300 may be performed by hybrid analog-digital processing system 100 described herein with reference to FIGS. 1A-1C. The system performing process 300 may be configured to use a particular number format to encode values involved in the training (e.g., machine learning model parameters, parameter gradients, activations, and/or values associated with non-linear operations). In some embodiments, the number format may be a low bit number format (i.e., a number format that uses less than 32 bits to represent a number). In some embodiments, the number format may be a large bit number format (i.e., a number format that uses 32 or more bits to represent a number).

Process 300 begins at block 302, where the system obtains training data. The training data includes sample inputs for the machine learning model and corresponding outputs. In some embodiments, the system may be configured to store the inputs and corresponding outputs encoded in the number format.

In some embodiments, the corresponding outputs may be target outputs of the machine learning model for their respective inputs. In some embodiments, the outputs may be pre-determined. For example, the machine learning model may be a neural network for image enhancement. In this example, the inputs may be input images that are to be enhanced by the neural network. The outputs may be target enhanced images corresponding to the input images. In another example, the machine learning model may be a neural network for determining a medical diagnosis of whether a subject has a medical condition. In this example, the inputs may be information about medical subjects, and the outputs may be diagnosis results of the medical conditions made by clinicians for the subjects. In some embodiments, the system may be configured to determine the outputs corresponding to the sample inputs. For example, the system may use a clustering technique to cluster the sample inputs into multiple different clusters, and then label each of the sample inputs based on which of the clusters the sample input belongs to. In this example, the label of each sample input may be the output corresponding to the sample input.

In some embodiments, the sample inputs may be matrices storing feature values. For example, the matrices may be images storing pixel values. In some embodiments, the matrices may be vectors storing feature values. For example, each vector may store multiple feature values (e.g., subject information, pixel values, or other feature values). In some embodiments, the outputs may be matrices. For example, the outputs may be output images. In another example, the outputs may be output vectors. In some embodiments, the outputs may be single values. For example, each output may be a classification or an output value on a continuous scale (e.g., a probability value, or sensor output value).

Next, process 300 proceeds to block 304, where the system configures the machine learning model with an initial set of parameter values. In some embodiments, the system may be configured to randomly initialize the parameter values. In some embodiments, the system may be configured to use parameter values obtained from previously performed training. For example, the parameters may be set to values obtained in a previous performance of process 300. As another example, the parameters may be set to values obtained from a different training technique.

In some embodiments, the system may be configured to store the parameter values in memory encoded in the number format (e.g., a low bit number format). The system may use the parameter values encoded in the number format to perform operations. For example, the system may use the parameter values encoded in the number format to determine an output of the machine learning model. In some embodiments, the machine learning model may be a neural network with multiple layers. The system may use the parameter values to determine outputs of each of the layers for input provided to the layer.

Next, process 300 proceeds to block 306, where the system performs gradient descent to iteratively train the parameters of the machine learning model. The gradient descent begins at block 306A, where the system performs matrix operations using the analog processor to determine a parameter gradient for the parameters of the machine learning model. In some embodiments, the system may perform the matrix operations by performing process 200 described herein with reference to FIG. 2. The system may thus obtain matrix operation results encoded in the number format. For example, the system may obtain unbiased estimates of matrix operations results that are encoded in the number format. In some embodiments, the system may be configured to encode the parameter gradient in the number format.

In some embodiments, the matrix operations may include forward pass matrix operations. In the example of a neural network, the neural network may include multiple layers. For a layer/of the neural network, a forward pass matrix operations may include matrix operations to determine an output $y^l$ of the layer ("layer output") for an input $x^l$ to the layer ("layer input") may be given by Equation 6 below.

$$y^l=w^l*x^l+b^l \quad \text{Equation (6)}$$

In Equation 6 above, $w^1$ is a weight matrix that is multiplied by input matrix $x^l$. A bias tensor $b^l$ is added to the result of the matrix multiplication. The output $y^l$ is then fed to a nonlinear function to produce an input to a subsequent layer, or an output of the neural network. The system may be configured to perform the matrix operation of Equation 6 multiple times for multiple layers of the neural network to obtain an output of the neural network.

In some embodiments, the matrix operations may include back propagation matrix operations. Continuing with the example above, a neural network may include multiple layers. The backpropagation matrix operations may include operations to determine one or more gradients using outputs of the neural network obtained by performing the forward pass matrix operations. The system may use the gradient of a loss function with respect to an output of the layer to compute the gradient of the loss function with respect to weights, input, and/or bias. The gradient of the loss function with respect to weight $$\frac{\partial L}{\partial w^l}$$

may be determined by performing the matrix operation of Equation 7 below, and the gradient of the loss function with respect to input $$\frac{\partial L}{\partial x^l}$$

may be determined by performing the matrix operation of Equation 8 below.

$$\frac{\partial L}{\partial w^l} = \frac{\partial L}{\partial y^l} * \left(x^l\right)^T \quad \text{Equation (7)}$$

-continued $$\frac{\partial L}{\partial x^l} = \left(w^l\right)^T * \frac{\partial L}{\partial y^l} \quad \text{Equation (8)}$$

In Equations 7 and 8 above, $$\frac{\partial L}{\partial y^l}$$

is the gradient of the loss function with respect to a layer output, which may be determined using an output determined for the layer.

Next, process 300 proceeds to block 306B, where the system updates parameters of the machine learning model using the determined parameter gradient. In some embodiments, the system may be configured to update the parameters of the machine learning model by adding or subtracting a proportion of the gradient. For example, the system may update weights and/or biases of the neural network using the gradient. In some embodiments, the system may be configured to determine updated parameters of the machine learning model as an average of parameters determined in one or more previous iterations.

In some embodiments, the system may be configured to use a parameter gradient encoded in the number format to update parameters of the machine learning model which are also encoded in the number format. Accordingly, the system may perform the update using values encoded in the number format.

Next, process 300 proceeds to block 306C, where the system determines whether training is complete. In some embodiments, the system may be configured to determine whether training is complete based on whether the system has performed a threshold number of iterations of the steps in block 306. In some embodiments, the system may be configured to determine whether training is complete based on whether a loss function meets a threshold value of the loss function. In some embodiments, the system may be configured to determine whether training is complete based on whether a certain number of input samples have been processed. If the system determines that training is not complete, then process 300 proceeds to block 304A. For example, the system may obtain one or more input samples and corresponding output(s), and perform the steps of blocks 306A-306B. If the system determines that training is complete, then process 300 ends.

After process 300 ends, the system may store the trained parameter values. In some embodiments, the system may be configured to store the trained parameter values in memory encoded in the number format (e.g., a low bit number format). The system may subsequently use the trained parameter values to perform inference using the machine learning model.

Figure 4:
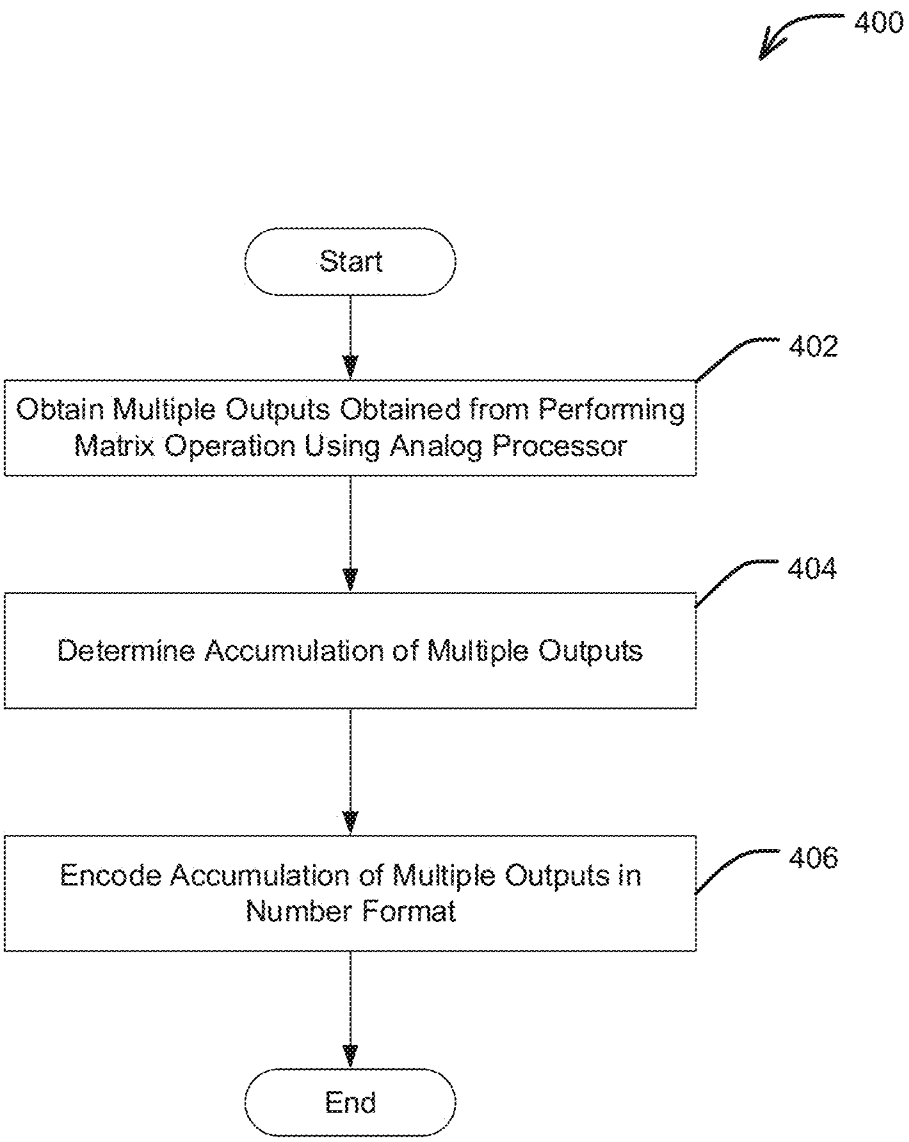
FIG. 4 is a flowchart of an example process of accumulating outputs to obtain a result of a matrix operation, according to some embodiments of the technology described herein.

FIG. 4 is a flowchart of an example process 400 of accumulating outputs obtained from performing a matrix operation, according to some embodiments of the technology described herein. In some embodiments, process 400 may be performed by hybrid analog-digital processing system 100 described herein with reference to FIGS. 1A-1C. In some embodiments, process 400 may be performed to determine an unbiased estimate of a matrix operation. For example process 400 may be performed at block 204 of process 200 described herein with reference to FIG. 2.

The system performing process 400 may be configured to use a particular number format to encode values of the outputs and the accumulation thereof. In some embodiments, the number format may be a low bit number format (i.e., a number format that uses less than 32 bits to represent a number). In some embodiments, the number format may be a large bit number format (i.e., a number format that uses 32 or more bits to represent a number).

Process 400 begins at block 402, where the system obtains multiple outputs from performing a matrix operation (e.g., using an analog processor). For example, the multiple outputs may include outputs of multiple operations performed using portions of matrices involved in the matrix operation. As another example, the multiple outputs may include outputs obtained from repeating operations (e.g., to obtain multiple samples from which to determine an unbiased estimate). An example matrix operation and multiple outputs that may be obtained from its performance are described herein with reference to block 202 of process 200.

Next, process 400 proceeds to block 404, where the system accumulates the multiple outputs. For example, the system may accumulate results of multiplying multiple tiles of a weight matrix with corresponding sub-vectors of an input vector. In some embodiments, the system may be configured to sum the multiple outputs. The system may be configured to sum the multiple outputs using a technique that mitigates accumulation of error in the sum (e.g., in summing multiple numbers represented using a floating point number format). For example, the system may perform compensated summation to sum the multiple outputs. In some embodiments, the system may be configured to encode the accumulation of the multiple outputs in the number format.

In some embodiments, the system may be configured to accumulate multiple outputs by naively summing them. In cases in which the outputs are encoded in a low bit number format, the system may sum the outputs using a high bit number format to avoid loss in precision as the sum gets larger. For example, if the outputs are encoded in a 16 bit floating point number format, the system may use a 32 bit floating number format to accumulate the sum. The system may then transform the accumulated sum into the lower bit number format for storage.

In some embodiments, the system may be configured to accumulate multiple outputs in a single number format (e.g., using a number format in which the outputs are encoded in). In cases in which the outputs are encoded in a lower bit number format, the system may not need to use a higher bit number format for accumulation. For example, the system may use compensated summation to accumulate multiple outputs $z_{ij}$. In this example, each of the outputs $z_{ij}$ may be a result of multiplying a matrix tile with a corresponding sub-vector of an input vector. The system may determine the accumulation using the number format that the outputs are encoded in. The system may determine an accumulated value $y_i$ in a row of an output vector y by performing the following steps.

a. Initialize a sum in the number format: sum=0
b. Initialize a compensator in the number format: c=0
c. For j=1, . . . , N where N is the number of outputs to be summed
   i. $a=z_{ij}-c$
   ii. b=sum+a. The sum gets larger while a remains small. As a result, precision in a is lost as the sum gets larger.
   iii. Update the compensator: c=(b−sum)−a. This step recovers the smaller parts of a in the compensator c.
   iv. Update the sum: sum=b
d. Output sum In the above example, all the variables used in determining the sum are stored in the number format. In cases in which the number format is a low bit number format, the summation can be performed without a higher bit number format in which to store an accumulated sum which would then have to be cast into the lower bit number format (e.g., by rounding). In some embodiments, the system may be configured to account for cases in which the next term to be summed has an absolute value greater than the current sum. For example, the system may use the Kahan-Babuska algorithm to use a control flow to account for such cases.

In some embodiments, the system may be configured to perform accumulation for non-linear operations. For example, the system may perform a softmax function by performing a summation as follows $$softmax(x)=\exp(x_i)\sum_{j=1}^{K}\exp(x_j).$$

The system may be configured to perform compensated summation to determine the output of the softmax function without using a high bit number format.

In some embodiments, the system may be configured to use compensated summation as part of training a machine learning model (e.g., as part of process 300 described herein with reference to FIG. 3). The system may be configured to use compensated summation when updating parameters using a parameter gradient. The system may allow performing of an update using a low bit number format (e.g., that the outputs are encoded in). For example, the system may perform the following steps.

a. Obtain an update tensor encoded in the number format $n\Delta w^t$ at timestep t
b. Obtain a compensator encoded in the number format: $c^t$ with $c^0=0$
c. Obtain a weight tensor $w^t$ encode in the number format which is to be updated
d. Perform the following steps in each update:
   i. $a=n\Delta w^t-c^t$. This is a compensated update of the weight parameters.
   ii. $b=w^t+a$. The sum gets larger while a remains small. As a result, precision in a is lost as the sum gets larger.
   iii. $c^{t+1}=(b-w^t)-a$. This step recovers the smaller parts of a in the compensator $c^{t+1}$ for use in a subsequent update step.
   iv. $w^{t+1}=b$.
   v. return $w^{t+1}$ and $c^{t+1}$ In the above example, all the variables used in updating the parameters are stored in the same number format. In cases in which the number format is a low bit number format, the summation can be performed without using a higher bit number format to store a summation which would then have to be cast into the lower bit number format (e.g., by rounding).

After determining the accumulation of the outputs at block 404, process 400 proceeds to block 406, where the system stores the accumulation encode in the number format. In some embodiments, the system may be configured to transform the accumulation from first number format (e.g., used to store the accumulation) to a second number format (e.g., that the outputs are encoded in). For example, the accumulation may be stored in a high bit number format which the system transforms into the second number format. For example, the system may determine an unbiased estimate of the accumulation and store the unbiased estimate encoded in the second number format. Example techniques of determining an unbiased estimate of the accumulation are described herein.

In some embodiments, the accumulation may be in a desired number format (e.g., a number format of the outputs). For example, the accumulation may have been obtained without using a high bit number format to store the accumulation (e.g., by using compensated summation). In such embodiments, the system may store the accumulation without transforming the accumulation from one number format to another number format. For example, the accumulation may already be encoded in a low bit number format through compensated summation (e.g., as described herein with reference to block 404).

Figure 16B:
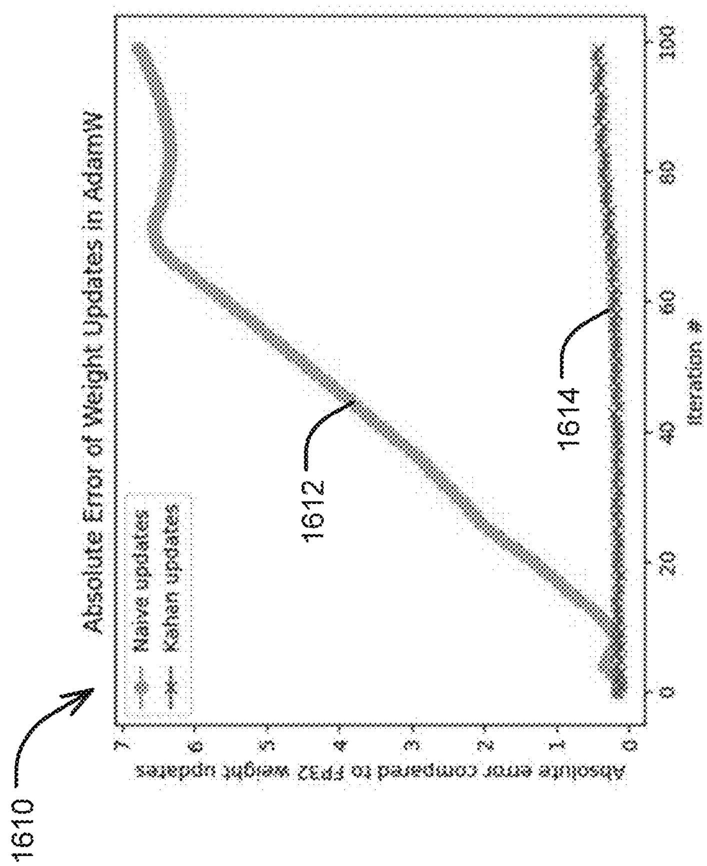
FIG. 16B is a graph of absolute error over multiple iterations of stochastic optimization of a machine learning model, according to some embodiments of the technology described herein.
Figure 16A:
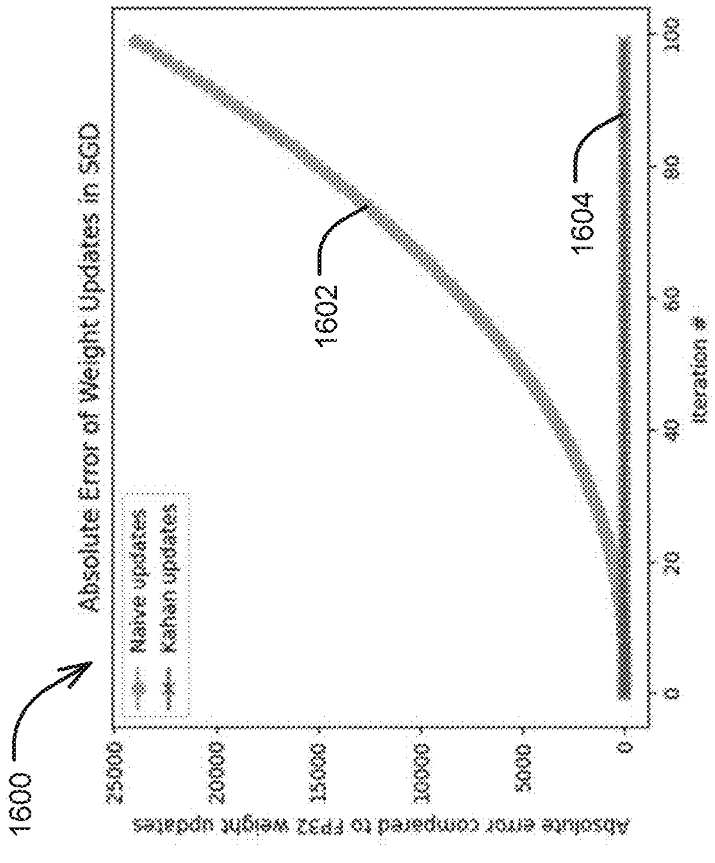
FIG. 16A is a graph 1600 of absolute error over multiple iterations of performing stochastic gradient descent (SGD) to train a machine learning model, according to some embodiments of the technology described herein.

FIG. 16A is a graph 1600 of absolute error over multiple iterations of performing stochastic gradient descent (SGD) to train a machine learning model, according to some embodiments of the technology described herein. The graph 1600 includes a plot 1602 of absolute error for updates performed using naive summation, and a plot 1604 of absolute error for updates performed using Kahan summation. As can be appreciated from the graph 1600, the error in updates performed using Kahan summation over 100 iterations is significantly less than error in updates performed using naive summation. FIG. 16B is a graph 1610 of absolute error over multiple iterations of AdamW stochastic optimization of a machine learning model, according to some embodiments of the technology described herein. The graph 1610 includes a plot 1612 of absolute error for updates performed using naive summation, and a plot 1614 of absolute error for updates performed using Kahan summation. As can be appreciated from the graph 1610, the error in updates performed using Kahan summation over 100 iterations is significantly less than error in updates performed using naive summation.

Figure 17:
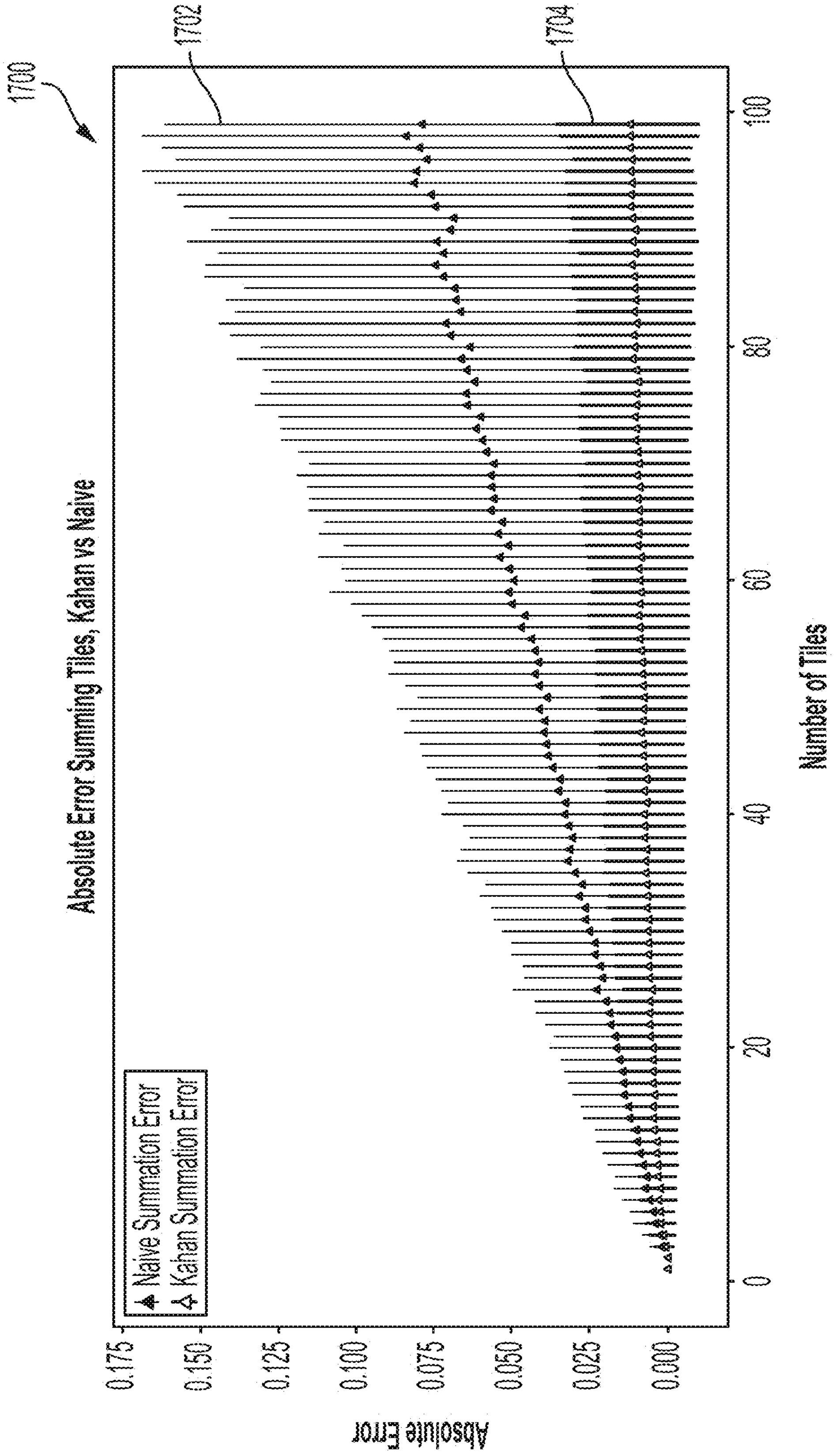
FIG. 17 is a graph of absolute error in summing different numbers of matrix tiles, according to some embodiments of the technology described herein.

FIG. 17 is a graph 1700 of absolute error in summing different numbers of matrix tiles, according to some embodiments of the technology described herein. The graph 1700 includes a plot 1702 of absolute error when the tiles are summed using naive summation, and a plot 1704 of absolute error when the tiles are summed using Kahan summation. As can be appreciated from the graph 1700, the absolute error of sums obtained using Kahan summation is less than the absolute error of sums obtained using naive summation.

Figure 18:
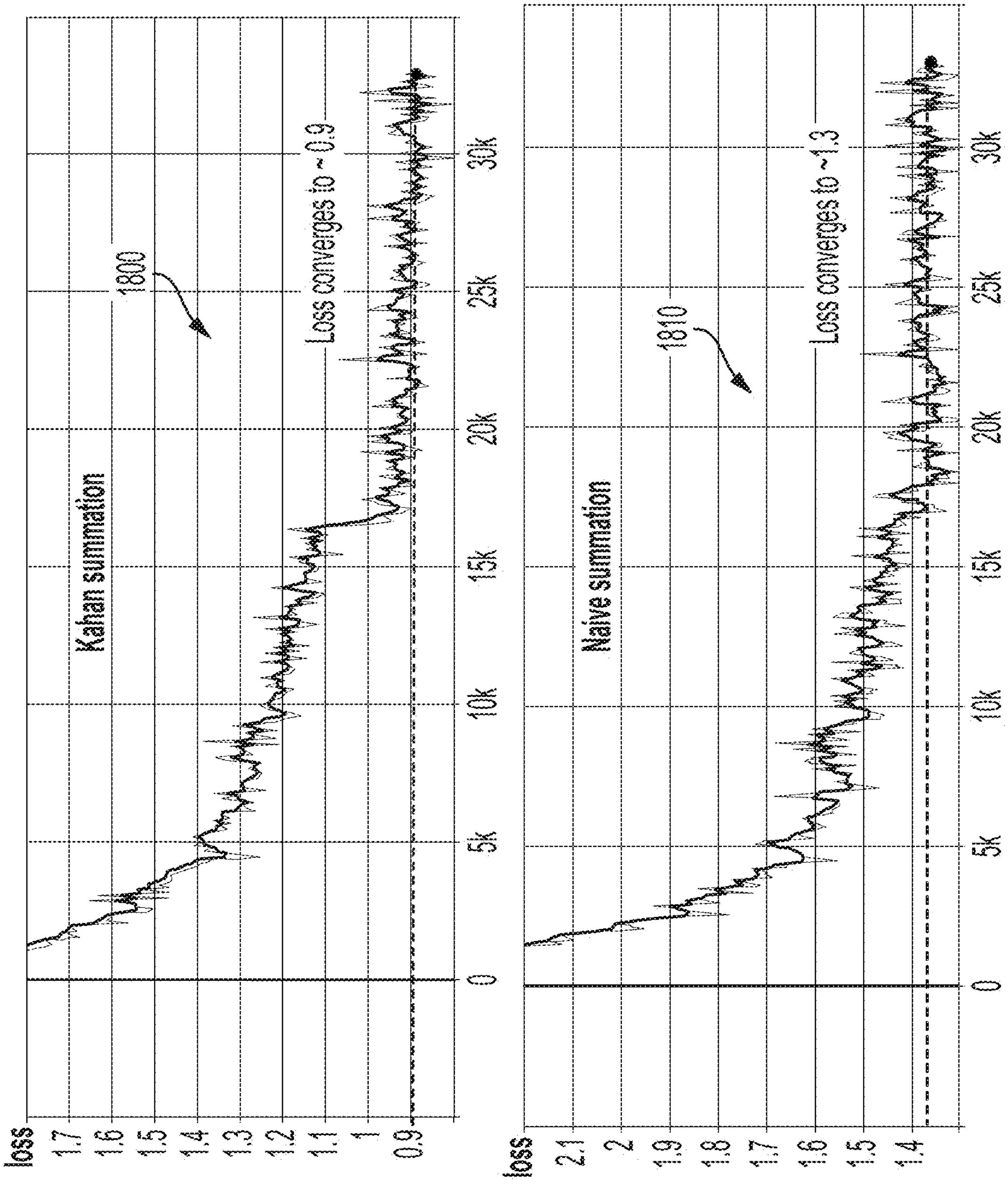
FIG. 18 is a set of graphs showing loss convergence in training of a machine learning model, according to some embodiments of the technology described herein.

FIG. 18 is a set of graphs 1800, 1810 showing loss convergence in training of a machine learning model, according to some embodiments of the technology described herein. The graph 1800 shows a plot of loss convergence when Kahan summation is used in operations involved in training the machine learning model. The graph 1810 shows a plot of loss convergence when naive summation is used in operations involved in training the machine learning model. As shown in FIG. 18, the loss converges to 0.9 when Kahan summation is used in the operations and the loss converges to 1.3 when naive summation is used in the operations. The reduced error provided by Kahan summation thus improves loss convergence in training a machine learning model.

Table 1 below shows F1 scores of the Bidirectional Encoder Representations from Transformers (BERT) model developed by GOOGLE trained with the SQuAD V2.0 dataset using various approaches.

TABLE 1

| Approach | F1 Score |
|---|---|
| Naive Summation using FP32 | 74.71 |
| Naive Summation using BFLOAT16 | 62.59 |
| Kahan Summation using BFLOAT16 | 74.41 |

As shown in Table 1, performing training using the FP32 number format and naive summation provides a trained model with an F1 score of 74.71. Training using the BFLOAT16 number format and naive summation results in a trained model with an F1 score of 62.59. Training using the BFLOAT16 number format and Kahan summation results in a trained model with an F1 score of 74.71, which is greater than 99% of the F1 score when training using the FP32 number format. In this example, Kahan summation allows use of the BFLOAT16 number format in training to obtain a model that is within 1% of performance of a model trained using the FP32 number format as indicated by the F1 scores.

Table 2 below shows F1 scores of the BERT model trained using various approaches with the SQuAD V2.0 dataset using a hybrid analog-digital processor. The values used in each of the approaches were encoded in the BFLOAT16 number format.

TABLE 2

| Approach | F1 Score | % FP32 |
|---|---|---|
| Naive Summation using ABFP and BFLOAT16 | 72.78 | 96.70% |
| Kahan Summation using ABFP and BFLOAT16 Backward -> Noise Present | 74.01 | 99% |
| Kahan Summation using ABFP and BFLOAT16 Backward -> No Noise Present | 73.96 | 99% |

As shown in Table 2, training the model using naive summation with ABFP representations and values encoded in the BFLOAT16 number format results in a trained model with an F1 score of 72.78. Training the model using Kahan summation with ABFP representations and values encoded in the BFLOAT16 number format with noise present results in a trained model with an F1 score of 74.01. Training the model using Kahan summation with ABFP representations and values encoded in the BFLOAT16 number format without noise present results in a trained model with an F1 score of 73.96. Use of Kahan summation thus allows a model trained with values encoded in the BFLOAT16 number format to attain 99% performance of a model trained using the FP32 number format, as indicated by the F1 scores. The above results show how Kahan summation mitigates effects of noise in an analog processor on training of a model.

Figure 5:
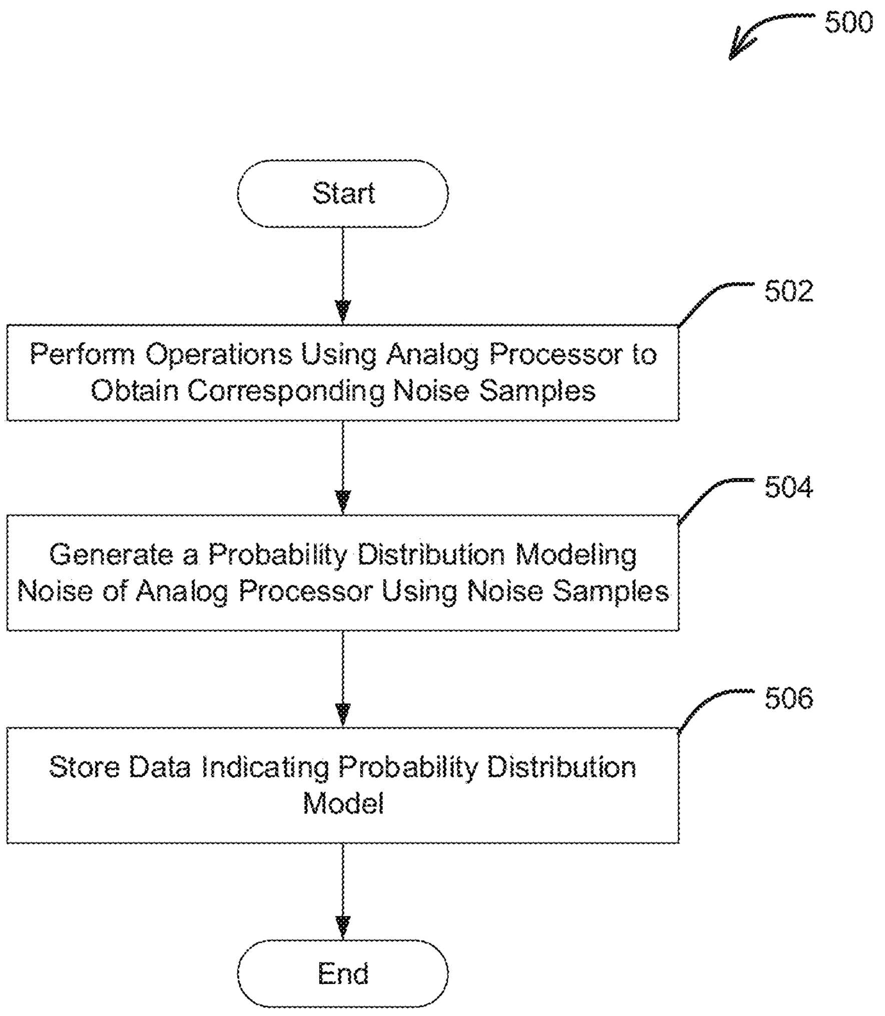
FIG. 5 is a flowchart of an example process of generating a probability distribution for use in determining an unbiased estimate of an operation result, according to some embodiments of the technology described herein.

FIG. 5 is a flowchart of an example process 500 of generating a probability distribution for use in determining an unbiased estimate of an operation result, according to some embodiments of the technology described herein. In some embodiments, process 500 may be performed by hybrid analog-digital processing system 100 described herein with reference to FIGS. 1A-1C. The probability distribution obtained from performing process 500 may be used to determine an unbiased estimate of a matrix operation result (e.g., as described herein with reference to FIG. 2).

Process 500 begins at block 502, where the system performs multiple operations using an analog processor of the system to obtain corresponding noise samples. In some embodiments, the system may be configured to perform a set of randomized operations in order to obtain the noise samples. In some embodiments, the system may be configured to: (1) perform operations using an analog processor to obtain outputs; (2) compare outputs of the operations to expected outputs (e.g., determined using a higher precision processor); and (3) generating the noise samples based on a difference between outputs and expected outputs. The difference between an output and an expected output may indicate the noise introduced by using the analog processor.

Next, process 500 proceeds to block 504, where the system generates a probability distribution modeling noise of the analog processor using the obtained noise samples. In some embodiments, the system may be configured to histogram the noise samples into various bins in order to obtain the probability distribution. In some embodiments, the system may be configured to use the probability distribution to determine a cumulative distribution function (CDF) of the probability distribution. For example, the system may use the histogram of noise samples to determine values of the CDF function.

Next, process 500 proceeds to block 506, where the system stores data indicating the probability distribution. In some embodiments, the system may be configured to store a histogram of noise samples. In some embodiments, the system may be configured to store data indicating a CDF for the probability distribution. For example, the system may store a table of CDF values determined using a histogram of noise samples. The system may use the stored data in determining an unbiased estimate of a matrix operation result as described herein with reference to FIG. 2.

Figure 6:
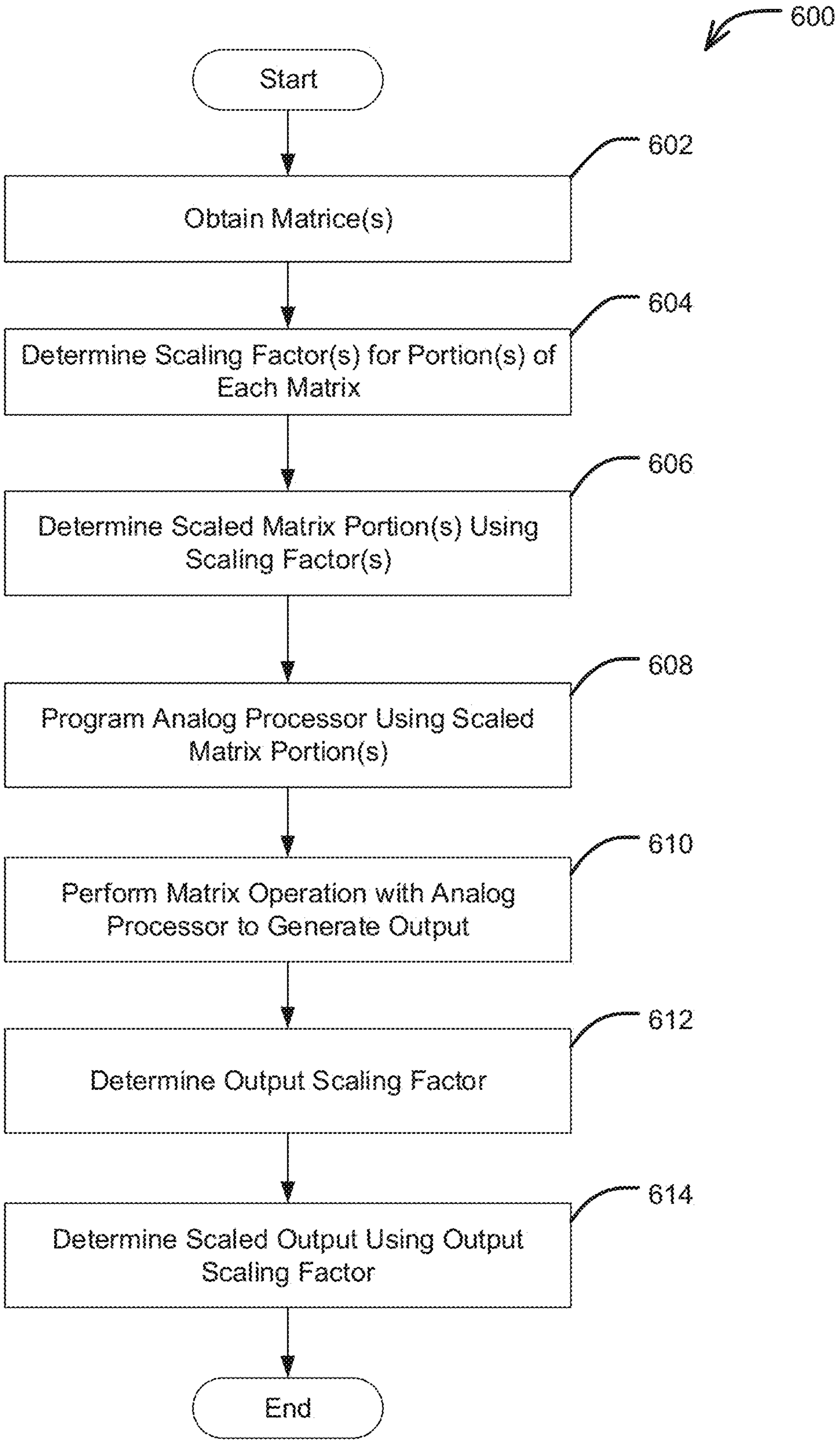
FIG. 6 is a flowchart of an example process of performing a matrix operation using an analog processor, according to some embodiments of the technology described herein.

FIG. 6 is a flowchart of an example process 600 of performing a matrix operation using an analog processor, according to some embodiments of the technology described herein. The process 600 uses the ABFP representation of matrices to perform the matrix operation. In some embodiments, process 600 may be performed by processing system 100 described herein with reference to FIGS. 1A-1C. For example, process 600 may be performed at blocks 202 of process 200 described herein with reference to FIG. 2 to determine a parameter gradient.

Process 600 begins at block 602, where the system obtains one or more matrices. For example, the matrices may consist of a matrix and a vector. To illustrate, a first matrix may be a weight matrix or portion, and a second matrix may be an input vector or portion thereof for the system. As another example, the first matrix may be control parameters (e.g., gains) of a control system, and a second matrix may be a column vector or portion thereof from an input matrix.

Next, process 600 proceeds to block 604, where the system determines a scaling factor for one or more portions of each matrix involved in the matrix operation (e.g., each matrix and/or vector). In some embodiments, the system may be configured to determine a single scaling factor for the entire matrix. For example, the system may determine a single scaling factor for an entire weight matrix. In another example, the matrix may be a vector, and the system may determine a scaling factor for the vector. In some embodiments, the system may be configured to determine different scaling factors for different portions of the matrix. For example, the system may determine a scaling factor for each row or column of the matrix. Example techniques of determining a scaling factor for a portion of a matrix are described herein in reference to scaling component 112B of FIG. 1B.

Next, process 600 proceeds to block 606, where the system determines, for each matrix, scaled matrix portion(s) using the determined scaling factor(s). In some embodiments, the system may be configured to determine: (1) scaled portion(s) of a matrix using scaling factor(s) determined for the matrix; and (2) a scaled vector using a scaling factor determined for the vector. For example, if the system determines a scaling factor for an entire matrix, the system may scale the entire matrix using the scaling factor. In another example, if the system determines a scaling factor for each row or column of a matrix, the system may scale each row or column using its respective scaling factor. Example techniques of scaling a portion of a matrix using its scaling factor are described herein in reference to scaling component 112B of FIG. 1B.

Next, process 600 proceeds to block 608, where the system programs an analog processor using the scaled matrix portion(s). In some embodiments, for each matrix, the system may be configured to program scaled portion(s) of the matrix into the analog processor. The system may be configured to program the scaled portion(s) of the matrix into the analog processor using a DAC (e.g., DAC 114 described herein with reference to FIGS. 1A-1B). In some embodiments, the system may be configured to program the scaled portion(s) of the matrix into a fixed-point representation. For example, prior to being programmed into the analog processor, the numbers of a matrix may be stored using a floating-point representation used by digital controller 112. After being programmed into the analog processor, the numbers may be stored in a fixed-point representation used by the analog processor 116. In some embodiments, the dynamic range of the fixed-point representation may be less than that of the floating-point representation.

Next, process 600 proceeds to block 610, where the system performs the matrix operation with the analog processor programmed using the scaled matrix portion(s). The analog processor may be configured to perform the matrix operation (e.g., matrix multiplication) using analog signals representing the scaled matrix portion(s) to generate an output. In some embodiments, the system may be configured to provide the output of the analog processor to an ADC (e.g., ADC 118) to be converted into a digital format (e.g., a floating-point representation).

Next, process 600 proceeds to block 612, where the system determines one or more output scaling factor. The system may be configured to determine the output scaling factor to perform an inverse of the scaling performed at block 606. In some embodiments, the system may be configured to determine an output scaling factor using input scaling factor(s). For example, the system may determine an output scaling factor as a product of input scaling factor(s). In some embodiments, the system may be configured to determine an output scaling factor for each portion of an output matrix (e.g., each row of an output matrix). For example, if at block 606 the system had scaled each row using a respective scaling factor, the system may determine an output scaling factor for each row using its respective scaling factor. In this example, the system may determine an output scaling factor for each row by multiplying the input scaling factor by a scaling factor of a vector that the row was multiplied with to obtain the output scaling factor for the row.

Next, process 600 proceeds to block 614, where the system determines a scaled output using the output scaling factor(s) determined at block 614. For example, the scaled output may be a scaled output vector obtained by multiplying each value in an output vector with a respective output scaling factor. In another example, the scaled output may be a scaled output matrix obtained by multiplying each row with a respective output scaling factor. In some embodiments, the system may be configured to accumulate the scaled output to generate an output of a matrix operation. For example, the system may add the scaled output to another matrix in which matrix operation outputs are being accumulated. In another example, the system may sum an output matrix with a bias term.

Figure 7:
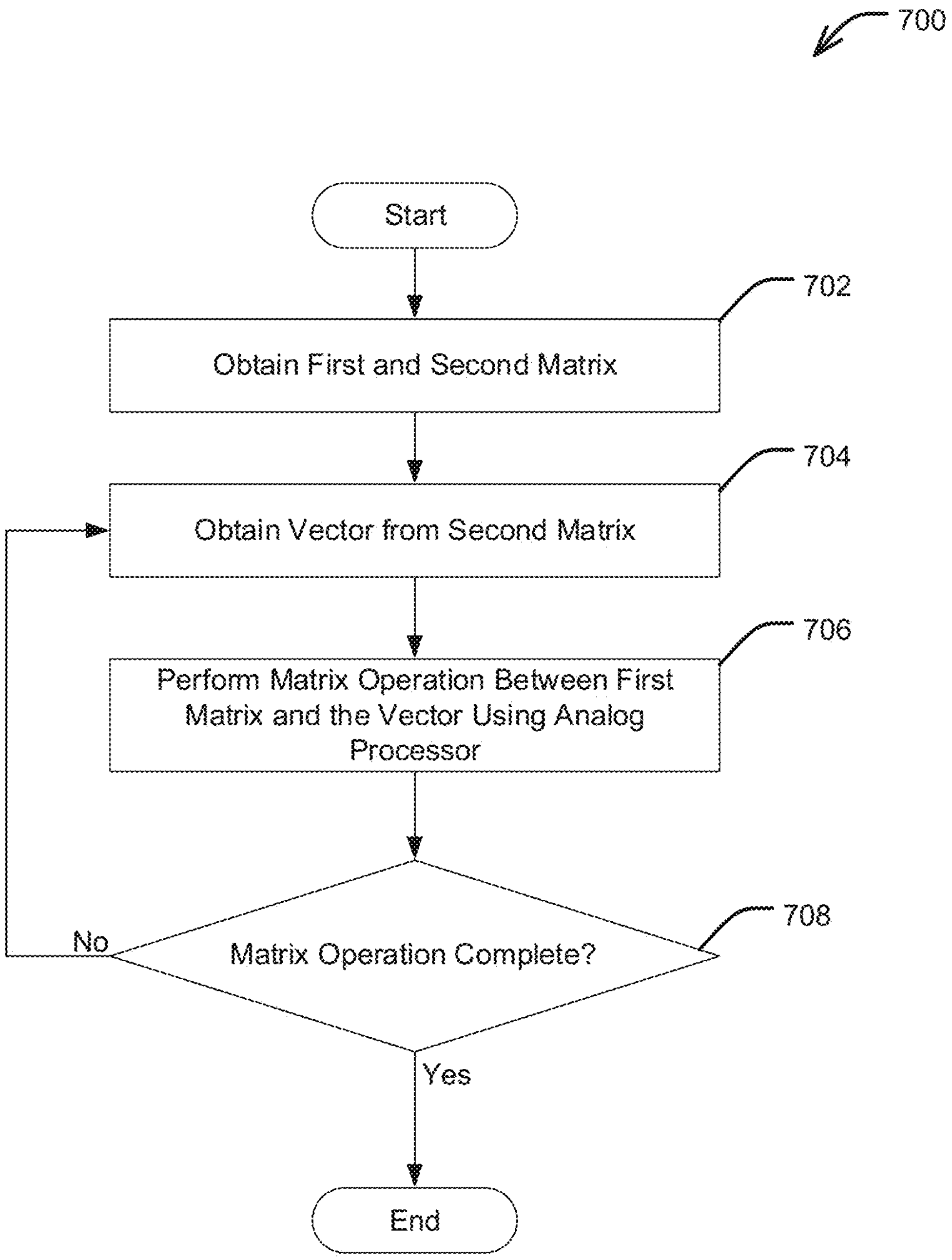
FIG. 7 is a flowchart of an example process of performing a matrix operation between two matrices, according to some embodiments of the technology described herein.

FIG. 7 is a flowchart of an example process 700 of performing a matrix operation between two matrices, according to some embodiments of the technology described herein. In some embodiments, the matrix operation may be a matrix multiplication. In some embodiments, process 700 may be performed by processing system 100 described herein with reference to FIGS. 1A-1C. In some embodiments, process 700 may be performed as part of the acts performed at block 306A of process 300 described herein with reference to FIG. 3 to determine a parameter gradient. For example, process 700 may be performed to determine an output of a system and/or to determine the parameter gradient using the output of the system.

Process 700 begins at block 702, where the system obtains a first and second matrix. In some embodiments, the matrices may consist of parameters of a system to be optimized, and a matrix of inputs to the system. For example, the matrices may consist of a weight matrix of neural network and a vector input to the neural network, or a parameter matrix for a control system and a vector input to the control system. In some embodiments, the matrices may be portions of other matrices. For example, the system may be configured to obtain tiles of the matrices as described herein in reference to FIGS. 9A-9B. To illustrate, the first matrix may be a tile obtained from a weight matrix of a neural network, and the second matrix may be an input vector corresponding to the tile.

Next, process 700 proceeds to block 704, where the system obtains a vector from the second matrix. In some embodiments, the system may be configured to obtain the vector by obtaining a column of the second matrix. For example, the system may obtain a vector corresponding to a tile of a weight matrix.

Next, process 700 proceeds to block 706, where the system performs the matrix operation between the first matrix and the vector using an analog processor. For example, the system may perform a matrix multiplication between the first matrix and the vector. In this example, the output of the matrix multiplication may be a row of an output matrix or a portion thereof. An example technique by which the system performs the matrix operation using the analog processor is described in process 600 described herein with reference to FIG. 6.

Next, process 700 proceeds to block 708, where the system determines whether the matrix operation between the first and second matrix has been completed. In some embodiments, the system may be configured to determine whether the first and second matrix has been completed by determining whether all vectors of the second matrix have been multiplied by the first matrix. For example, the system may determine whether the first matrix has been multiplied by all columns of the second matrix. If the system determines that the matrix operation is complete, then process 700 ends. If the system determines that the matrix operation is not complete, then process 700 proceeds to block 704, where the system obtains another vector from the second matrix.

Figure 10:
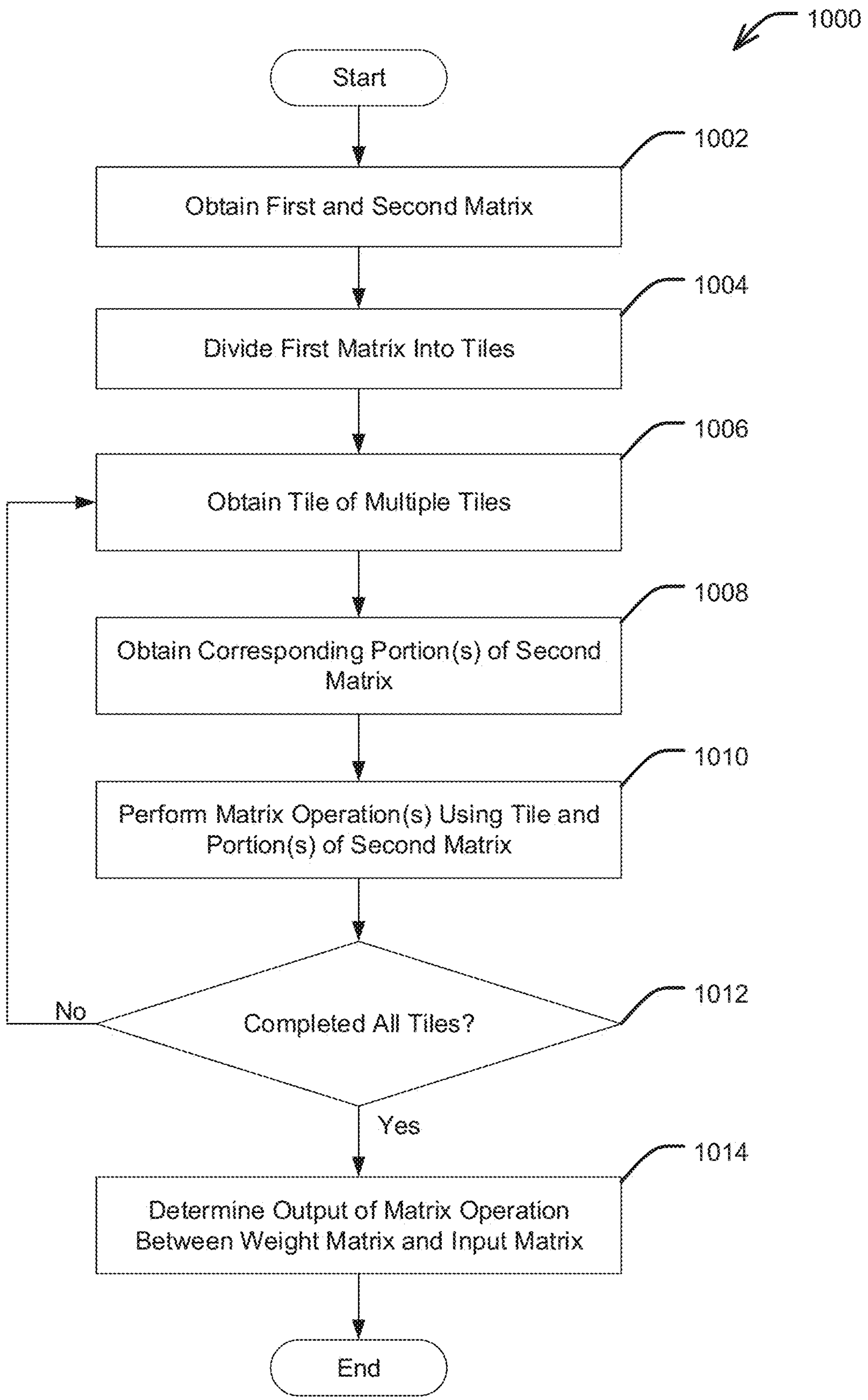
FIG. 10 is a flowchart of an example process of using tiling to perform a matrix operation, according to some embodiments of the technology described herein.

FIG. 10 is a flowchart of an example process 1000 of using tiling to perform a matrix operation, according to some embodiments of the technology described herein. Process 1000 may be performed by the processing system 100 described herein with reference to FIGS. 1A-1B. In some embodiments, process 1000 may be performed as part of process 600 described herein with reference to FIG. 6.

Process 1000 begins at block 1002, where the system obtains a first and second matrix that are involved in a matrix operation. In some embodiments, the matrix operation may be a matrix multiplication. The matrix multiplication may be to determine an output of a system (e.g., by multiplying a parameter matrix an input matrix). For example, the first matrix may be a weight matrix for a neural network and the second matrix may be an input matrix for the neural network. As another example, the first matrix may be a parameter matrix for a control system and the second matrix may be input to the control system.

Next, process 1000 proceeds to block 1004, where the system divides the first matrix into multiple tiles. For example, the system may divide a weight matrix into multiple tiles. An example technique for dividing a matrix into tiles is described herein with reference to FIGS. 9A-9B.

Next, process 1000 proceeds to block 1006, where the system obtains a tile of the multiple tiles. After selecting a tile at block 1006, process 1000 proceeds to block 1008, where the system obtains corresponding portions of the second matrix. In some embodiments, the corresponding portion(s) of the second matrix may be one or more vectors of the second matrix. For example, the corresponding portion(s) may be one or more column vectors from the second matrix. The column vector(s) may be those that align with the tile matrix for a matrix multiplication.

Next, process 1000 proceeds to block 1008, where the system performs one or more matrix operations using the tile and the portion(s) of the second matrix. In some embodiments, the system may be configured to perform process 700 described herein with reference to FIG. 7 to perform the matrix operation. In embodiments in which the portion(s) of the second matrix are vector(s) (e.g., column vector(s)) from the second matrix, the system may perform the matrix multiplication in multiple passes. In each pass, the system may perform a matrix multiplication between the tile and a vector (e.g., by programming an analog processor with a scaled tile and scaled vector to obtain an output of the matrix operation.) In some embodiments, the system may be configured to perform the operation in a single pass. For example, the system may program the tile and the portion(s) of the second matrix into an analog processor and obtain an output of the matrix operation performed by the analog processor.

Next, process 1000 proceeds to block 1012, where the system determines whether all the tiles of the first matrix have been completed. The system may be configured to determine whether all the tiles have been completed by determining whether the matrix operations (e.g., multiplications) for each tile have been completed. If the system determines that the tiles have not been completed, then process 1000 proceeds to block 1006, where the system obtains another tile.

If the system determines that the tiles have been completed, then process 1000 proceeds to block 1014, where the system determines an output of the matrix operation between the weight matrix and an input matrix. In some embodiments, the system may be configured to accumulate results of matrix operation(s) performed for the tiles into an output matrix. The system may be configured to initialize an output matrix. For example, for a multiplication of a 4×4 matrix with a 4×2 matrix, the system may initialize 4×2 matrix. In this example, the system may accumulate an output of each matrix operation in the 4×2 matrix (e.g., by adding the output of the matrix operation with a corresponding portion of the output matrix).

Figure 11:
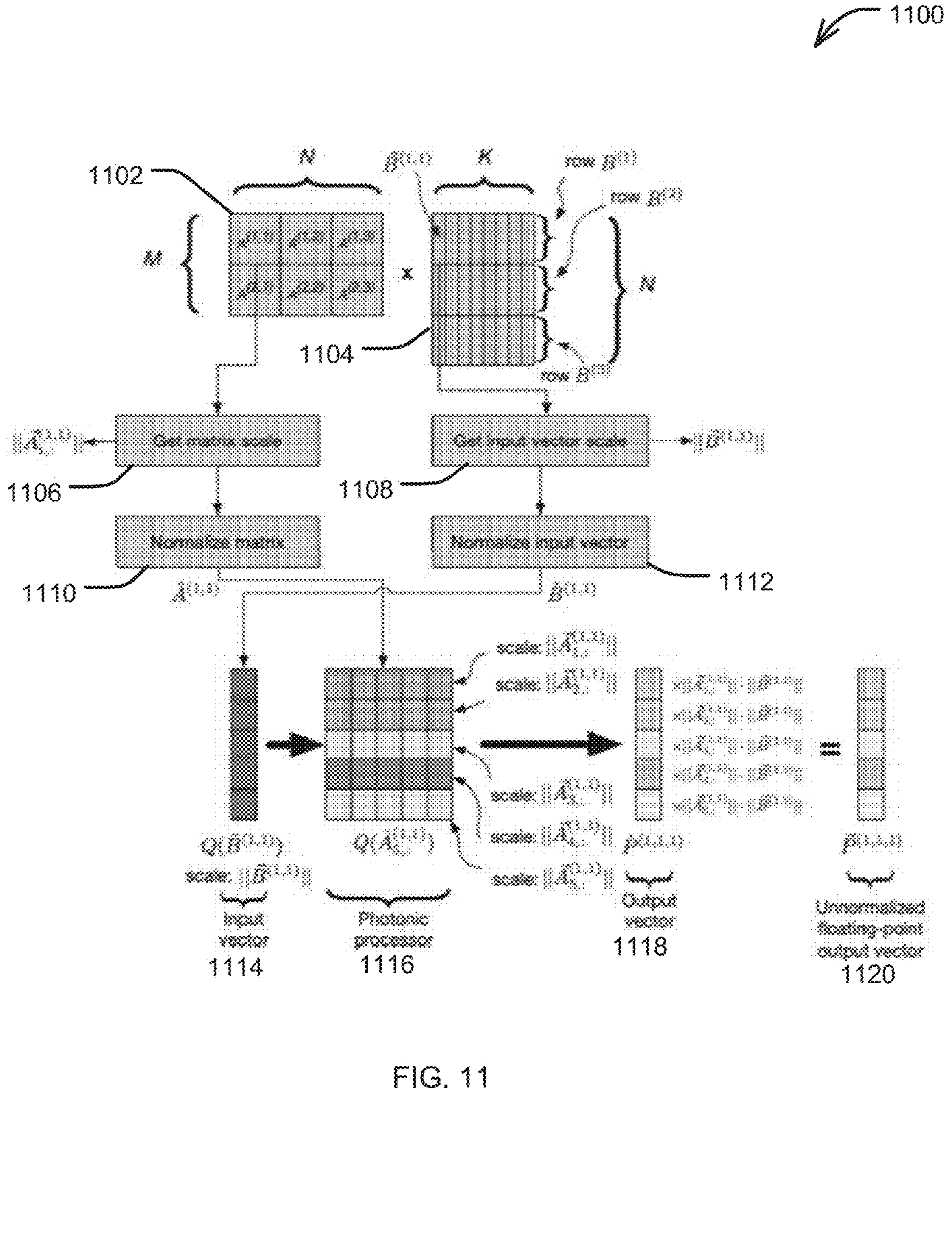
FIG. 11 is a diagram illustrating performance of a matrix multiplication operation, according to some embodiments of the technology described herein.

FIG. 11 is a diagram 1100 illustrating performance of a matrix multiplication operation using the ABFP representation, according to some embodiments of the technology described herein. The matrix multiplication illustrated in FIG. 11 may, for example, be performed by performing process 600 described herein with reference to FIG. 6. In the example of FIG. 11, the analog processor is a photonic processor. In some embodiments, a different type of analog processor may be used instead of a photonic processor in the diagram 1100 illustrated by FIG. 11.

The diagram 1100 shows a matrix operation in which the matrix 1102 is to be multiplied by a matrix 1104. The matrix 1002 is divided into multiple tiles labeled $A^{(1,1)}$, $A^{(1,2)}$, $A^{(1,3)}$, $A^{(2,1)}$, $A^{(2,2)}$, $A^{(2,3)}$. The diagram 1000 shows a multiplication performed between the tile matrix $A^{(1,1)}$ from matrix 1002 and a corresponding column vector $B^{(1,1)}$ from the matrix 1004. At block 1106, a scaling factor (also referred to as "scale") is determined for the tile $A^{(1,1)}$, and at block 1108 a scale is determined for the input vector $B^{(1,1)}$. Although the embodiment of FIG. 11 shows that a single scale is determined for the tile at block 1106, in some embodiments the system may determine multiple scales for the tile matrix. For example, the system may determine a scale for each row of the tile. Next, at block 1110 the tile matrix is normalized using the scale determined at block 806, and the input vector is normalized using the scale determined at block 1108. The tile matrix may be normalized by determining a scaled tile matrix using the scale obtained at block 806 as described at block 1106 of process 1100. Similarly, the input vector may be normalized by determined a scaled input vector using the scale obtained at block 808 as described at block 1106 of process 1100.

The normalized input vector is programmed into the photonic processor as illustrated at reference 1114, and the normalized tiled matrix is programmed into the photonic processor as illustrated at reference 1116. The tile matrix and the input vector may be programmed into the photonic processor using a fixed-point representation. The tile matrix and input vector may be programmed into the photonic processor using a DAC. The photonic processor performs a multiplication between the normalized tile matrix and input vector to obtain the output vector 1118. The output vector 1118 may be obtained by inputting an analog output of the photonic processor into an ADC to obtain the output vector 1118 represented using a floating-point representation. Output scaling factors are then used to determine the unnormalized output vector 1120 from the output vector 1118 (e.g., as described at blocks 612-614 of process 600). The unnormalized output vector 1120 may then be accumulated into an output matrix for the matrix operation between matrix 1102 and matrix 1104. For example, the vector 1120 may be stored in a portion of a column of the output matrix. The process illustrated by diagram 1100 may be repeated for each tile of matrix 1102 and corresponding portion(s) of matrix 1104 until the multiplication is completed.

Figure 12:
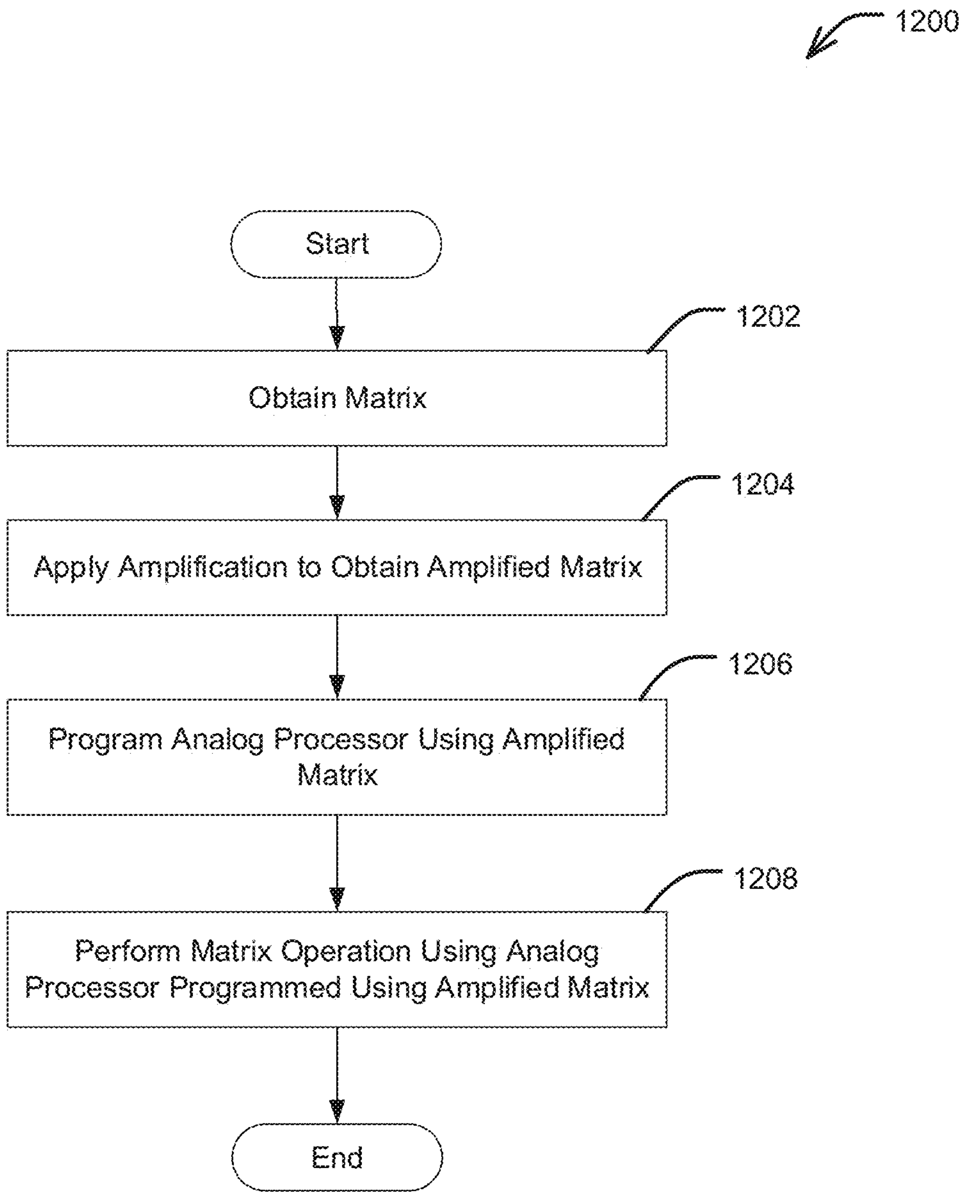
FIG. 12 is a flowchart of an example process of performing overamplification, according to some embodiments of the technology described herein.

FIG. 12 is a flowchart of an example process 1200 of performing overamplification, according to some embodiments of the technology described herein. Process 1200 may be performed by processing system 100 described herein with reference to FIGS. 1A-1C. Process 1200 may be performed as part of process 600 described herein with reference to FIG. 6. For example, process 1200 may be performed as part of programming an analog processor at block 608 of process 600. As described herein, overamplification may allow the system to capture lower significant bits of an output of an operation that would otherwise not be captured. For example, an analog processor of the system may use a fixed-bit representation of numbers that is limited to a constant number of bits. In this example, the overamplification may allow the analog processor to capture additional lower significant bits in the fixed-bit representation.

Process 1200 begins at block 1202, where the system obtains a matrix. The system may be configured to obtain a matrix. For example, the system may obtain a matrix as described at blocks 602-606 of process 600 described herein with reference to FIG. 6. The matrix may be a scaled matrix or portion thereof (e.g., a tile or vector). In some embodiments, the system may be configured to obtain a matrix without any scaling applied to the matrix.

Next, process 1200 proceeds to block 1204, where the system applies amplification to the matrix to obtain an amplified matrix. In some embodiments, the system may be configured to apply amplification to a matrix by multiplying the matrix by a gain factor prior to programming the analog processor. For example, the system may multiply the matrix by a gain factor of 2, 4, 8, 16, 32, 64, 128, or another exponent of 2. To illustrate, the system may be limited to b bits for representation of a number output by the analog processor (e.g., through an ADC). A gain factor of 1 results in obtaining b bits of the output starting from the most significant bit, a gain factor of 2 results in obtaining b bits of the output starting from the $2^{nd}$ most significant bit, and a gain factor of 3 results in obtaining b bits of the output starting from the $3^{rd}$ most significant bit. In this manner, the system may increase lower significant bits captured in an output at the expense of higher significant bits. In some embodiments, a distribution of outputs of a machine learning model (e.g., layer outputs and inference outputs of a neural network) may not reach one or more of the most significant bits. Thus, in such embodiments, capturing lower significant bit(s) at the expense of high significant bit(s) during training of a machine learning model and/or inference may improve the performance of the machine learning model. Accordingly, overamplification may be used to capture additional lower significant bit(s).

Figure 13:
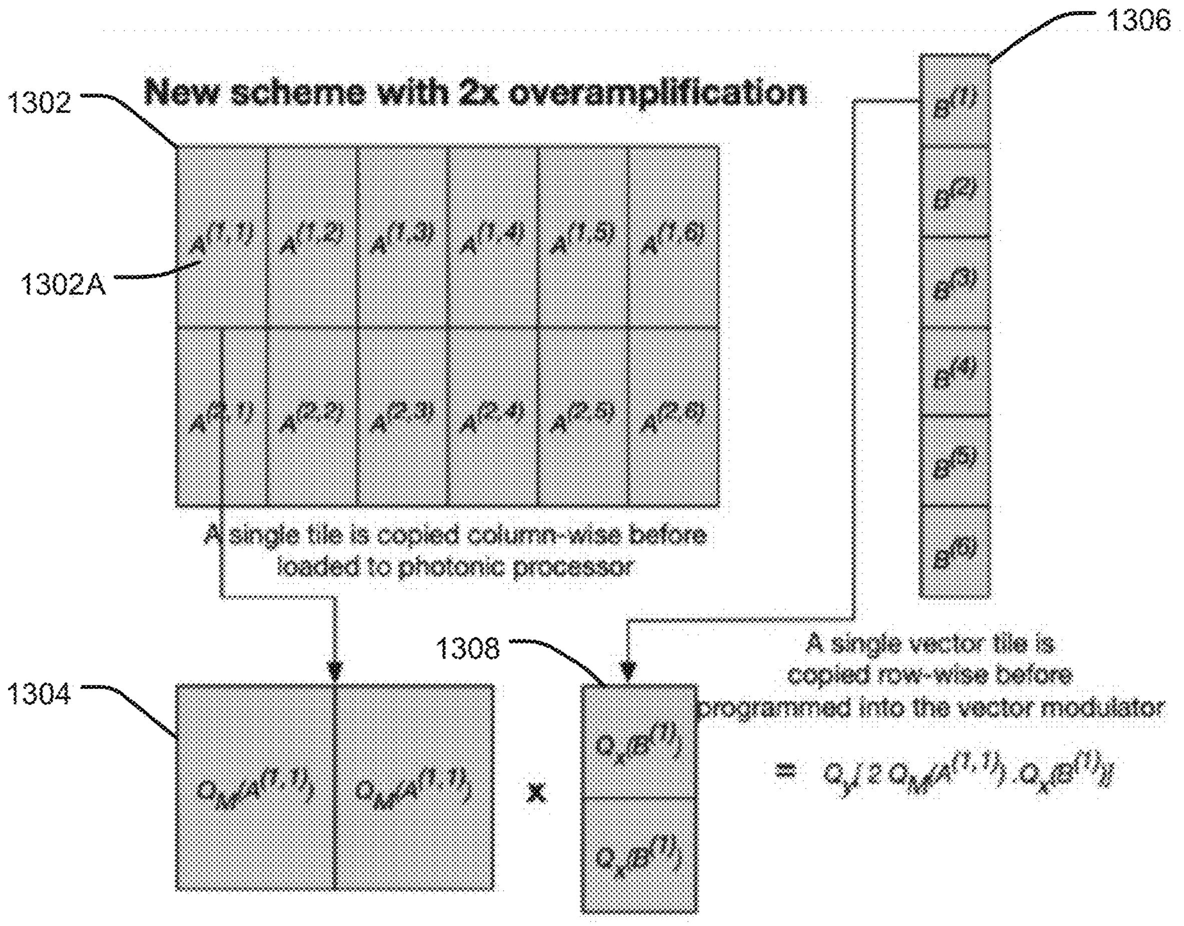
FIG. 13 illustrates amplification by copying of a matrix, according to some embodiments of the technology described herein.

In some embodiments, the system may be configured to apply amplification by: (1) obtaining a copy of the matrix; and (2) appending the copy of the matrix to the matrix. FIG. 13 illustrates amplification by copying of a matrix, according to some embodiments of the technology described herein. In the example of FIG. 13, the matrix tile 1302A of the matrix 1302 is the matrix that is to be loaded into an analog processor (e.g., a photonic processor) to perform a matrix operation. As shown in FIG. 13, the system copies the tile 1302A column-wise to obtain an amplified matrix. The amplified matrix 1304 is programmed into the analog processor. In the example of FIG. 13, the tile 1302A is to be multiplied by the vector tile 1306. The system makes a copy of the vector tile 1306 row-wise to obtain an amplified vector tile.

Figure 14A:
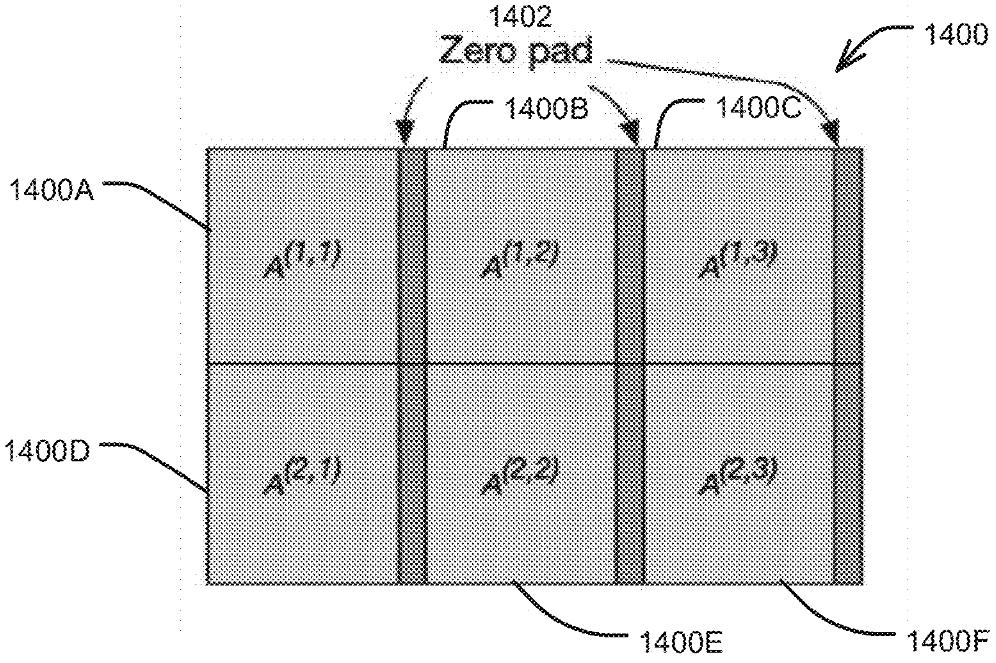
FIG. 14A is a diagram illustrating amplification by distribution of zero pads among different tiles of a matrix, according to some embodiments of the technology described herein.

In some embodiments, the system may be configured to apply amplification by distributing a zero pad among different portions of a matrix. The size of an analog processor may be large relative to a size of the matrix. The matrix may thus be padded to fill the input of the analog processor. FIG. 14A is a diagram illustrating amplification by distribution of zero pads among different tiles of a matrix, according to some embodiments of the technology described herein. As shown in FIG. 14A, the matrix 1400 is divided into tiles 1400A, 1400B, 1400C, 1400D, 1400E, 1400F. The system distributes zeroes of a zero pad 1402 among the tiles 1400A, 1400B, 1400C, 1400D, 1400E, 1400F. The system may be configured to distribute the zero pad 1402 among the tiles 1400A, 1400B, 1400C, 1400D, 1400E, 1400F instead of appending the zero pad to the end of matrix 1400 to obtain an amplified matrix.

Figure 14B:
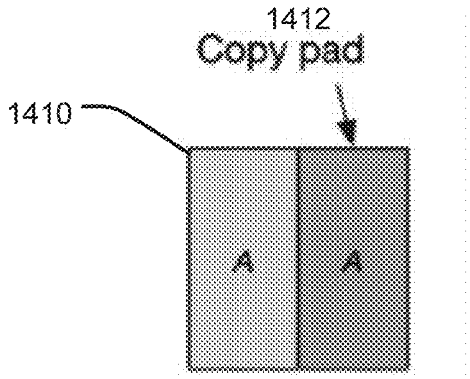
FIG. 14B is a diagram illustrating amplification by using a copy of a matrix as a pad, according to some embodiments of the technology described herein.

FIG. 14B is a diagram illustrating amplification by using a copy of a matrix as a pad, according to some embodiments of the technology described herein. In the example of FIG. 14B, instead of using a zero pad, the system uses a copy of the matrix 1410 as the pad 1412 to obtain an amplification of the matrix. The system may be configured to determine the amplification factor based on how many copies the system copies.

Returning again to FIG. 12, after obtaining the amplified matrix at block 1204, process 1200 proceeds to block 1206, where the system programs the analog processor using the amplified matrix. After programming the analog processor using the amplified matrix, process 1200 proceeds to block 1208, where the system performs the matrix operation using the analog processor programmed using the amplified matrix. The system may be configured to obtain an analog output, and provide the analog output to an ADC to obtain a digital representation of the output.

In some embodiments, the system may be configured to use any combination of one or more of the overamplification techniques described herein. For example, the system may apply a gain factor in addition to copying a matrix. In another example, the system may apply a gain factor in addition to distributing a zero pad among matrix tiles. In another example, the system may copy a matrix in addition to distributing a zero pad among matrix tiles. In some embodiments, the system may be configured to perform overamplification by repeating an operation multiple times. In such embodiments, the system may be configured to accumulate results of the multiple operations and average the results. In some embodiments, the system may be configured to average the results using a digital accumulator. In some embodiments, the system may be configured to average the results using an analog accumulator (e.g., a capacitor).

Figure 15:
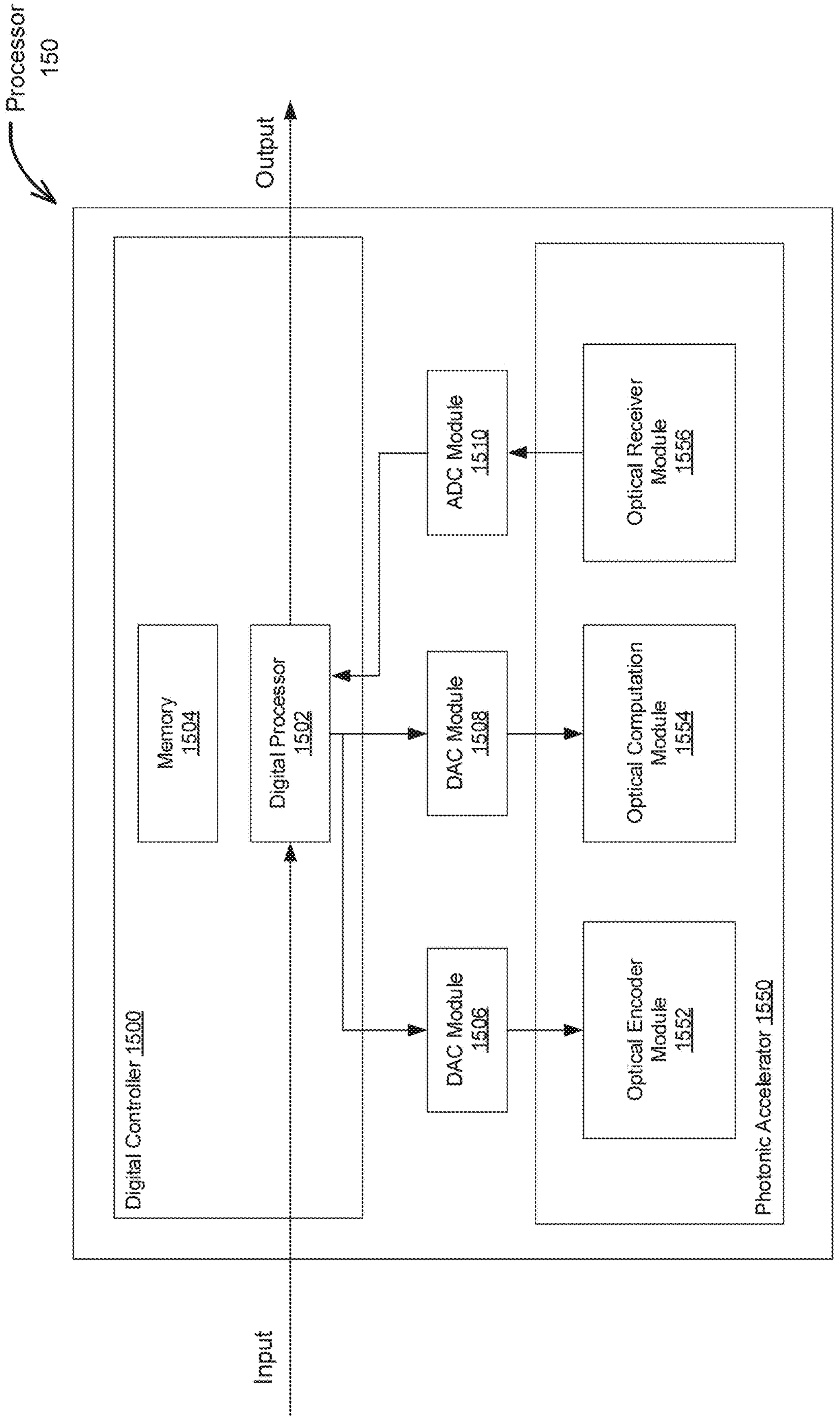
FIG. 15 is an example hybrid analog-digital processor that may be used in some embodiments of the technology described herein.

FIG. 15 is an example hybrid analog-digital processor 150 that may be used in some embodiments of the technology described herein. The processor 150 may be hybrid analog-digital processor 110 described herein with reference to FIGS. 1A-1C. The example processor 150 of FIG. 15 is a hybrid analog-digital processor implemented using photonic circuits. As shown in FIG. 15, the processor 150 includes a digital controller 1500, digital-to-analog converter (DAC) modules 1506, 1508, an ADC module 1510, and a photonic accelerator 1550. The photonic accelerator 1550 may be used as the analog processor 116 in the hybrid analog-digital processor 110 of FIGS. 1A-1B. Digital controller 1500 operates in the digital domain and photonic accelerator 1550 operates in the analog photonic domain. Digital controller 1500 includes a digital processor 1502 and memory 1504. Photonic accelerator 1550 includes an optical encoder module 1552, an optical computation module 1554, and an optical receiver module 1556. DAC modules 106, 108 convert digital data to analog signals. ADC module 1510 converts analog signals to digital values. Thus, the DAC/ADC modules provide an interface between the digital domain and the analog domain used by the processor 150. For example, DAC module 1506 may produce N analog signals (one for each entry in an input vector), a DAC module 1508 may produce N×N analog signals (e.g., one for each entry of a matrix storing neural network parameters), and ADC module 1510 may receive analog signals (e.g., one for each entry of an output vector).

The processor 150 may be configured to generate or receive (e.g., from an external device) an input vector of a set of input bit strings and output an output vector of a set of output bit strings. For example, if the input vector is an N-dimensional vector, the input vector may be represented by N bit strings, each bit string representing a respective component of the vector. An input bit string may be an electrical signal and an output bit string may be transmitted as an electrical signal (e.g., to an external device). In some embodiments, the digital process 1502 does not necessarily output an output bit string after every process iteration. Instead, the digital processor 1502 may use one or more output bit strings to determine a new input bit string to feed through the components of the processor 150. In some embodiments, the output bit string itself may be used as the input bit string for a subsequent process iteration. In some embodiments, multiple output bit streams are combined in various ways to determine a subsequent input bit string. For example, one or more output bit strings may be summed together as part of the determination of the subsequent input bit string.

DAC module 1506 may be configured to convert the input bit strings into analog signals. The optical encoder module 1552 may be configured to convert the analog signals into optically encoded information to be processed by the optical computation module 1554. The information may be encoded in the amplitude, phase, and/or frequency of an optical pulse. Accordingly, optical encoder module 1552 may include optical amplitude modulators, optical phase modulators and/or optical frequency modulators. In some embodiments, the optical signal represents the value and sign of the associated bit string as an amplitude and a phase of an optical pulse. In some embodiments, the phase may be limited to a binary choice of either a zero phase shift or a it phase shift, representing a positive and negative value, respectively. Some embodiments are not limited to real input vector values. Complex vector components may be represented by, for example, using more than two phase values when encoding the optical signal.

The optical encoder module 1552 may be configured to output N separate optical pulses that are transmitted to the optical computation module 1554. Each output of the optical encoder module 1552 may be coupled one-to-one to an input of the optical computation module 1554. In some embodiments, the optical encoder module 1552 may be disposed on the same substrate as the optical computation module 1554 (e.g., the optical encoder 1652 and the optical computation module 1554 are on the same chip). The optical signals may be transmitted from the optical encoder module 1552 to the optical computation module 1554 in waveguides, such as silicon photonic waveguides. In some embodiments, the optical encoder module 1652 may be on a separate substrate from the optical computation module 1554. The optical signals may be transmitted from the optical encoder module 1552 to optical computation module 1554 with optical fibers.

The optical computation module 1554 may be configured to perform multiplication of an input vector 'X' by a matrix 'A'. In some embodiments, the optical computation module 1554 includes multiple optical multipliers each configured to perform a scalar multiplication between an entry of the input vector and an entry of matrix 'A' in the optical domain. Optionally, optical computation module 1554 may further include optical adders for adding the results of the scalar multiplications to one another in the optical domain. In some embodiments, the additions may be performed electrically. For example, optical receiver module 1556 may produce a voltage resulting from the integration (over time) of a photocurrent received from a photodetector.

The optical computation module 1554 may be configured to output N optical pulses that are transmitted to the optical receiver module 1556. Each output of the optical computation module 1554 is coupled one-to-one to an input of the optical receiver module 1556. In some embodiments, the optical computation module 1554 may be on the same substrate as the optical receiver module 1556 (e.g., the optical computation module 1554 and the optical receiver module 1556 are on the same chip). The optical signals may be transmitted from the optical computation module 1554 to the optical receiver module 1556 in silicon photonic waveguides. In some embodiments, the optical computation module 1554 may be disposed on a separate substrate from the optical receiver module 1556. The optical signals may be transmitted from the optical computation module 1554 to the optical receiver module 1556 using optical fibers.

The optical receiver module 1556 may be configured to receive the N optical pulses from the optical computation module 1554. Each of the optical pulses may be converted to an electrical analog signal. In some embodiments, the intensity and phase of each of the optical pulses may be detected by optical detectors within the optical receiver module. The electrical signals representing those measured values may then be converted into the digital domain using ADC module 1510, and provided back to the digital process 1502.

The digital processor 1502 may be configured to control the optical encoder module 1552, the optical computation module 1554 and the optical receiver module 1556. The memory 1504 may be configured to store input and output bit strings and measurement results from the optical receiver module 1556. The memory 1504 also stores executable instructions that, when executed by the digital processor 1502, control the optical encoder module 1552, optical computation module 1554, and optical receiver module 1556. The memory 1504 may also include executable instructions that cause the digital processor 1502 to determine a new input vector to send to the optical encoder based on a collection of one or more output vectors determined by the measurement performed by the optical receiver module 1556. In this way, the digital processor 1502 may be configured to control an iterative process by which an input vector is multiplied by multiple matrices by adjusting the settings of the optical computation module 1554 and feeding detection information from the optical receive module 1556 back to the optical encoder 1552. Thus, the output vector transmitted by the processor 150 to an external device may be the result of multiple matrix multiplications, not simply a single matrix multiplication.

Figure 19:
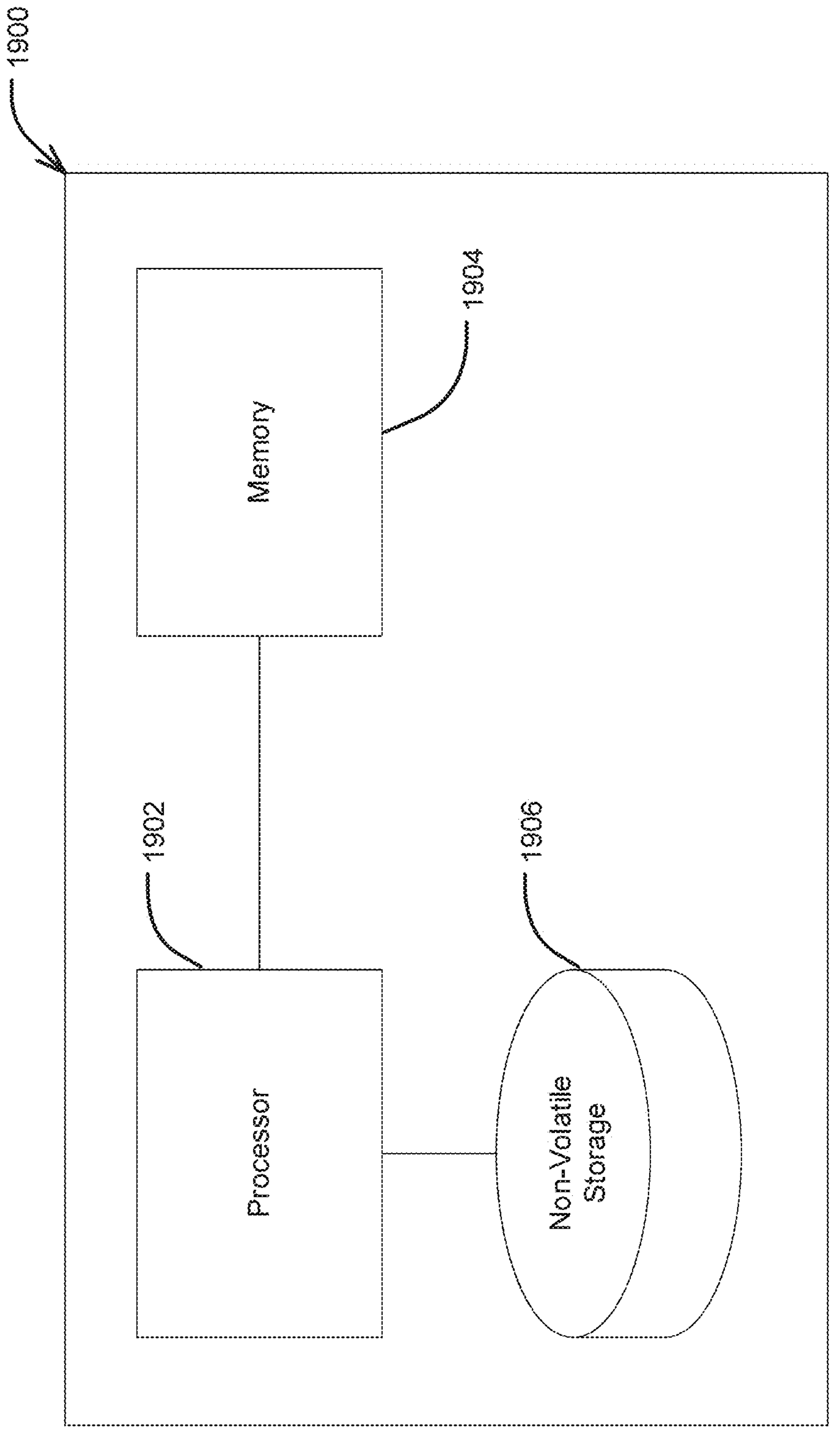
FIG. 19 is an example computer system that may be used to implement some embodiments of the technology described herein.

FIG. 19 is an example computer system that may be used to implement some embodiments of the technology described herein. The computing device 1900 may include one or more computer hardware processors 1902 and non-transitory computer-readable storage media (e.g., memory 1904 and one or more non-volatile storage devices 1906). The processor(s) 1902 may control writing data to and reading data from (1) the memory 1904; and (2) the non-volatile storage device(s) 1906. To perform any of the functionality described herein, the processor(s) 1902 may execute one or more processor-executable instructions stored in one or more non-transitory computer-readable storage media (e.g., the memory 1904), which may serve as non-transitory computer-readable storage media storing processor-executable instructions for execution by the processor(s) 1902.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of using a hybrid analog-digital processor to perform matrix operations, the hybrid analog-digital processor comprising a digital controller and an analog processor, the hybrid analog-digital processor configured to store digital values in memory encoded in a number format that uses less than 32 bits to represent a number, the method comprising:

performing, using the analog processor, a matrix operation to obtain at least one output, the at least one output encoded in the number format;

determining, using the at least one output, an unbiased estimate of a matrix operation result based on a probability distribution modeling noise of the analog processor; and storing, in the memory, the unbiased estimate of the matrix operation result encoded in the number format.

2. The method of claim 1, wherein the matrix operation is a matrix multiplication.

3. The method of claim 1, wherein determining, using the at least one output, the unbiased estimate of the matrix operation result comprises:

determining, using the at least one output, the matrix operation result; and stochastically rounding the matrix operation result to obtain the unbiased estimate of the matrix operation result.

4. The method of claim 1, wherein:

the at least one output comprises a plurality of outputs each encoded in the number format; and determining the unbiased estimate of the matrix operation result comprises:

determining an accumulation of the plurality of outputs, wherein the accumulation of the plurality of outputs is encoded in the number format; and determining the unbiased estimate of the matrix operation result using the accumulation of the plurality of outputs.

5. The method of claim 4, wherein determining the accumulation of the plurality of outputs comprises determining a compensated summation of at least some of the plurality of outputs to obtain the accumulation of the plurality of outputs.

6. The method of claim 1, wherein the probability distribution is a Gaussian distribution.

7. The method of claim 1, wherein the probability distribution modeling the noise of the analog processor is obtained by:

obtaining a plurality of noise samples from a plurality of operations performed using the analog processor; and generating the probability distribution using the plurality of sample noise samples.

8. The method of claim 1, wherein the number format is a 16 bit floating point number format.

9. The method of claim 1, wherein the number format is an 8 bit floating point number format.

10. The method of claim 1, wherein the matrix operation is performed as part of determining an output of a machine learning model for a respective input and the method further comprises:

determining, using the unbiased estimate of the matrix operation result, the output of the machine learning model for the respective input.

11. The method of claim 1, wherein the matrix operation involves a first matrix and performing, using the analog processor, the matrix operation comprises:

identifying a plurality of portions of the first matrix, the plurality of portions including a first matrix portion;

determining a scaling factor for the first matrix portion;

scaling the first matrix portion using the scaling factor to obtain a scaled first matrix portion;

programming the analog processor using the scaled first matrix portion; and performing, by the analog processor programmed using the scaled matrix portion, the matrix operation to obtain a first output of the at least one output.

12. A method of using a hybrid analog-digital processor to perform matrix operations, the hybrid analog-digital processor comprising a digital controller and an analog processor, the hybrid analog-digital processor configured to store digital values in memory encoded in a number format that uses less than 32 bits to represent a number, the method of claim 1, comprising:

performing, using the analog processor, a matrix operation to obtain at least one output, the at least one output encoded in the number format, wherein the matrix operation is performed as part of training a machine learning model;

determining, using the at least one output, an unbiased estimate of a matrix operation result;

determining, using the unbiased estimate of the matrix operation result, a parameter gradient for parameters of the machine learning model;

updating the parameters of the machine learning model using the parameter gradient; and storing, in the memory, the unbiased estimate of the matrix operation result encoded in the number format.

13. The method of claim 12, wherein the parameter gradient and the parameters of the machine learning model are encoded in the number format.

14. The method of claim 12, further comprising stochastically rounding the matrix operation result to obtain the unbiased estimate of the matrix operation result.

15. The method of claim 12, wherein the number format is a 16 bit floating point number format or an 8 bit floating point number format.

16. The method of claim 12, wherein the matrix operation involves a first matrix and performing, using the analog processor, the matrix operation comprises:

identifying a plurality of portions of the first matrix, the plurality of portions including a first matrix portion;

determining a scaling factor for the first matrix portion;

scaling the first matrix portion using the scaling factor to obtain a scaled first matrix portion;

programming the analog processor using the scaled first matrix portion; and performing, by the analog processor programmed using the scaled matrix portion, the matrix operation to obtain a first output of the at least one output.

17. The method of claim 12, wherein:

the at least one output comprises a plurality of outputs each encoded in the number format; and determining the unbiased estimate of the matrix operation result comprises:

determining an accumulation of the plurality of outputs, wherein the accumulation of the plurality of outputs is encoded in the number format; and determining the unbiased estimate of the matrix operation result using the accumulation of the plurality of outputs.

18. The method of claim 17, wherein determining the accumulation of the plurality of outputs comprises determining a compensated summation of at least some of the plurality of outputs to obtain the accumulation of the plurality of outputs.

19. A system for performing matrix operations, the system comprising:

a hybrid analog-digital processor, the hybrid analog-digital processor comprising:

a digital controller;

an analog processor; and memory configured to store digital values encoded in a number format that uses less than 32 bits to represent a number;

wherein the hybrid analog-digital processor is configured to:

perform, using the analog processor, a matrix operation to obtain at least one output, the at least one output encoded in the number format and the matrix operation is performed as part of training a machine learning model;

determine, using the at least one output, an unbiased estimate of a matrix operation result;

determine, using the matrix operation result encoded in the number format, a parameter gradient for parameters of the machine learning model;

update the parameters of the machine learning model using the parameter gradient; and store, in the memory, the unbiased estimate of the matrix operation result encoded in the number format.

20. The system of claim 19, wherein determining, using the at least one output, the unbiased estimate of the matrix operation result comprises:

determining, using the at least one output, the unbiased estimate of the matrix operation result based on a probability distribution modeling noise of the analog processor.

21. The system of claim 19, wherein:

the at least one output comprises a plurality of outputs; and determining the unbiased estimate of the matrix operation result comprises:

determining a compensated summation of at least some of the plurality of outputs, wherein the compensated summation is encoded in the number format; and determining, using the compensated summation, the unbiased estimate of the matrix operation result.

22. The system of claim 19, wherein the matrix operation involves a first matrix and performing, using the analog processor, the matrix operation comprises:

identifying a plurality of portions of the first matrix, the plurality of portions including a first matrix portion;

determining a scaling factor for the first matrix portion;

scaling the first matrix portion using the scaling factor to obtain a scaled first matrix portion;

programming the analog processor using the scaled first matrix portion; and performing, by the analog processor programmed using the scaled matrix portion, the matrix operation to obtain a first output of the at least one output.

23. A non-transitory computer-readable storage medium storing instructions that, when executed by a hybrid analog-digital processor, cause the hybrid analog-digital processor to perform a method of performing matrix operations, the hybrid analog-digital processor comprising a digital controller and an analog processor, the hybrid analog-digital processor configured to store digital values in memory encoded in a number format that uses less than 32 bits to represent a number, the method comprising:

performing, using the analog processor, a matrix operation to obtain at least one output, the at least one output encoded in the number format;

determining, using the at least one output, an unbiased estimate of a matrix operation result based on a probability distribution modeling noise of the analog processor; and storing, in the memory, the unbiased estimate of the matrix operation result encoded in the number format.

* * * * *